(12) United States Patent
Takeuchi et al.

(10) Patent No.: US 8,345,120 B2
(45) Date of Patent: Jan. 1, 2013

(54) ELECTRONIC CAMERA WITH SELF-ADJUSTING FLASH AND IMAGE-CAPTURE SENSITIVITY

(75) Inventors: Hiroshi Takeuchi, Kawasaki (JP); Tsutomu Wakabayashi, Yokohama (JP)

(73) Assignee: Nikon Corporation, Tokyo (JP)

( * ) Notice: Subject to any disclaimer, the term of this patent is extended or adjusted under 35 U.S.C. 154(b) by 1375 days.

(21) Appl. No.: 11/082,065

(22) Filed: Mar. 17, 2005

(65) Prior Publication Data

US 2005/0219381 A1    Oct. 6, 2005

(30) Foreign Application Priority Data

Apr. 6, 2004  (JP) .................................. 2004-112248
Jun. 1, 2004  (JP) .................................. 2004-163288

(51) Int. Cl.
H04N 5/235    (2006.01)
H04N 5/238    (2006.01)
H04N 5/222    (2006.01)
G03B 7/00     (2006.01)

(52) U.S. Cl. ..................... 348/229.1; 348/362; 348/364; 348/371

(58) Field of Classification Search ............... 348/229.1, 348/370–371
See application file for complete search history.

(56) References Cited

U.S. PATENT DOCUMENTS

| | | | |
|---|---|---|---|
| 4,954,897 A | | 9/1990 | Ejima et al. |
| 6,272,292 B1 | | 8/2001 | Iwasaki et al. |
| 6,359,651 B1 * | | 3/2002 | Yokonuma .................... 348/370 |
| 6,654,062 B1 * | | 11/2003 | Numata et al. ................ 348/362 |
| 6,970,199 B2 * | | 11/2005 | Venturino et al. ....... 348/333.02 |
| 7,039,307 B2 * | | 5/2006 | Uchida .......................... 396/67 |
| 7,071,987 B1 * | | 7/2006 | Tanaka .......................... 348/362 |
| 7,184,078 B2 * | | 2/2007 | Okisu et al. ................ 348/222.1 |
| 7,414,666 B2 * | | 8/2008 | Yamaguchi ................... 348/371 |
| 7,420,613 B2 * | | 9/2008 | Lee ............................... 348/371 |
| 7,456,868 B2 * | | 11/2008 | Calderwood .............. 348/229.1 |
| 7,522,210 B2 * | | 4/2009 | Shimada ...................... 348/364 |
| 2001/0019364 A1 * | | 9/2001 | Kawahara .................... 348/362 |
| 2003/0179311 A1 * | | 9/2003 | Shiga ............................ 348/370 |
| 2005/0052557 A1 * | | 3/2005 | Kusaka et al. ............... 348/308 |

FOREIGN PATENT DOCUMENTS

| | | |
|---|---|---|
| JP | 07-222049 A | 8/1995 |
| JP | B2 2787147 | 6/1998 |
| JP | A 11-150679 | 6/1999 |
| JP | A-2001-222049 | 8/2001 |
| JP | A-2001-285707 | 10/2001 |
| JP | A 2003-189175 | 7/2003 |
| JP | A-2003-241248 | 8/2003 |

* cited by examiner

*Primary Examiner* — Usman Khan
*Assistant Examiner* — Pritham Prabhakher
(74) *Attorney, Agent, or Firm* — Oliff & Berridge, PLC

(57) ABSTRACT

An electronic camera includes: an image-capturing unit with variable image-capturing sensitivity, which captures an image of a subject through a photographic lens; a brightness detection unit that detects subject brightness; an exposure calculation unit that executes an exposure calculation by using, at least, the image-capturing sensitivity set at the image-capturing unit and the subject brightness having been detected; a flash quantity calculation unit that calculates a main flash quantity for a flash unit that illuminates the subject when capturing an image thereof; and a sensitivity adjusting unit that adjusts the image-capturing sensitivity so as to achieve optimal exposure with a main flash quantity within a flash quantity control range of the flash unit when the main flash quantity having been calculated by the flash quantity calculation unit is outside the flash quantity control range. And if the image-capturing sensitivity has been adjusted by the sensitivity adjusting unit, the exposure calculation unit re-executes the exposure calculation.

9 Claims, 32 Drawing Sheets

ELECTRONIC CAMERA WITH SELF-ADJUSTING FLASH AND IMAGE-CAPTURE SENSITIVITY

INCORPORATION BY REFERENCE

The disclosures of the following priority applications are herein incorporated by reference:
Japanese Patent Application No. 2004-112248 filed Apr. 6, 2004
Japanese Patent Application No. 2004-163288 filed Jun. 1, 2004

BACKGROUND OF THE INVENTION

1. Field of the Invention

The present invention relates to an electronic camera that captures a subject image by using an image-capturing device.

2. Description of Related Art

An apex calculation known in the related art is executed to calculate the optimal exposure quantity to be achieved in a camera as expressed in (1) below by using an aperture value AV of the photographic lens, a shutter speed (exposure period) TV, a subject brightness BV and an exposure sensitivity SV.

$$EV=AV+TV=BV+SV \quad (1)$$

EV in the expression above represents the exposure quantity. In a silver halide camera in which SV is determined by the sensitivity of the film being used, the aperture value AV and the shutter speed TV are calculated in correspondence to the subject brightness BV so as to achieve the optimal exposure. In the case of an electronic camera which allows the gains at the image-capturing device to be varied (see, for instance, Japanese Laid Open Patent Application No. H 11-150679), the aperture value AV, the shutter speed TV and the image-capturing sensitivity SV can be determined in correspondence to the subject brightness BV as long as the gain at the image-capturing device, i.e., the exposure sensitivity (image-capturing sensitivity) SV is variable.

SUMMARY OF THE INVENTION

Generally speaking, the brightness level of a main subject is often low if the main subject needs to be illuminated with flash light emitted from an illuminating device during a photographing operation. When the brightness of the main subject is low, the image-capturing sensitivity SV is adjusted to a higher level through the exposure calculation expressed as in (1) above. There is a concern that the main subject may be overexposed if it is illuminated with flash light from the illuminating device after the image-capturing sensitivity SV is adjusted as described above. In addition, in an image with scenery in the background obtained through a fill-in flash (daylight synchronized) photographing operation performed under backlight conditions, the image portion other than the main subject, such as the background, may be overexposed even if the main subject is exposed to the correct extent.

According to the 1st aspect of the invention, an electronic camera comprises: an image-capturing unit with variable image-capturing sensitivity, which captures an image of a subject through a photographic lens; a brightness detection unit that detects subject brightness; an exposure calculation unit that executes an exposure calculation by using, at least, the image-capturing sensitivity set at the image-capturing unit and the subject brightness having been detected; a flash quantity calculation unit that calculates a main flash quantity for a flash unit that illuminates the subject when capturing an image thereof; and a sensitivity adjusting unit that adjusts the image-capturing sensitivity so as to achieve optimal exposure with a main flash quantity within a flash quantity control range of the flash unit when the main flash quantity having been calculated by the flash quantity calculation unit is outside the flash quantity control range, and if the image-capturing sensitivity has been adjusted by the sensitivity adjusting unit, the exposure calculation unit re-executes the exposure calculation.

According to the 2nd aspect of the invention, in the electronic camera according to the 1st aspect, it is preferred that: there is further provided a reflected light detection unit that detects reflected light from the subject when the flash unit executes a preliminary flash emission; and the flash quantity calculation unit calculates the main flash quantity needed for an image-capturing operation based upon a detection signal obtained at the reflected light detection unit in the preliminary flash emission and the image-capturing sensitivity currently set at the image-capturing unit.

According to the 3rd aspect of the invention, in the electronic camera according to the 1st aspect, it is preferred that the exposure calculation unit alters an exposure time period which is currently set when the exposure calculation is re-executed.

According to the 4th aspect of the invention, in the electronic camera according to the 1st aspect, it is preferred that the exposure calculation unit does not re-execute the exposure calculation if the camera is set in a shutter speed priority automatic exposure calculation mode.

According to the 5th aspect of the invention, in the electronic camera according to the 1st aspect, it is preferred that the exposure calculation unit does not re-execute the exposure calculation if the camera is set in a manual exposure mode.

According to the 6th aspect of the invention, in the electronic camera according to the 1st aspect, it is preferred that: when re-executing the exposure calculation, the exposure calculation unit adjusts at least one of an aperture value and a shutter speed set in the camera if the camera is set in a program automatic exposure calculation mode, adjusts the aperture value if the camera is set in a shutter speed priority automatic exposure calculation mode and adjusts the shutter speed if the camera is set in an aperture priority automatic exposure calculation mode; and the exposure calculation unit does not re-execute the exposure calculation if the camera is set in a manual exposure mode.

According to the 7th aspect of the invention, an electronic camera comprises: an image-capturing device that captures a subject image through a photographic lens; a brightness detection unit that detects subject brightness; a first exposure calculation unit that executes an exposure calculation by using at least an exposure sensitivity currently set for the image-capturing device and the subject brightness having been detected among the exposure sensitivity currently set for the image-capturing device, an exposure time length currently set for the image-capturing device, an currently set aperture value and the detected subject brightness; a reflected light detection unit that detects reflected light from the main subject when light is emitted from a flash emitting unit which executes a main flash emission to illuminate the subject during a photographing operation and a preliminary flash emission to illuminate the subject prior to the photographing operation; a flash quantity calculation unit that calculates a main flash quantity which needs to be achieved for the photographing operation based upon a detection signal obtained at the reflected light detection unit during the preliminary flash emission and the exposure sensitivity; a sensitivity adjusting unit that adjusts the currently set exposure sensitivity to an exposure sensitivity needed to achieve optimal exposure of a main subject with a main flash quantity within a flash quantity control range if the main flash quantity having been calculated by the flash quantity calculation unit is outside the flash quantity control range of the flash emitting unit; and a second exposure calculation unit that re-executes the exposure calculation by adjusting at least one of the exposure time length and the aperture value so as to achieve optimal exposure for objects other than the main subject when the exposure sensitivity has been adjusted by the sensitivity adjusting unit.

According to the 8th aspect of the invention, an electronic camera comprises: an image-capturing unit with variable image-capturing sensitivity, which captures an image of a subject through a photographic lens; a brightness detection unit that detects a subject brightness; a first calculation unit that calculates an ambient light over/under extent by using an image-capturing sensitivity set for the image-capturing unit, an exposure time length set for an image-capturing operation, an aperture value set for the image-capturing operation and the subject brightness having been detected; a second calculation unit that calculates a main flash quantity to be achieved at a flash unit which illuminates the subject during the image-capturing operation; a third calculation unit that calculates a correction quantity indicating an extent by which the currently set image-capturing sensitivity should be corrected so as to achieve optimal exposure of the subject with a main flash quantity within a variable flash quantity range if the main flash quantity having been calculated by the second calculation unit is outside the variable flash quantity range of the flash unit; and a sensitivity adjusting unit that adjusts the currently set image-capturing sensitivity based upon the correction quantity having been calculated by the third calculation unit and the ambient light over/under extent having been calculated by the first calculation unit.

According to the 9th aspect of the invention, in the electronic camera according to the 8th aspect, it is preferred that: there is further provided a reflected light detection unit that detects reflected light from the subject when the flash unit executes a preliminary flash emission; and the second calculation unit calculates the main flash quantity needed for an image-capturing operation based upon a detection signal obtained at the reflected light detection unit during the preliminary flash emission and the image-capturing sensitivity currently set for the image-capturing unit.

According to the 10th aspect of the invention, in the electronic camera according to the 8th aspect, it is preferred that if the correction quantity indicates an increase from the currently set image-capturing sensitivity, the sensitivity adjusting unit adjusts the image-capturing sensitivity by restricting an extent of change in the image-capturing sensitivity in correspondence to the ambient light over/under extent.

According to the 11th aspect of the invention, in the electronic camera according to the 8th aspect, it is preferred that if the correction quantity indicates an increase from the currently set image-capturing sensitivity and the ambient light over/under extent indicates that sufficient ambient light is available, the sensitivity adjusting unit does not alter the image-capturing sensitivity.

According to the 12th aspect of the invention, in the electronic camera according to the 8th aspect, it is preferred that if the correction quantity indicates an increase from the currently set image-capturing sensitivity and an extent of ambient light insufficiency indicated by the ambient light over/under extent is smaller than an extent of under-exposure corresponding to the correction quantity, the sensitivity adjusting unit adjusts the image-capturing sensitivity based upon the ambient light over/under extent.

According to the 13th aspect of the invention, in the electronic camera according to the 8th aspect, it is preferred that if the correction quantity indicates an increase from the currently set image-capturing sensitivity and an extent of ambient light insufficiency indicated by the ambient light over/under extent is greater than an extent of under-exposure corresponding to the correction quantity, the sensitivity adjusting unit adjusts the image-capturing sensitivity based upon the correction quantity.

According to the 14th aspect of the invention, in the electronic camera according to the 8th aspect, it is preferred that: the second calculation unit corrects the main flash quantity in correspondence to a flash control correction quantity currently set at the camera; and the third calculation unit corrects the correction quantity in correspondence to the currently set flash control correction quantity.

DESCRIPTION OF PREFERRED EMBODIMENTS

The following is an explanation of the preferred embodiments of the present invention, given in reference to the drawings.

First Embodiment

Figure 1:
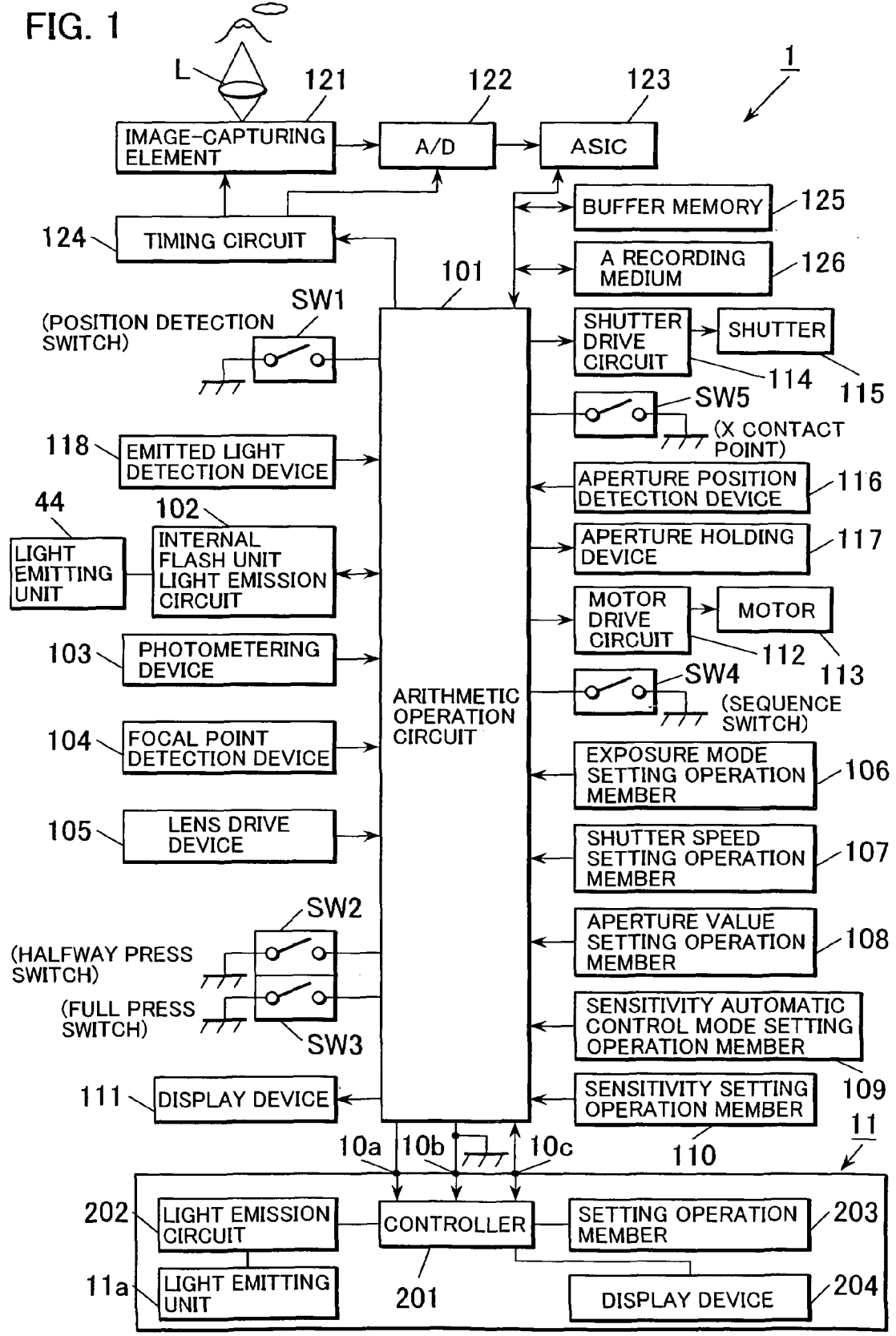
FIG. 1 is a block diagram of the structure adopted in the electronic camera achieved in a first embodiment of the present invention.

FIG. 1 is a block diagram of the structure adopted in an electronic camera 1 achieved in the first embodiment of the present invention. The electronic camera 1 includes an internal flash unit, and an external flash unit 11 is mounted at an accessory shoe (not shown). An arithmetic operation circuit 101 is constituted with a microcomputer and the like. The arithmetic operation circuit 101 executes specific arithmetic operations by using signals input thereto from various blocks to be explained later and outputs control signals generated based upon the arithmetic operation results to the individual blocks. The arithmetic operation circuit 101 further includes a communication circuit (not shown) which enables the arithmetic operation circuit 101 to communicate with the external flash unit 11.

An image-capturing element 121 is constituted with a CCD image sensor or the like. The image-capturing element 121 captures an image formed with subject light having passed through an interchangeable lens L used for photographing operations and outputs an image-capturing signal to an A/D conversion circuit 122. The A/D conversion circuit 122 converts the analog image-capturing signal to a digital signal. The image-capturing element 121 and the A/D conversion circuit 122 are driven so as to operate with specific timing by drive signals output from a timing circuit 124.

An image processing circuit 123 may be constituted with an ASIC or the like. In addition to executing image processing such as white balance processing on image data resulting from the digital conversion, the image processing circuit 123 executes compression processing for compressing the image data having undergone the image processing in a predetermined format, decompression processing for decompressing compressed image data and the like. In a buffer memory 125, image data to be processed at the image processing circuit 123 are temporarily stored. A recording medium 126 may be a detachable memory card that can be loaded into and unloaded from the camera freely, for instance. The image data having undergone the image processing are recorded into the recording medium 126.

A position detection switch SW1 is a micro switch that detects the position of the internal flash unit (not shown), i.e., whether it is at a storage position or it has been popped up to an operating position by a pop-up mechanism (not shown). One end of the position detection switch SW1 is grounded, whereas another end of the position detection switch is connected to an input port of the arithmetic operation circuit 101. The position detection switch SW1 outputs an ON signal when the internal flash unit is at the operating position and outputs an OFF signal when the internal flash unit is at the storage position.

An emitted light quantity detection device 118 detects the quantity of light emitted at a light emitting unit 44 of the internal flash unit and outputs a detection signal to the arithmetic operation circuit 101. The emitted light quantity detection is achieved by executing time integration of a light receiving signal generated upon receiving the light having been initially emitted by the internal flash unit (or the external flash unit 11) and then having been reflected at the subject.

The light emitting unit 44 is a light emitting element in the internal flash unit. An internal flash unit light emission circuit 102 executes light emission control by issuing a light emission start instruction and a light emission stop instruction for the light emitting unit 44 in response to commands from the arithmetic operation circuit 101. The internal flash unit light emission circuit 102, which includes a charge circuit (not shown), starts a charge upon receiving a command from the arithmetic operation circuit 101 and outputs a complete signal as the charge is completed.

A photometering device 103 detects the quantity of subject light passing through the photographic lens L and outputs a detection signal to the arithmetic operation circuit 101. The photometering device 103 adopts a structure which enables detection of the quantities of light corresponding to, for instance, five divided areas of the photographic field. The aperture value of the photographic lens L is F2.8 (AV=3). A focal point detection device 104 detects the state of the adjustment of the focal point position achieved with the photographic lens L and outputs a detection signal to the arithmetic operation circuit 101.

A lens drive device 105 adjusts the focal point position of the photographic lens L by driving a focus lens (not shown) in the photographic lens L forward/backward along the optical axis in response to a command issued by the arithmetic operation circuit 101.

A halfway press switch SW2 interlocks with a shutter release operation button (not shown) and outputs a halfway press operation signal to the arithmetic operation circuit 101. The halfway press operation signal enters an ON state as the shutter release operation button is pressed down approximately halfway relative to its full stroke and shifts into an OFF state when the shutter release operation button having been held at the halfway position is released. A full press switch SW3 interlocks with the shutter release operation button (not shown) and outputs a full press operation signal to the arithmetic operation circuit 101. The full press operation signal enters an ON state as the shutter release operation button is pressed down to the full stroke position and shifts into an OFF state when the shutter release operation button having been held down at the full stroke position is released.

A display device 111 displays photographing information such as the current settings for the exposure mode, the sensitivity, the shutter speed and the aperture in response to a command from the arithmetic operation circuit 101.

The front curtain and the rear curtain (not shown) at a shutter 115 are held and released independently of each other under control implemented by a shutter drive circuit 114. An X contact point switch SW5 enters an ON state and outputs an ON signal as the front curtain at the shutter 115 completes its run, and enters an OFF state and outputs an OFF signal halfway through a charge of the shutter 115. An aperture position detection device 116 detects the aperture position corresponding to the aperture value and outputs a detection signal to the arithmetic operation circuit 101. An aperture holding device 117 stops the aperture being driven and holds the aperture at the position corresponding to a specific aperture value.

A motor drive circuit 112 implements drive control on a sequence motor 113 in response to a command from the arithmetic operation circuit 101. The sequence motor 113, which constitutes a sequence drive device (not shown), raises/lowers a mirror (not shown), drives the aperture (not shown), charges the shutter 115 and the like. A sequence switch SW4, which is also part of the sequence drive device mentioned above, generates, for instance, the timing with which braking of the sequence motor 113 is controlled.

An exposure mode setting operation member 106 outputs an operation signal to the arithmetic operation circuit 101 in response to an exposure mode setting operation. Based upon the exposure mode setting operation signal input thereto, the arithmetic operation circuit 101 selects a program automatic exposure mode (P mode), a shutter speed priority automatic exposure mode (S mode), an aperture priority automatic exposure mode (A mode) or a manual exposure mode (M mode).

A shutter speed setting operation member 107 outputs an operation signal to the arithmetic operation circuit 101 in response to a shutter speed setting operation. If the S mode or the M mode is currently selected for the exposure mode, the arithmetic operation circuit 101 adjusts the shutter speed setting TVs based upon the shutter speed setting operation signal input thereto. The apex value setting range may be, for instance, $-5 \leq TVs \leq 13$, i.e., 30 sec to 1/8000 sec.

An aperture value setting operation member 108 outputs an operation signal to the arithmetic operation circuit 101 in response to an aperture value setting operation. When the A mode or the M mode is currently set for the exposure mode, the arithmetic operation circuit 101 adjusts the aperture value setting AVs based upon the aperture value setting operation signal input thereto. The apex value setting range may be, for instance, $3 \leq AVs \leq 9$, i.e., F2.8 to F22.

A sensitivity automatic control mode setting operation member 109 outputs an operation signal to the arithmetic operation circuit 101 in response to a setting operation. Based upon the sensitivity automatic control mode setting operation signal input thereto, the arithmetic operation circuit 101 sets and clears a sensitivity automatic control mode. The sensitivity automatic control mode is an operation mode in which the control exposure is calculated by automatically adjusting the image-capturing sensitivity SV (exposure sensitivity) in correspondence to an exposure deviation ΔEV or the extent of excess or deficiency of the light emitted by the flash unit so as to achieve optimal exposure. The exposure deviation ΔEV represents the difference between the control exposure and the optimal exposure. When the sensitivity automatic control mode is not in effect, the control exposure is calculated so as to achieve the optimal exposure at the current image-capturing sensitivity setting SV.

A sensitivity setting operation member 110 outputs an operation signal to the arithmetic operation circuit 101 in response to an image-capturing sensitivity setting operation. The arithmetic operation circuit 101 adjusts the setting for the image-capturing sensitivity at the image-capturing element 121 based upon the image-capturing sensitivity setting operation signal input thereto. The image-capturing sensitivity may be selected in specific steps within a range equivalent to, for instance, ISO 100 to ISO 1600.

The external flash unit 11 includes a controller 201, a light emission circuit 202, a light emitting unit 11a, a setting operation member 203 and a display device 204. As the external flash unit 11 is mounted at the accessory shoe (not shown) at the camera body 1, the arithmetic operation circuit 101 at the camera body 1 and the external flash unit 11 become connected through contact point terminals 10a, 10b and 10c. The contact point terminal 10a is a terminal for an X contact point signal generated through the X contact point switch SW5. The X contact point signal is output to the controller 201 via the contact point terminal 10a while a signal output is allowed by the arithmetic operation circuit 101 but is not output to the controller 201 if the signal output is prohibited. The contact point terminal 10b is a GND terminal provided to equalize the electrical ground potentials at the camera body 1 and the external flash unit 11. The contact point terminal 10c is a communication terminal through which the camera body 1 and the external flash unit 11 communicate with each other.

The controller 201 is constituted with a microcomputer and the like. The controller 201 executes specific arithmetic operations by using signals input thereto from various blocks in the external flash unit 11 and outputs control signals generated based upon the arithmetic operation results to the individual blocks in the external flash unit 11. In addition, the controller 201 engages in communication with the arithmetic operation circuit 101 via the contact point terminal 10c to receive a preliminary light emission instruction and a signal indicating the flash quantity (or flash output value) from the arithmetic operation circuit 101 and also to transmit a signal indicating the specific light emission mode set at the external flash unit 11 and signal indicating the bounce condition and the like. The controller 201 also issues a light emission instruction for the light emission circuit 202 upon receiving an X contact point ON signal input thereto via the contact point terminal 10a.

The light emission circuit 202 implements light emission control by issuing a light emission start instruction and a light emission stop instruction for the light emitting unit 11a of the external flash unit 11 in response to commands issued by the controller 201. The light emission circuit 202, which includes a charge circuit (not shown), starts a charge upon receiving a charge start operation signal from the setting operation member 203 and outputs a complete signal to the controller 201 as the charge is completed.

The setting operation member 203 is a switch through which the charge start instruction is issued, the light emission mode is set and the like. A display indicating the charge state of the external flash unit 11 is brought up at the display device 204. In addition, information indicating the current light emission mode setting is displayed at the display device 204.

The feature characterizing the present invention is the exposure control implemented when the electronic camera 1 is set in the sensitivity automatic control mode, and more specifically, it is characterized in that the exposure calculation is re-executed with the sensitivity adjusted when a flash unit is utilized.

Figure 2:
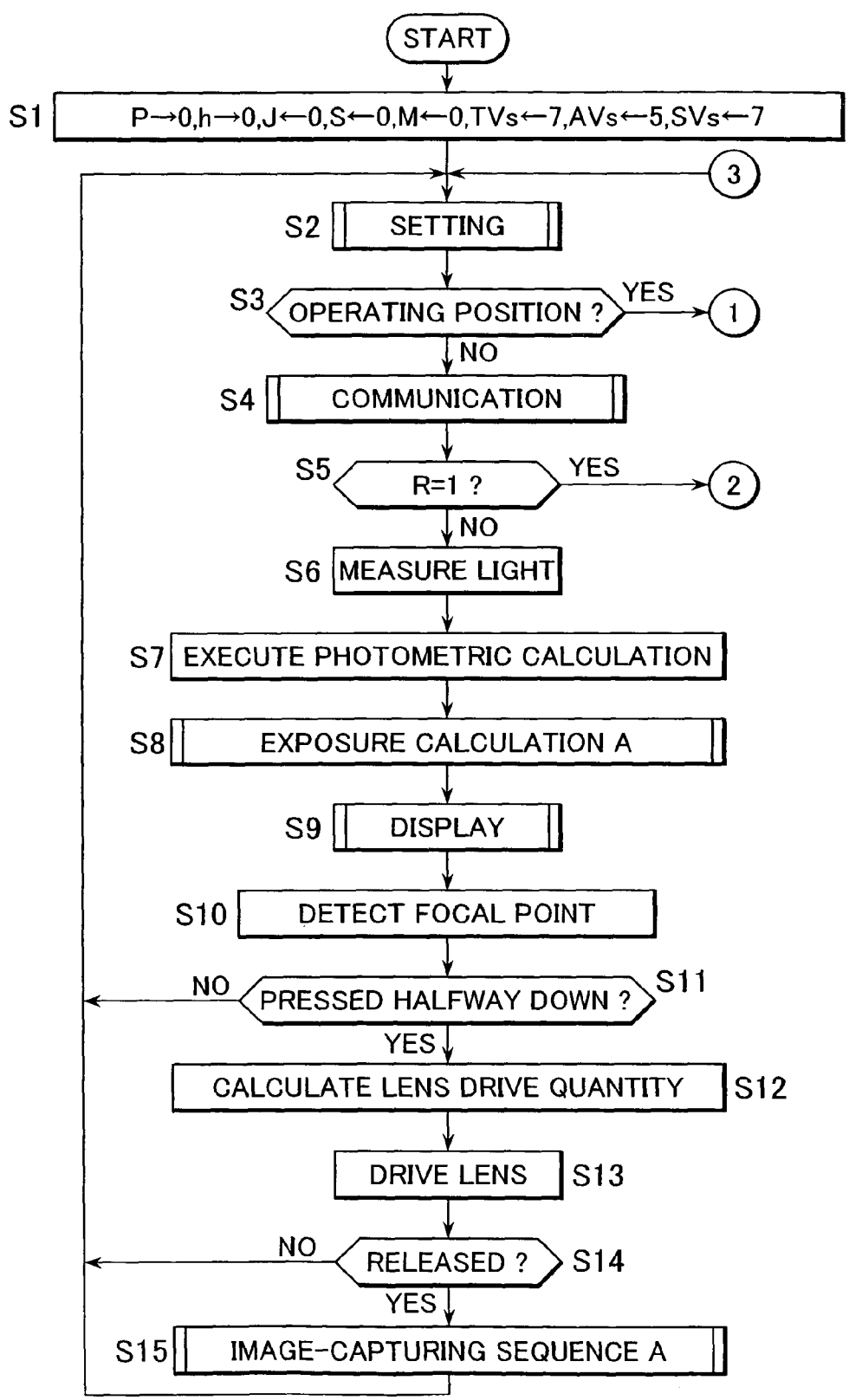
FIG. 2 presents a flowchart of the camera operation processing.
Figure 3:
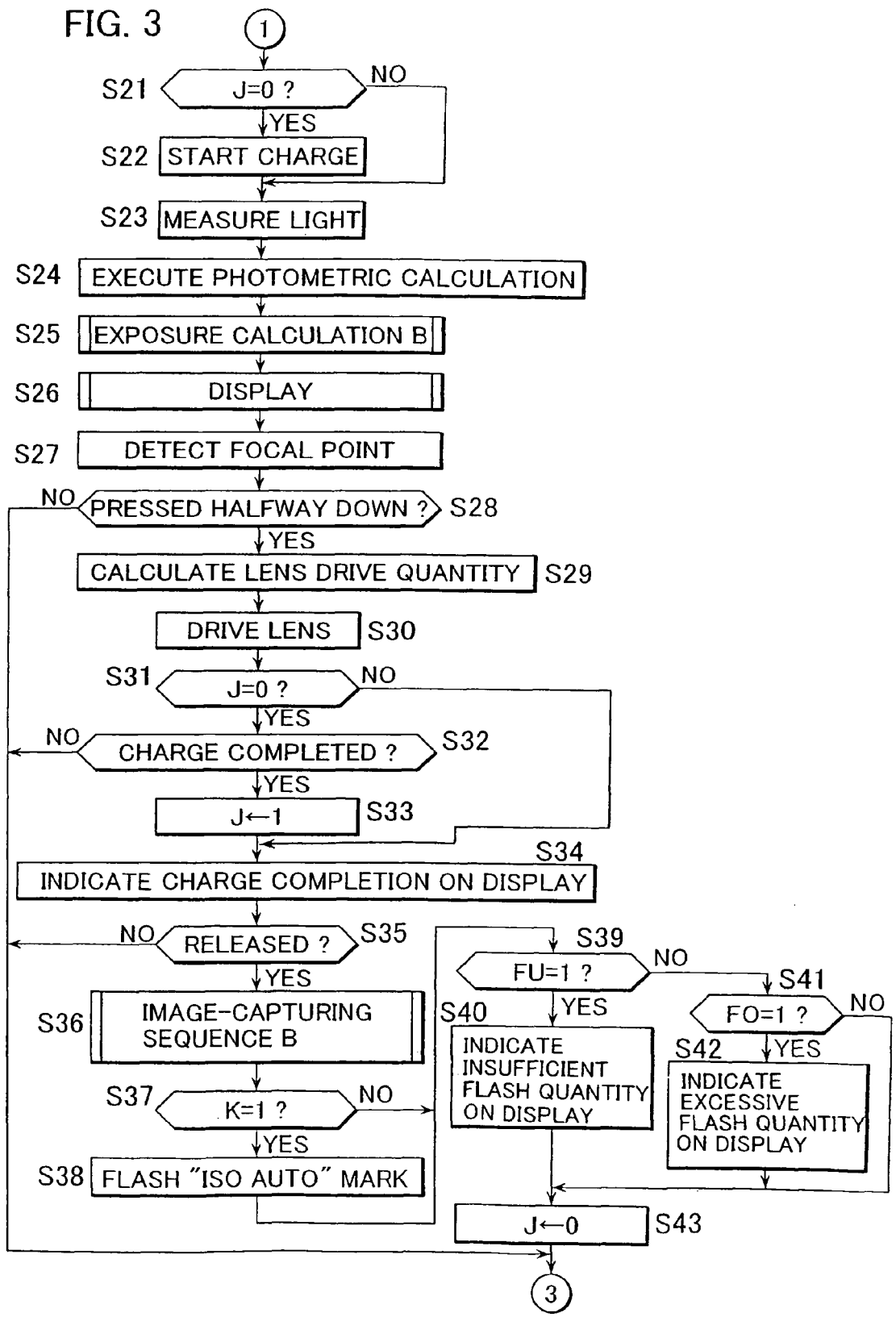
FIG. 3 presents a flowchart of the camera operation processing.
Figure 4:
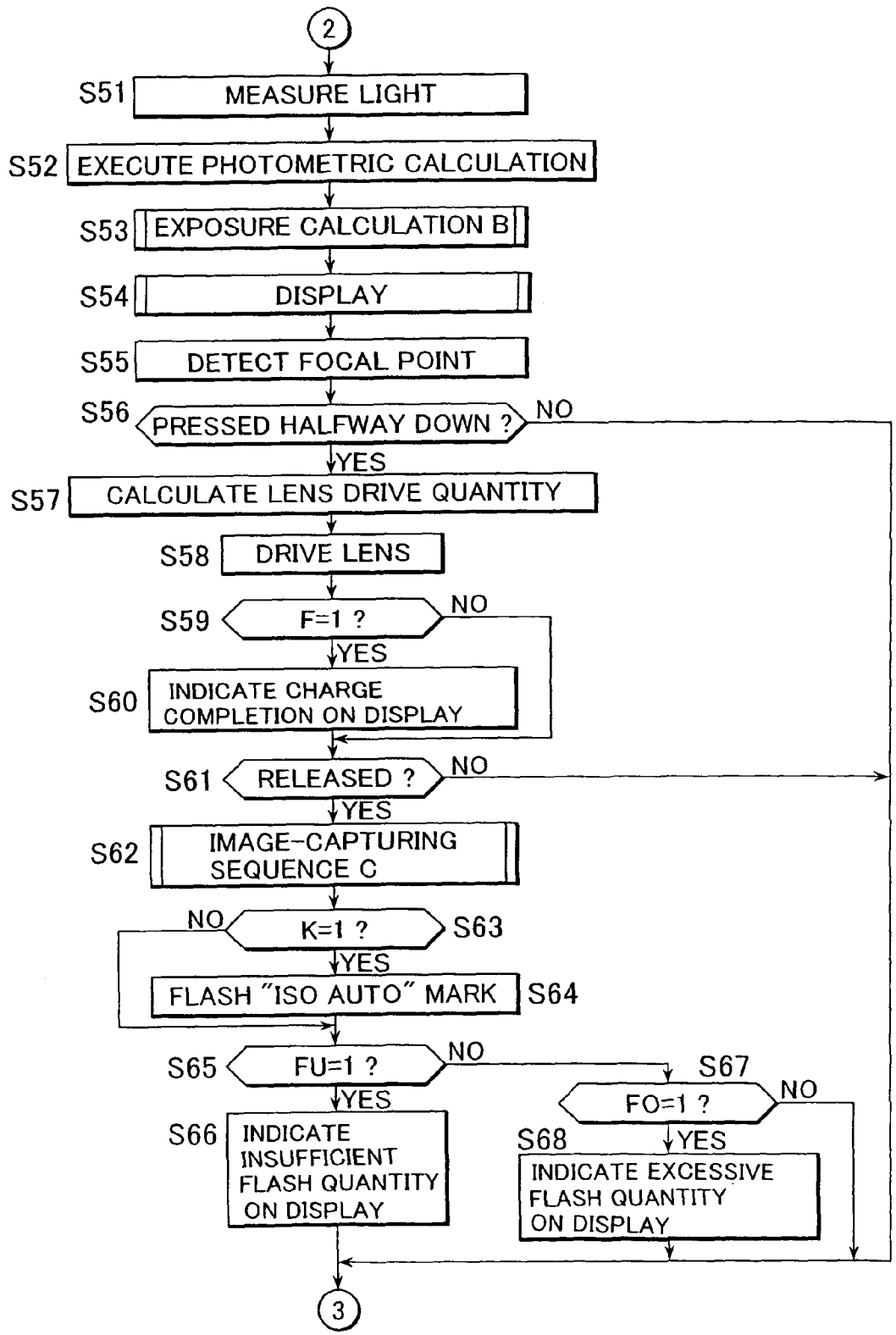
FIG. 4 presents a flowchart of the camera operation processing.

The camera operation processing executed by the arithmetic operation circuit 101 in the electronic camera 1 is now explained in reference to the flowchart presented in FIGS. 2 through 4. The program in conformance to which the processing in the flowchart in FIGS. 2 through 4 is executed is started up as a battery (now shown) is loaded into the electronic camera 1. The electronic camera 1 engages in the following three primary operations.

1. The operation executed without utilizing the internal flash unit when the external flash unit 11 is not mounted at the camera body 1.
2. The operation executed by utilizing the internal flash unit regardless of whether or not the external flash unit 11 is mounted at the camera body 1.
3. The operation executed by utilizing the external flash unit mounted at the camera body 1 without utilizing the internal flash unit.

The processing flows in FIGS. 2 through 4 respectively correspond to cases 1 through 3 described above.

In step S1 in FIG. 2, the arithmetic operation circuit 101 executes an initial reset by setting a flag P to 0, a main flash quantity h for the external flash unit 11 to 0, a charge flag J to 0, a sensitivity automatic control mode flag F to 0, a mode parameter M to 0, the shutter speed setting TVs to 7 ($\frac{1}{125}$ sec), the aperture value setting AVs to 5 (F5.6) and the sensitivity setting SVs to 7 (equivalent to ISO 400), and then the operation proceeds to step S2. The flag P used to issue a preliminary light emission instruction for the external flash unit 11 indicates that a preliminary light emission is to be executed when it is set to 1 and indicates that no preliminary light emission is to be executed when it is set to 0. The preliminary light emission may be referred to as a pre-light emission or a preliminary flash emission instead. Based upon the light emitted in the preliminary light emission, which is executed for purposes of flash control, the flash quantity h to be emitted in the main light emission during the photographing operation (during the charge storage) is determined through arithmetic operation.

The charge flag J is set to 1 when the charge at the internal flash unit light emission circuit 102 is completed and is set to 0 if the charge is not completed yet. The sensitivity automatic control mode flag S is set to 1 when the sensitivity automatic control mode is selected and is set to 0 when the sensitivity automatic control mode is cleared. The mode parameter M is set to 0 when the P mode is selected, is set to 1 when the S mode is selected, is set to 2 when the A mode is selected and is set to 3 when the M mode is selected. The apex value range of the image-capturing sensitivity setting SVs in the electronic camera achieved in the first embodiment is $5 \leq SVs \leq 9$ (equivalent to ISO 100 to ISO 1600).

In step S2, the arithmetic operation circuit 101 executes setting processing before proceeding to step S3. The setting processing is to be explained in detail later. In step S3, the arithmetic operation circuit 101 makes a decision as to whether or not the light emitting unit 44 of the internal flash unit is at the operating position. The arithmetic operation circuit to 101 makes a negative decision in step S3 if an OFF signal has been input from the position detection switch SW1 to proceed to step S4, whereas it makes an affirmative decision in step S3 if an ON signal has been input from the position detection switch SW1 to proceed to step S21 in FIG. 3. The operation proceeds to step S4 when the internal flash unit is at the storage position, whereas the operation proceeds to step S21 if the internal flash unit has been popped up to the operating position. If the internal flash unit is at the storage position, the arithmetic operation circuit 101 does not issue a light emission instruction for the internal flash unit light emission circuit 102 (does not allow light to be emitted).

In step S4, the arithmetic operation circuit 101 executes communication processing to engage in communication with the controller 201 at the external flash unit 11, and then the operation proceeds to step S5. The communication processing is to be explained in detail later.

In step S5, the arithmetic operation circuit 101 makes a decision as to whether or not a flag R is currently set to 1. The flag R is set to 1 if communication has been achieved through the communication processing and is set to 0 if communication has not been achieved. The arithmetic operation circuit 101 makes a negative decision in step S5 if R=0 to proceed to step S6, whereas it makes an affirmative decision in step S5 if R=1 to proceed to step S51 in FIG. 4. The operation proceeds to step S6 if the external flash unit 11 having a communication function is not mounted at the camera body 1, whereas the operation proceeds to step S51 if the external flash unit 11 with the communication function is mounted at the camera body 1.

(When Neither Flash Unit is Utilized)

The processing executed in steps S6 through S15 corresponds to case 1 described above. In step S6, the arithmetic operation circuit 101 receives detection signals (photometering signals) input from the photometering device 103, and then the operation proceeds to step S7. In step S7, the arithmetic operation circuit 101 executes a photometric arithmetic operation by determining the quantities of light having been transmitted through the lens (BVi−3) based upon the detection signals corresponding to the individual areas defined by dividing the photographic field to calculate the subject brightness BV, and then the operation proceeds to step S8. BVi indicates the subject brightness in each area. 3 is subtracted from the value representing BVi since the light is measured through the photographic lens L with the open aperture value of F2.8 (apex value AV=3). By executing an arithmetic operation of the known art based upon the subject brightness levels BVi in the individual areas, the arithmetic operation circuit 101 determines the subject brightness BV.

In step S8, the arithmetic operation circuit 101 executes processing for exposure calculation A before proceeding to step S9. The exposure calculation processing A is to be explained in detail later. In step S9, the arithmetic operation circuit 101 executes display processing for the display device 111 and the operation proceeds to step S10. The display processing is to be described in detail later.

In step S10, the arithmetic operation circuit 101 outputs a command for the focal point detection device 104 to detect the state of the focal point position adjustment achieved with the photographic lens L. The arithmetic operation circuit 101 then calculates a defocusing quantity representing the extent of defocusing of the focus lens based upon the results of the detection executed by the focal point detection device 104 and then the operation proceeds to step S11.

In step S11, the arithmetic operation circuit 101 makes a decision as to whether or not a halfway press operation has been performed. The arithmetic operation circuit 101 makes an affirmative decision in step S11 if an operation signal has been input from the halfway press switch SW2 to proceed to step S12, whereas it makes a negative decision in step S11 if no operation signal has been input from the halfway press switch SW2 to return to step S2.

In step S12, the arithmetic operation circuit 101 calculates a lens drive quantity based upon the defocusing quantity and then the operation proceeds to step S13. In step S13, the arithmetic operation circuit 101 outputs a command for the lens drive device 105 to drive the focus lens in the photographic lens L by the lens drive quantity calculated in step S12 so as to set the focus lens at a focus match position, before proceeding to step S14.

In step S14, the arithmetic operation circuit 101 makes a decision as to whether or not a full press operation (a shutter release) has been performed. The arithmetic operation circuit 101 makes an affirmative decision in step S14 if an operation signal has been input from the full press switch SW3 to proceed to step S15, whereas it makes a negative decision in step S14 if no operation signal has been input from the full press switch SW3 to return to step S2.

In step S14, the arithmetic operation circuit 101 executes image-capturing sequence processing A, and then the operation returns to step S2. The sequence of the photographing processing thus ends. The processing executed for the image-capturing sequence A is to be explained in detail later.

Figure 5:
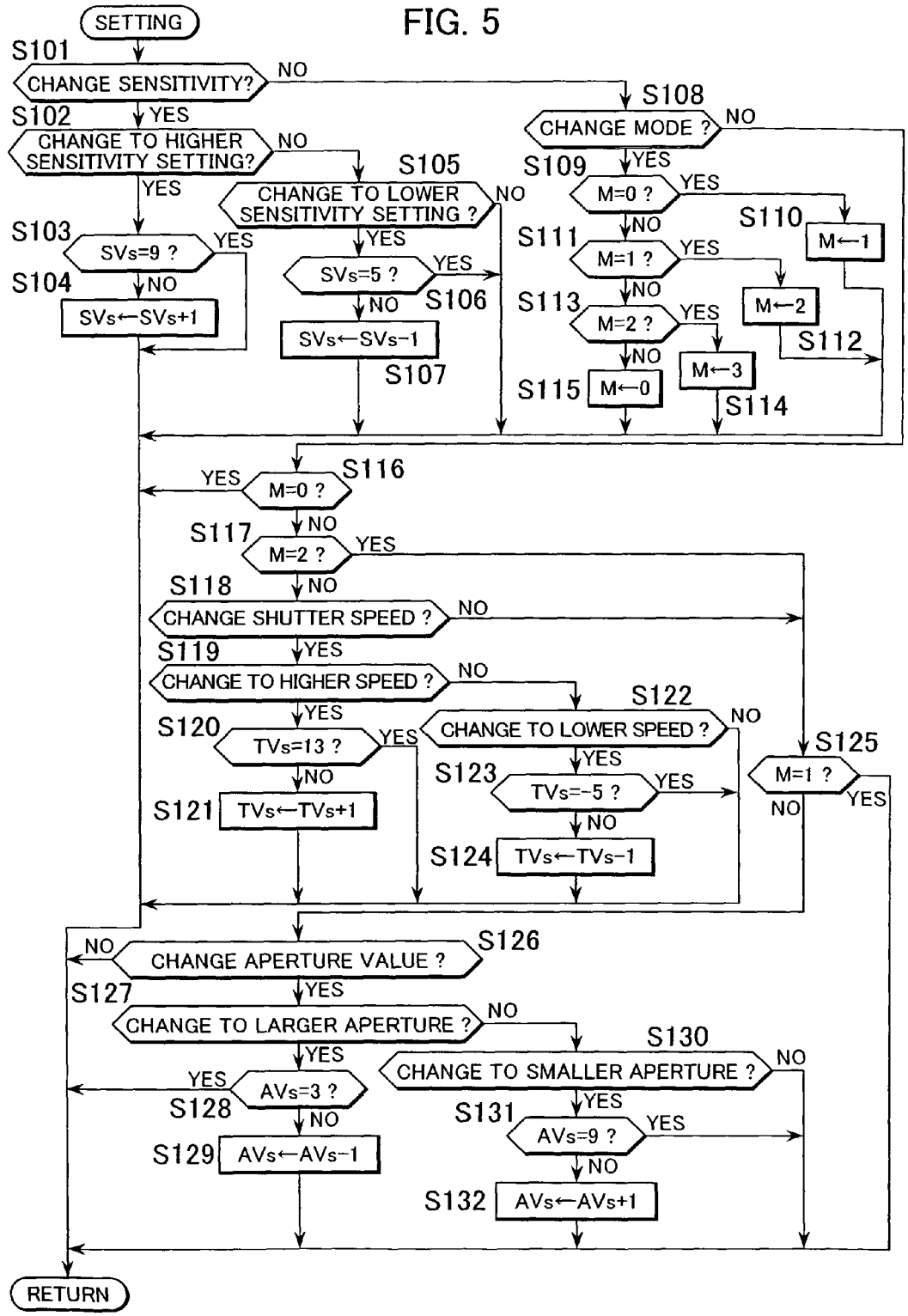
FIG. 5 presents a detailed flowchart of the setting processing.

The setting processing is now explained in detail in reference to a flowchart presented in FIG. 5. In step S101 in FIG. 5, the arithmetic operation circuit 101 makes a decision as to whether or not a sensitivity change operation has been performed. The arithmetic operation circuit 101 makes an affirmative decision in step S101 if an operation signal has been input from the sensitivity setting operation member 110 to proceed to step S102, whereas it makes a negative decision in step S101 if no operation signal has been input from the sensitivity setting operation member 110 to proceed to step S108.

In step S102, the arithmetic operation circuit 101 makes a decision as to whether or not the sensitivity is to be adjusted to a higher setting. The arithmetic operation circuit 101 makes an affirmative decision in step S102 if the operation signal from the sensitivity setting operation member 110 indicates a sensitivity increase to proceed to step S103, whereas it makes a negative decision in step S102 if the operation signal does not indicate a sensitivity increase to proceed to step S105.

In step S103, the arithmetic operation circuit 101 makes a decision as to whether or not the preadjustment SVs is 9. The arithmetic operation circuit 101 makes an affirmative decision in step S103 if SVs=9 (if the image-capturing sensitivity setting is equivalent to ISO 1600) to end the setting processing and proceed to step S3 in FIG. 2. In this situation, the sensitivity is set at the upper limit in the sensitivity setting range and thus, the setting processing ends without further increasing the sensitivity. If, on the other hand, SVs≠9, the arithmetic operation circuit 101 makes a negative decision in step S103 to proceed to step S104. In step S104, the arithmetic operation circuit 101 increments the image-capturing sensitivity setting SVs by 1 before ending the setting processing and proceeding to step S3 in FIG. 2. As a result, the image-capturing sensitivity setting is raised by one step.

In step S105, the arithmetic operation circuit 101 makes a decision as to whether or not the sensitivity is to be adjusted to a lower setting. The arithmetic operation circuit 101 makes an affirmative decision in step S105 if the operation signal from the sensitivity setting operation member 110 indicates a sensitivity decrease to proceed to step S106. However, it makes a negative decision in step S105 if the operation signal does not indicate a sensitivity decrease to end the setting processing and proceed to step S3 in FIG. 2.

In step S106, the arithmetic operation circuit 101 makes a decision as to whether or not the preadjustment SVs is 5. The arithmetic operation circuit 101 makes an affirmative decision in step S106 if SVs=5 (if the image-capturing sensitivity setting was equivalent to ISO 100) to end the setting processing and proceed to step S3 in FIG. 2. In this situation, the sensitivity is set at the lower limit in the sensitivity setting range and thus, the setting processing ends without further decreasing the sensitivity. If, on the other hand, SVs≠5, the arithmetic operation circuit 101 makes a negative decision in step S106 to proceed to step S107. In step S107, the arithmetic operation circuit 101 decrements the image-capturing sensitivity setting SVs by 1 before ending the setting processing and proceeding to step S3 in FIG. 2. As a result, the image-capturing sensitivity setting is lowered by one step.

In step S108 to which the operation proceeds after making a negative decision in step S101 as described above, the arithmetic operation circuit 101 makes a decision as to whether or not an exposure mode change operation has been performed. The arithmetic operation circuit 101 makes an affirmative decision in step as 108 if an operation signal has been input from the exposure mode setting operation member 106 to proceed to step S109, whereas it makes a negative decision in step S108 if no operation signal has been input from the exposure mode setting operation member 106 to proceed to step S116.

In step S109, the arithmetic operation circuit 101 makes a decision as to whether or not the exposure mode setting prior to the change is the P mode. The arithmetic operation circuit 101 makes an affirmative decision in step S109 if M=0 (program automatic exposure mode) to proceed to step S110, whereas it makes a negative decision in step S109 if M≠0 to proceed to step S111. In step S110, the arithmetic operation circuit 101 sets the mode parameter M to 1 (S mode) before ending the setting processing and proceeding to step S3 in FIG. 2.

In step S111, the arithmetic operation circuit 101 makes a decision as to whether or not the exposure mode setting prior to the change is the S mode. The arithmetic operation circuit to 101 makes an affirmative decision in step S111 if M=1 (shutter speed priority automatic exposure mode) to proceed to step S112, whereas it makes a negative decision in step S111 if M≠1 to proceed to step S113. In step S112, the arithmetic operation circuit 101 sets the mode parameter M to 2 (A mode) before ending the setting processing and proceeding to step S3 in FIG. 2.

In step S113, the arithmetic operation circuit 101 makes a decision as to whether or not the exposure mode setting prior to the change is the A mode. The arithmetic operation circuit to 101 makes an affirmative decision in step S113 if M=2 (aperture priority automatic exposure mode) to proceed to step S114, whereas it makes a negative decision in step S113 if M≠2 to proceed to step S115. In step S114, the arithmetic operation circuit 101 sets the mode parameter M to 3 (M mode) before ending the setting processing and proceeding to step S3 in FIG. 2.

In step S115, the arithmetic operation circuit 101 sets the mode parameter M to 0 (P mode) before ending the setting processing and proceeding to step S3 in FIG. 2. Through the processing executed in steps S109 through S115 as described above, the exposure mode is cyclically changed in the order; P->S->A->M->P . . . , each time the exposure mode setting operation member 106 is operated.

In step S116 to which the operation proceeds after making a negative decision in step S108, the arithmetic operation circuit 101 makes a decision as to whether or not the P mode is currently selected. The arithmetic operation circuit 101 makes an affirmative decision in step S116 if M=0 to end the setting processing and proceed to step S3 in FIG. 2. In this situation, no setting operation for the shutter speed or the aperture value is executed. If M≠0, the arithmetic operation circuit 101 makes a negative decision in step S116 to proceed to step S117.

In step S117, the arithmetic operation circuit 101 makes a decision as to whether or not the A mode is currently selected. The arithmetic operation circuit 101 makes an affirmative in step S117 if M=2 to proceed to step S125. In this case, no setting operation for the shutter speed is executed. The arithmetic operation circuit 101 makes a negative decision in step S117 if M≠2 to proceed to step S118.

In step S118, the arithmetic operation circuit 101 makes a decision as to whether or not a shutter speed change operation has been performed. The arithmetic operation circuit 101 makes an affirmative decision in step S118 if an operation signal has been input from the shutter speed setting operation member 107 to proceed to step S119, whereas it makes a negative decision in step S118 if no operation signal has been input from the shutter speed setting operation member 107 to proceed to step S125.

In step S119, the arithmetic operation circuit 101 makes a decision as to whether or not the shutter speed is to be adjusted to a higher speed setting. The arithmetic operation circuit 101 makes an affirmative decision in step S119 if the operation signal from the shutter speed setting operation member 107 indicates a higher speed setting to proceed to step S120, whereas it makes a negative decision in step S119 if the operation signal does not indicate a higher speed setting to proceed to step S122.

In step S120, the arithmetic operation circuit 101 makes a decision as to whether or not the pre-adjustment TVs setting is 13. The arithmetic operation circuit 101 makes an affirmative decision in step S120 if TVs=13 (the shutter speed setting is 1/8000 sec) to end the setting processing and proceed to step S3 in FIG. 2. In this case, the shutter speed setting is at the upper limit of the shutter speed setting range and thus, the setting processing ends without further raising the shutter speed. If, on the other hand, TVs≠13, the arithmetic operation circuit 101 makes a negative decision in step S120 to proceed to step S121. In step S121, the arithmetic operation circuit 101 increments the shutter speed setting TVs by 1 before ending the setting processing and proceeding to step S3 in FIG. 2. As a result, the shutter speed setting is adjusted to a higher speed setting by one step.

In step S122, the arithmetic operation circuit 101 makes a decision as to whether or not the shutter speed is to be adjusted to a lower speed setting. The arithmetic operation circuit 101 makes an affirmative decision in step S122 if the operation signal from the shutter speed setting operation member 107 indicates a lower speed setting to proceed to step S123. However, it makes a negative decision in step S122 if the operation signal does not indicate a lower speed setting to end the setting processing and proceed to step S3 in FIG. 2.

In step S123, the arithmetic operation circuit 101 makes a decision as to whether or not the pre-adjustment TVs setting is −5. The arithmetic operation circuit 101 makes an affirmative decision in step S123 if TVs=−5 (the shutter speed setting is 30 sec) to end the setting processing and proceed to step S3 in FIG. 2. In this case, the shutter speed setting is at the lower limit of the shutter speed setting range and thus, the setting processing ends without further lowering the shutter speed. If, on the other hand, TVs≠−5, the arithmetic operation circuit 101 makes a negative decision in step S123 to proceed to step S124. In step S124, the arithmetic operation circuit 101 decrements the shutter speed setting TVs by 1 before ending the setting processing and proceed to step S3 in FIG. 2. As a result, the shutter speed setting is adjusted to a lower speed setting by one step.

In step S125, the arithmetic operation circuit 101 makes a decision as to whether or not the S mode is currently selected. The arithmetic operation circuit 101 makes an affirmative in step S125 if M=1 to end the setting processing and proceed to step S3 in FIG. 2. In this case, no setting operation for the aperture value is executed. The arithmetic operation circuit 101 makes a negative decision in step S125 if M≠1 to proceed to step S126.

In step S126, the arithmetic operation circuit 101 makes a decision as to whether or not an aperture value change operation has been performed. The arithmetic operation circuit 101 makes an affirmative decision in step S126 if an operation signal has been input from the aperture value setting operation member 108 to proceed to step S127, whereas it makes a negative decision in step S126 if no operation signal has been input from the aperture value setting operation member 108 to end the setting processing and proceed to step S3 in FIG. 2.

In step S127, the arithmetic operation circuit 101 makes a decision as to whether or not the aperture value is to be adjusted toward a more open setting. The arithmetic operation circuit 101 makes an affirmative decision in step S127 if the operation signal from the aperture value setting operation member 108 indicates an adjustment to the open side to proceed to step S128, whereas it makes a negative decision in step S127 if the operation signal does not indicate an adjustment toward a more open setting to proceed to step S130.

In step S128, the arithmetic operation circuit 101 makes a decision as to whether or not the pre-adjustment AVs setting is 3. The arithmetic operation circuit 101 makes an affirmative decision in step S128 if AVs=3 (the aperture value setting is F2.8) to end the setting processing and proceed to step S3 in FIG. 2. In this case, the aperture value is set at the upper limit of the aperture value setting range and thus, the setting processing ends without further adjustment. If, on the other hand, AVs≠3, the arithmetic operation circuit 101 makes a negative decision in step S128 to proceed to step S129. In step S129, the arithmetic operation circuit 101 decrements the aperture value setting AVs by 1 before ending the setting processing and proceeding to step S3 in FIG. 2. As a result, the aperture value setting is adjusted toward the open side by one step.

In step S130, the arithmetic operation circuit 101 makes a decision as to whether or not the aperture value is to be adjusted for a smaller opening. The arithmetic operation circuit 101 makes an affirmative decision in step S130 if the operation signal from the aperture value setting operation member 108 indicates a smaller opening to proceed to step S131. However, it makes a negative decision in step S130 if the operation signal does not indicate a smaller opening to end the setting processing and proceed to step S3 in FIG. 2.

In step S131, the arithmetic operation circuit 101 makes a decision as to whether or not the pre-adjustment AVs setting is 9. The arithmetic operation circuit 101 makes an affirmative decision in step S131 if AVs=9 (the aperture value setting is F22) to end the setting processing and proceed to step S3 in FIG. 2. In this case, the aperture value is set at the lower limit of the aperture value setting range and thus, the setting processing ends without further adjustment. If, on the other hand, AVs≠9, the arithmetic operation circuit 101 makes a negative decision in step S131 to proceed to step S132. In step S132, the arithmetic operation circuit 101 increments the aperture value setting AVs by 1 before ending the setting processing and proceeding to step S3 in FIG. 2. As a result, the aperture value setting is adjusted toward the closed side by one step.

Figure 6:
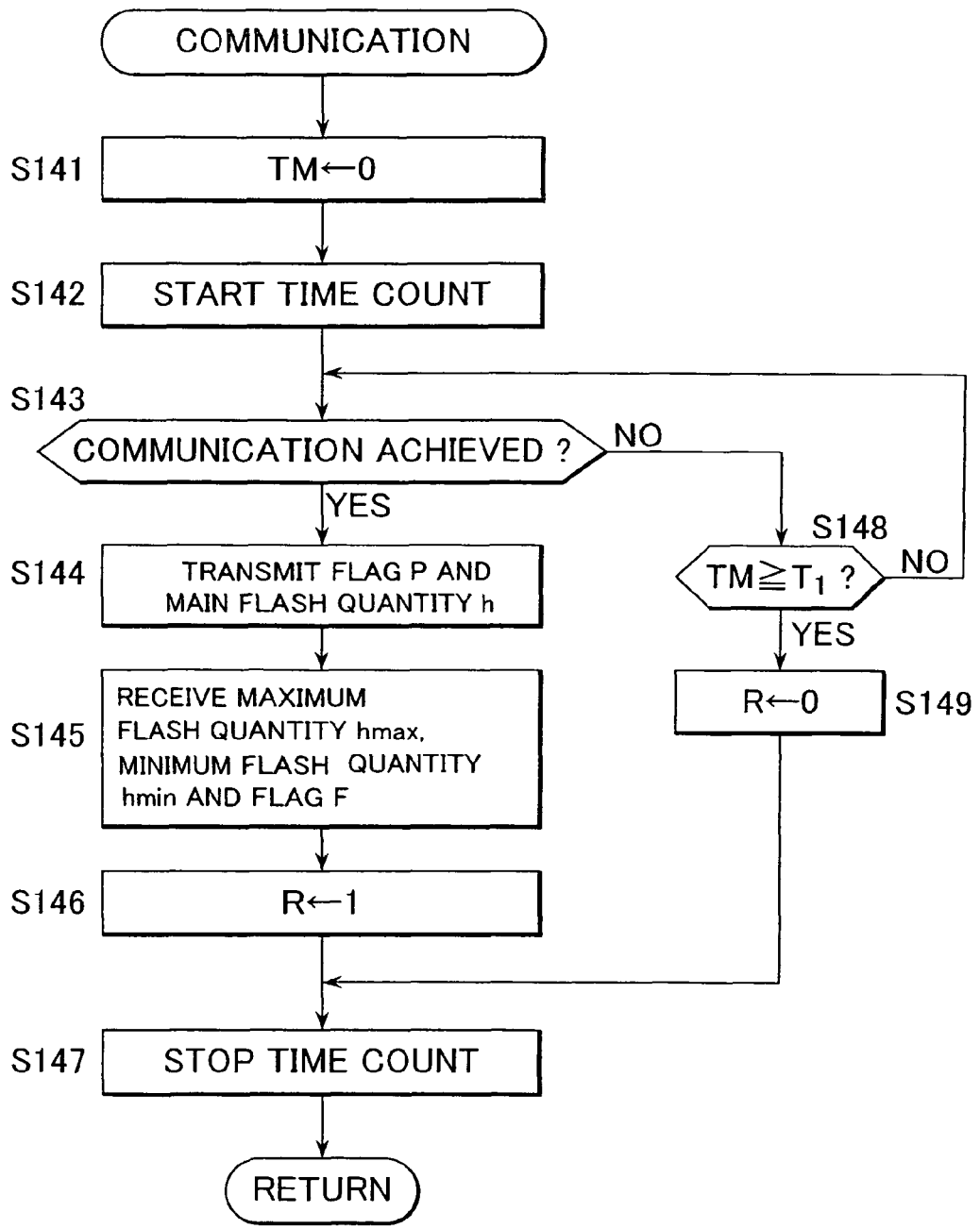
FIG. 6 presents a detailed flowchart of the communication processing.

The communication processing executed to allow the camera body 1 and the external flash unit 11 to engage in communication with each other is now explained in detail in reference to the flowchart presented in FIG. 6. In step S141 in FIG. 6, the arithmetic operation circuit 101 resets a time count TM to 0 and then the operation proceeds to step S142.

In step S142, the arithmetic operation circuit 101 starts a time count TM and then the operation proceeds to step S143. In step S143, the arithmetic operation circuit 101 makes a decision as to whether or not communication with the controller 201 has been achieved. The decision as to whether or not communication has been achieved is made by executing a specific protocol check. The arithmetic operation circuit 101 makes an affirmative decision in step S143 if communication has been achieved to proceed to step S144. If, on the other hand, communication has not been achieved, the arithmetic operation circuit 101 makes a negative decision in step S143 to proceed to step S148.

In step S144, the arithmetic operation circuit 101 transmits signals indicating the setting of the flag P and the main flash quantity h to the controller 201 before proceeding to step S145. In step S145, the arithmetic operation circuit 101 receives signals indicating a maximum flash quantity hmax and a minimum flash quantity hmin of the external flash unit 11 and the setting of a flag F from the controller 201, and then the operation proceeds to step S146. The flag F is set to 1 when a charge of the external flash unit 11 is completed and is set to 0 when the charges not completed.

In step S146, the arithmetic operation circuit 101 sets a flag R to 1 before proceeding to step S147. The flag R is set to 1 when communication is achieved and is set to 0 if successful communication is not achieved.

In step S147, the arithmetic operation circuit 101 stops the time count TM, ends the communication processing and proceeds to step S5 in FIG. 2. In step S148 to which the operation proceeds after making a negative decision in step S143 as described above, the arithmetic operation circuit 101 makes a decision as to whether or not TM≧T1 is true with regard to the time count TM and a predetermined length of time T1. The predetermined length of time T1 is the sum of the length of time required for the protocol check and a slight time margin. The arithmetic operation circuit 101 makes an affirmative decision in step S148 if TM≧T1 is true, to proceed to step S149, whereas it makes a negative decision in step S148 if TM≧T1 is not true, to return to step S143. The operation proceeds to step S149 when the external flash unit 11 with the communication function is not mounted, whereas the operation returns to step S143 if the protocol check is still in progress. In step S149, the arithmetic operation circuit 101 sets the flag R to 0 before proceeding to step S147.

Figure 7:
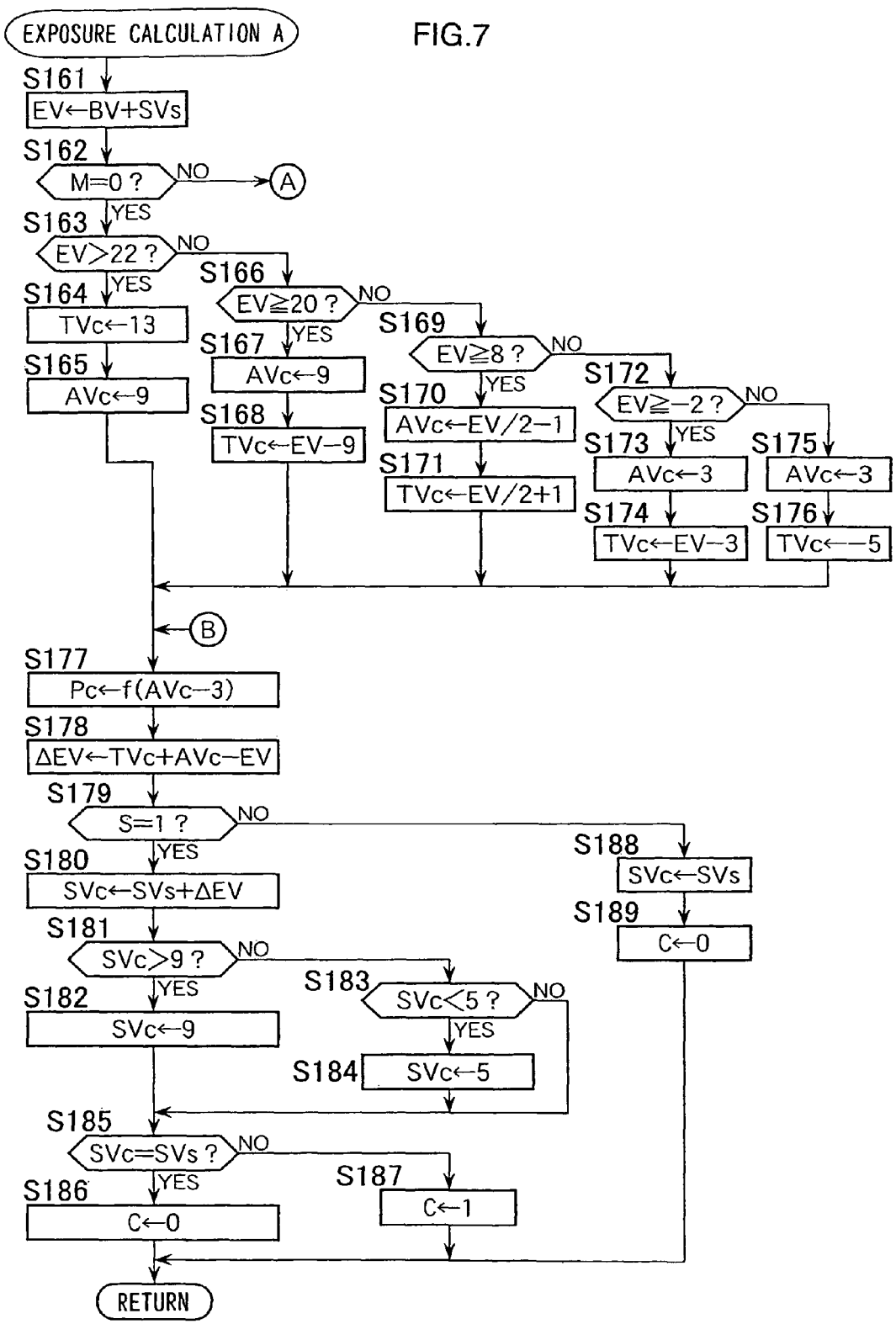
FIG. 7 presents a detailed flowchart of the exposure calculation processing A.
Figure 8:
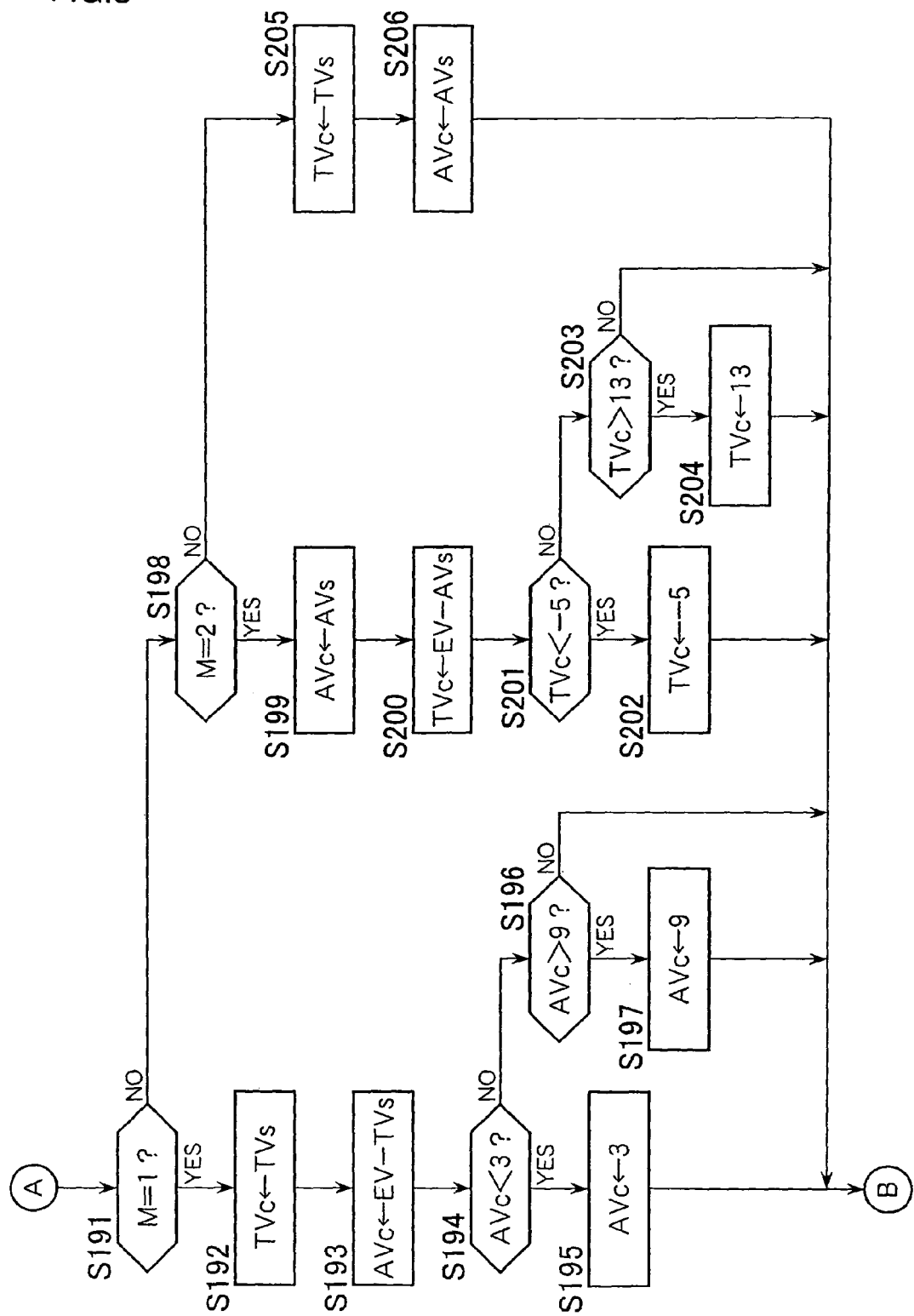
FIG. 8 presents a detailed flowchart of the exposure calculation processing A.

The exposure calculation processing A is now explained in detail in reference to the flowchart presented in FIGS. 7 and 8. In step S161 in FIG. 7, the arithmetic operation circuit 101 executes an arithmetic operation to calculate EV=BV+SVs before proceeding to step S162. EV represents the exposure value. The image-capturing sensitivity setting SVs is the image-capturing sensitivity having been set through an operation of the sensitivity setting operation member 110. The subject brightness BV is indicated with the value obtained through the processing executed in step S7 or step S24 or S52 to be explained later.

In step S162, the arithmetic operation circuit 101 makes a decision as to whether or not the program automatic exposure mode (P mode) is currently selected for the exposure mode. The arithmetic operation circuit 101 makes an affirmative decision in step S162 if M=0 (P mode) to proceed to step S163, whereas it makes a negative decision in step S162 if M≠0 to proceed to step S191 in FIG. 8.

The processing in steps S163 through S176 in FIG. 7 is executed when the camera is set in the P mode. In step S163, the arithmetic operation circuit 101 makes a decision as to whether or not the exposure value EV is greater than 22. The arithmetic operation circuit 101 makes an affirmative decision in step S163 if EV>22 is true, to proceed to step S164, whereas it makes a negative decision in step S163 if EV>22 is not true, to proceed to step S166.

In step S164, the arithmetic operation circuit 101 sets a control shutter speed TVc to 13 (⅛₀₀₀ sec) before proceeding to step S165. In step S165, the arithmetic operation circuit 101 sets a control aperture value AVc to 9 (F22 (minimum aperture)) before proceeding to step S177.

In step S166, the arithmetic operation circuit 101 makes a decision as to whether or not the exposure value EV is equal to or greater than 20. The arithmetic operation circuit 101 makes an affirmative decision in step S166 if EV≧20 is true, to proceed to step S167, whereas it makes a negative decision in step S166 if EV≧20 is not true, to proceed to step S169.

In step S167, the arithmetic operation circuit 101 sets the control aperture value AVc to 9 (F22 (minimum aperture)) before proceeding to step S168. In step S168, the arithmetic operation circuit 101 sets a value obtained by subtracting 9 (the minimum aperture) from the exposure value EV for the control shutter speed TVc, and then the operation proceeds to step S177.

In step S169, the control circuit 101 makes a decision as to whether or not the exposure value EV is equal to or greater than 8. The arithmetic operation circuit 101 makes an affirmative decision in step S169 if EV≧8 is true, to proceed to step S170, whereas it makes a negative decision in step S169 if EV≧8 is not true, to proceed to step S172.

In step S170, the arithmetic operation circuit 101 executes an arithmetic operation to calculate AVc=EV/2−1, and then the operation proceeds to step S171. AVc represents the control aperture value. In step S171, the arithmetic operation circuit 101 executes an arithmetic operation to calculate TVc=EV/2+1 before proceeding to step S177. TVc represents the control shutter speed.

In step S172, the control circuit 101 makes a decision as to whether or not the exposure value EV is equal to or greater than −2. The arithmetic operation circuit 101 makes an affirmative decision in step S172 if EV≧−2 is true, to proceed to step S173, whereas it makes a negative decision in step S172 if EV≧−2 is not true, to proceed to step S175.

In step S173, the arithmetic operation circuit 101 sets 3 (F2.8 (maximum aperture)) for the control aperture value AVc before proceeding to step S174. In step S174, the arithmetic operation circuit 101 sets a value obtained by subtracting 3 (open aperture value) from the exposure value EV for the control shutter speed TVc, and then the operation proceeds to step S177.

In step S175, the arithmetic operation circuit 101 sets 3 (F2.8 (maximum aperture)) for the control aperture value AVc before proceeding to step S176. In step S176, the arithmetic operation circuit 101 sets −5 (30 sec) for the control shutter speed TVc before proceeding to step S177.

Figure 21:
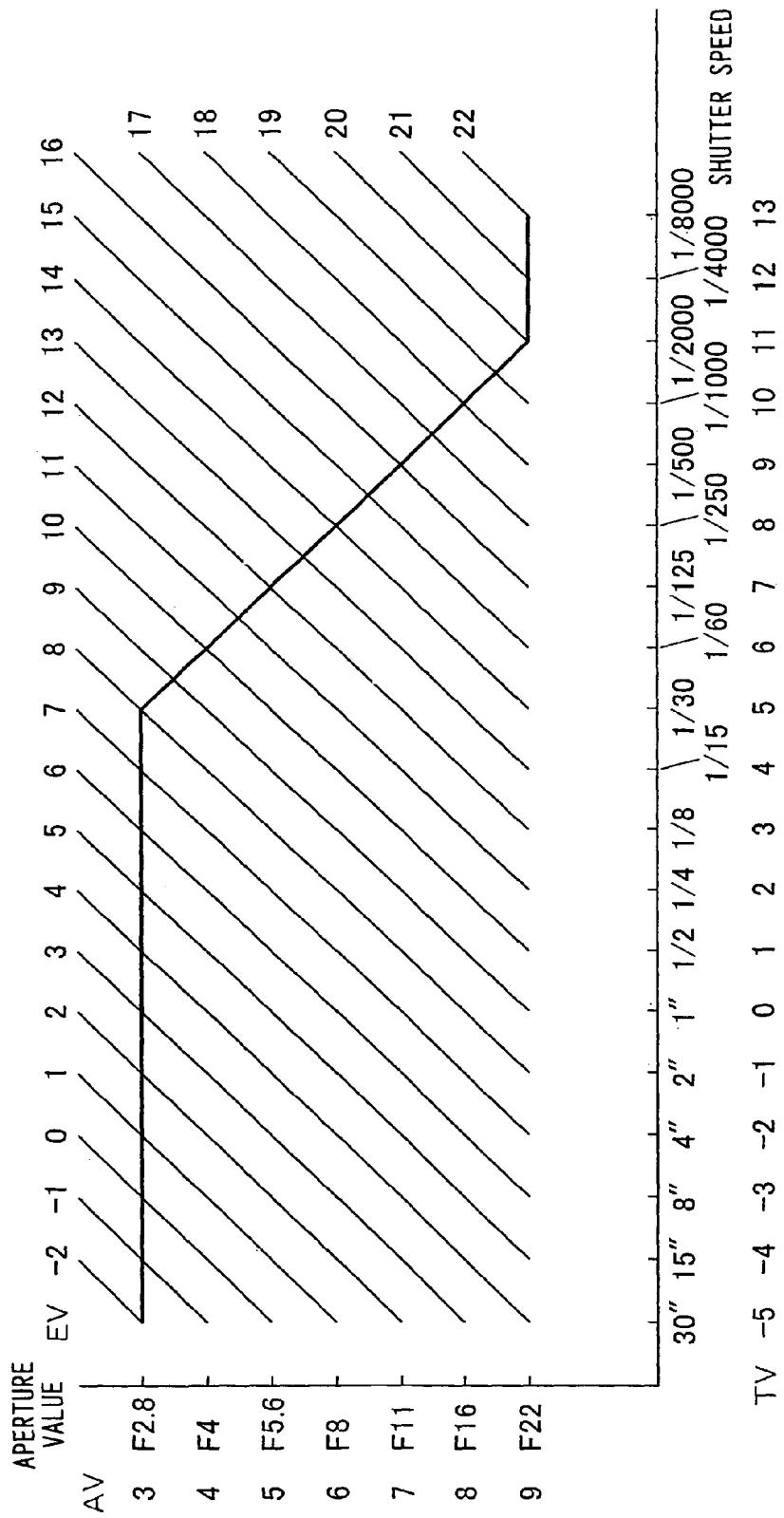
FIG. 21 is a program chart representing the operation executed when neither flash unit is utilized.

The processing in steps S163 through S176 is executed as indicated in the program chart in FIG. 21, which corresponds to the operation executed without utilizing either of the flash units.

In step S177, the arithmetic operation circuit 101 calculates a control aperture pulse number Pc representing the number of control aperture pulses as a function f of the number of steps (AVc−3) over which the aperture is to be adjusted, before the operation proceeds to step S178. The control aperture pulse number Pc indicates the number of detection pulses output from the aperture position detection device 116 before the aperture becomes held at the position corresponding to the control aperture value AVc. While the number of steps over which the aperture is to be adjusted and the aperture pulse number are in proportion to each other, the number of aperture detection pulses output when the aperture is more open is greater and, for this reason, the aperture pulse number is calculated as a function f of the number of steps over which the aperture is to be adjusted (AVc−3).

In step S178, the arithmetic operation circuit 101 executes an arithmetic operation to calculate the exposure deviation ΔEV as indicated in (2) below before proceeding to step S179.

$$\Delta EV = TVc + AVc - EV \quad (2)$$

(TVc+AVc) in the expression above represents the control exposure and EV represents the optimal exposure.

In step S179, the arithmetic operation circuit 101 makes a decision as to whether or not the sensitivity automatic control mode flag S is currently set to 1 (whether or not the sensitivity automatic control mode is currently selected) The arithmetic operation circuit 101 makes an affirmative decision in step S179 if S=1 to proceed to step S180, whereas it makes a negative decision in step S179 if S≠1 to proceed to step S188. The operation proceeds to step S188 when the sensitivity automatic control mode has been cleared.

In step S188, the arithmetic operation circuit 101 sets the image-capturing sensitivity SVs for the control image-capturing sensitivity SVc and then the operation proceeds to step S189. In step S189, the arithmetic operation circuit 101 sets 0 for a flag C before ending the exposure calculation processing A and proceeding to step S9 in FIG. 2. The flag C is set to 1 if the image-capturing sensitivity is changed from the image-capturing sensitivity setting SVs (SVc≠SVs) and is set to 0 if the image-capturing sensitivity remains unchanged from the current image-capturing sensitivity setting SVs (SVc=SVs).

In step S180, the arithmetic operation circuit 101 executes an arithmetic operation to calculate SVc=SVs+ΔEV before proceeding to step S181. As a result, the control image-capturing sensitivity SVc is set to a value different from the value of the image-capturing sensitivity setting SVs, so as to achieve the optimal exposure. In step S181, the arithmetic operation circuit 101 makes a decision as to whether or not SVc>9 is true. The arithmetic operation circuit 101 makes an affirmative decision in step S181 if SVc>9 is true (if the control image-capturing sensitivity is higher than a level equivalent to ISO 1600) to proceed to step S182, whereas it makes a negative decision in step S181 if SVc>9 is not true, to proceed to step S183. In step S182, the arithmetic operation circuit 101 sets 9 for the control image-capturing sensitivity SVc, and then the operation proceeds to step S185. Thus, the control image-capturing sensitivity is set to the value equivalent to ISO 1600, which is the upper limit of the control range.

In step S183 to which the operation proceeds after making a negative decision in step S181 as described above, the arithmetic operation circuit 101 makes a decision as to whether or not SVc<5 is true. The arithmetic operation circuit 101 makes an affirmative decision in step S183, if SVc<5 is true (if the control image-capturing sensitivity is lower than a level equivalent to ISO 100) to proceed to step S184, whereas it makes a negative decision in step S183 if SVc<5 is not true, to proceed to step S185. In step S184, the arithmetic operation circuit 101 sets 5 for the control sensitivity SVc and then the operation proceeds to step S185. As a result, the control sensitivity is set to the value equivalent to ISO 100, which is the lower limit of the control range.

In step S185, the arithmetic operation circuit 101 makes a decision as to whether or not SVc=SVs is true. The arithmetic operation circuit 101 makes a negative decision in step S185 if SVc=SVs is not true, to proceed to step S187, whereas it makes an affirmative decision in step S185 if SVc=SVs is true, to proceed to step S186. In step S187, the arithmetic operation circuit 101 sets 1 for the flag C before ending the exposure calculation processing A and proceeding to step S9 in FIG. 2.

In step S186, the arithmetic operation circuit 101 sets 0 for the flag C before ending the exposure calculation processing A and proceeding to step S9 in FIG. 2.

The processing in steps S191 and subsequent steps in FIG. 8 is executed when an exposure mode other than the P mode is selected. In step S191, the arithmetic operation circuit 101 makes a decision as to whether or not the shutter speed priority automatic exposure mode (S mode) has been selected for the exposure mode. The arithmetic operation circuit 101 makes an affirmative decision in step S191 if M=1 (S mode) to proceed to step S192, whereas it makes a negative decision in step S191 if M≠1 to proceed to step S198.

In step S192, the arithmetic operation circuit 101 sets the currently selected shutter speed TVs for the control shutter speed TVc before proceeding to step S193. In step S193, the arithmetic operation circuit 101 sets a value obtained by subtracting the shutter speed setting TVs from the exposure value EV for the control aperture value AVc, and then the operation proceeds to step S194.

In step S194, the arithmetic operation circuit 101 makes a decision as to whether or not AVc<3 is true. The arithmetic operation circuit 101 makes an affirmative decision in step S194 if AVc<3 is true (if the control aperture value is smaller than F2.8) to proceed to step S195, whereas it makes a negative decision in step S194 if AVc<3 is not true, to proceed to step S196. In step S195, the arithmetic operation circuit 101 sets 3 for the control aperture value AVc before proceeding to step S177 in FIG. 7. Thus, the control aperture value is set to F2.8, which is the lower limit of the control range.

In step S196, the arithmetic operation circuit 101 makes a decision as to whether or not AVc>9 is true. The arithmetic operation circuit 101 makes an affirmative decision in step S196 if AVc>9 is true (if the control aperture value is greater than F22) to proceed to step S197, whereas it makes a negative decision in step S196 if AVc>9 is not true, to proceed to step S177 in FIG. 7. In step S197, the arithmetic operation circuit 101 sets 9 for the control aperture value AVc before proceeding to step S177 in FIG. 7. Thus, the control aperture value is set to F22, which is the upper limit of the control range.

In step S198, to which the operation proceeds after making a negative decision in step S191 as described above, the arithmetic operation circuit 101 makes a decision as to whether or not the aperture priority automatic exposure mode (A mode) has been selected for the exposure mode. The arithmetic operation circuit 101 makes an affirmative decision in step S198 if M=2 (A mode) to proceed to step S199, whereas it makes a negative decision in step S198 if M≠2 to proceed to step S205.

In step S199, the arithmetic operation circuit 101 sets the aperture value AVs for the control aperture value AVc before proceeding to step S200. In step S200, the arithmetic operation circuit 101 sets a value obtained by subtracting the aperture value setting AVs from the exposure value EV for the control shutter speed TVc before proceeding to step S201.

In step S201, the arithmetic operation circuit 101 makes a decision as to whether or not TVc<−5 is true. The arithmetic operation circuit 101 makes an affirmative decision in step S201 if TVc<−5 is true (if the control shutter speed is lower than 30 sec) to proceed to step S202, whereas it makes a negative decision in step S201 if TVc<−5 is not true, to proceed to step S203. In step S202, the arithmetic operation circuit 101 sets −5 for the control shutter speed TVc before proceeding to step S177 in FIG. 7. Thus, the control shutter speed is set to 30 sec, which is the lower limit of the control range.

In step S203, the arithmetic operation circuit 101 makes a decision as to whether or not TVc>13 is true. The arithmetic operation circuit 101 makes an affirmative decision in step S203 if TVc>13 is true (if the control shutter speed is higher than 1/8000 sec) to proceed to step S204, whereas it makes a negative decision in step S203 if TVc>13 is not true, to proceed to step S177 in FIG. 7. In step S204, the arithmetic operation circuit 101 sets 13 sec for the control shutter speed TVc before proceeding to step S177 in FIG. 7. Thus, the control shutter speed is set to 1/8000 sec, which is the upper limit of the control range.

In step S205, to which the operation proceeds after making a negative decision in step S198 as described above, the arithmetic operation circuit 101 sets the shutter speed TVs for the control shutter speed TVc before proceeding to step S206. In step S206, the arithmetic operation circuit 101 sets the aperture value AVs for the control aperture value AVc before proceeding to step S177 in FIG. 7.

Figure 9:
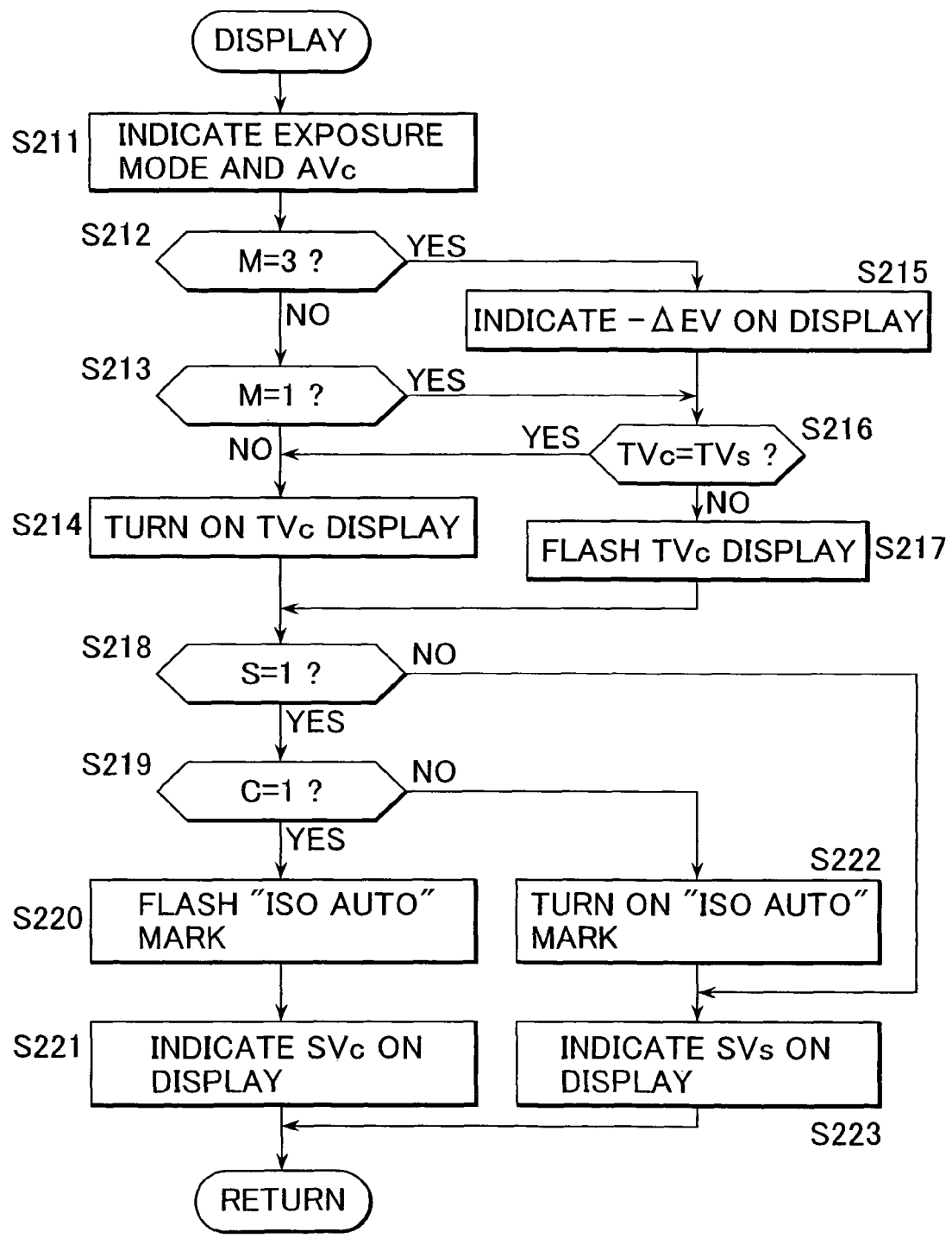
FIG. 9 presents a detailed flowchart of the display processing.

The display processing is now explained in detail in reference to the flowchart presented in FIG. 9. In step S211 in FIG. 9, the arithmetic operation circuit 101 turns on a display indicating the exposure mode and the control aperture value AVc at the display device 11, and the operation proceeds to step S212. At the display device 111, the current exposure mode and the F value corresponding to the apex value are indicated.

In step S212, the arithmetic operation circuit 101 makes a decision as to whether or not the mode parameter M is currently set to 3. The arithmetic operation circuit 101 makes an affirmative decision in step S212 if M=3 (M mode) to proceed to step S215, whereas it makes a negative decision in step S212 if M≠3 (a mode other than the M mode) to proceed to step S213.

In step S213, the arithmetic operation circuit 101 makes a decision as to whether or not the mode parameter M is currently set to 1. The arithmetic operation circuit 101 makes an affirmative decision in step S213 if M=1 (S mode) to proceed to step S216, whereas it makes a negative decision in step S213 if M≠1 (a mode other than the S mode) to proceed to step S214.

As neither the M mode nor the S mode is currently selected, the arithmetic operation circuit 101 turns on a display indicating the control shutter speed TVc at the display device 111 in step S214 before proceeding to step S218. At the display device 111, the shutter speed corresponding to the apex value is indicated.

In step S215, the arithmetic operation circuit 101 issues an instruction for the display device 111 to indicate the negative value of the exposure deviation ΔEV as the difference relative to the optimal exposure, and then the operation proceeds to step S216. As a result, the exposure deviation is indicated at the display device 111.

In step S216, the arithmetic operation circuit 101 makes a decision as to whether or not TVc=TVs is true. The arithmetic operation circuit 101 makes a negative decision in step S216 if TVc=TVs is not true, to proceed to step S217, whereas it makes an affirmative decision in step S216 if TVc=TVs is true, to proceed to step S214.

In step S217, the arithmetic operation circuit 101 engages the display device 111 to flash a display of the control shutter speed TVc so as to indicate that TVc≠TVs, and then the operation proceeds to step S218. The display device 111, in turn, flashes a display of the shutter speed corresponding to the apex value. Such a flashing display constitutes a warning.

In step S218, the arithmetic operation circuit 101 makes a decision as to whether or not the sensitivity automatic control mode flag S is currently set to 1. The arithmetic operation circuit 101 makes an affirmative decision in step S218 if S=1 (the sensitivity automatic control mode is currently set) to proceed to step S219, whereas it makes a negative decision in step S218 if S=0 (the sensitivity automatic control mode has been cleared) to proceed to step S223.

In step S219, the arithmetic operation circuit 101 makes a decision as to whether or not the flag C is currently set to 1. The arithmetic operation circuit 101 makes an affirmative decision in step S219 if C=1 (SVc≠SVs) to proceed to step S220, whereas it makes a negative decision in step S219 if C=0 (SVc=SVs) to proceed to step S222.

In step S220, the arithmetic operation circuit 101 brings up a flashing display of characters "ISO AUTO" or an icon at the display device 111 before proceeding to step S221. In step S221, the arithmetic operation circuit 101 also brings up a display of the ISO value corresponding to the apex value representing the control image-capturing sensitivity SVc at the display device 111 before ending the display processing in FIG. 9 and proceeding to step S10 in FIG. 2.

In step S222, the arithmetic operation circuit 101 brings up a flashing display of characters "ISO AUTO" or an icon at the display device 111 before proceeding to step S223. In step S223, the arithmetic operation circuit 101 brings up a further display of the ISO value corresponding to the apex value representing the image-capturing sensitivity setting SVs at the display device 111 before ending the display processing in FIG. 9 and proceeding to step S10 in FIG. 2.

Figure 10:
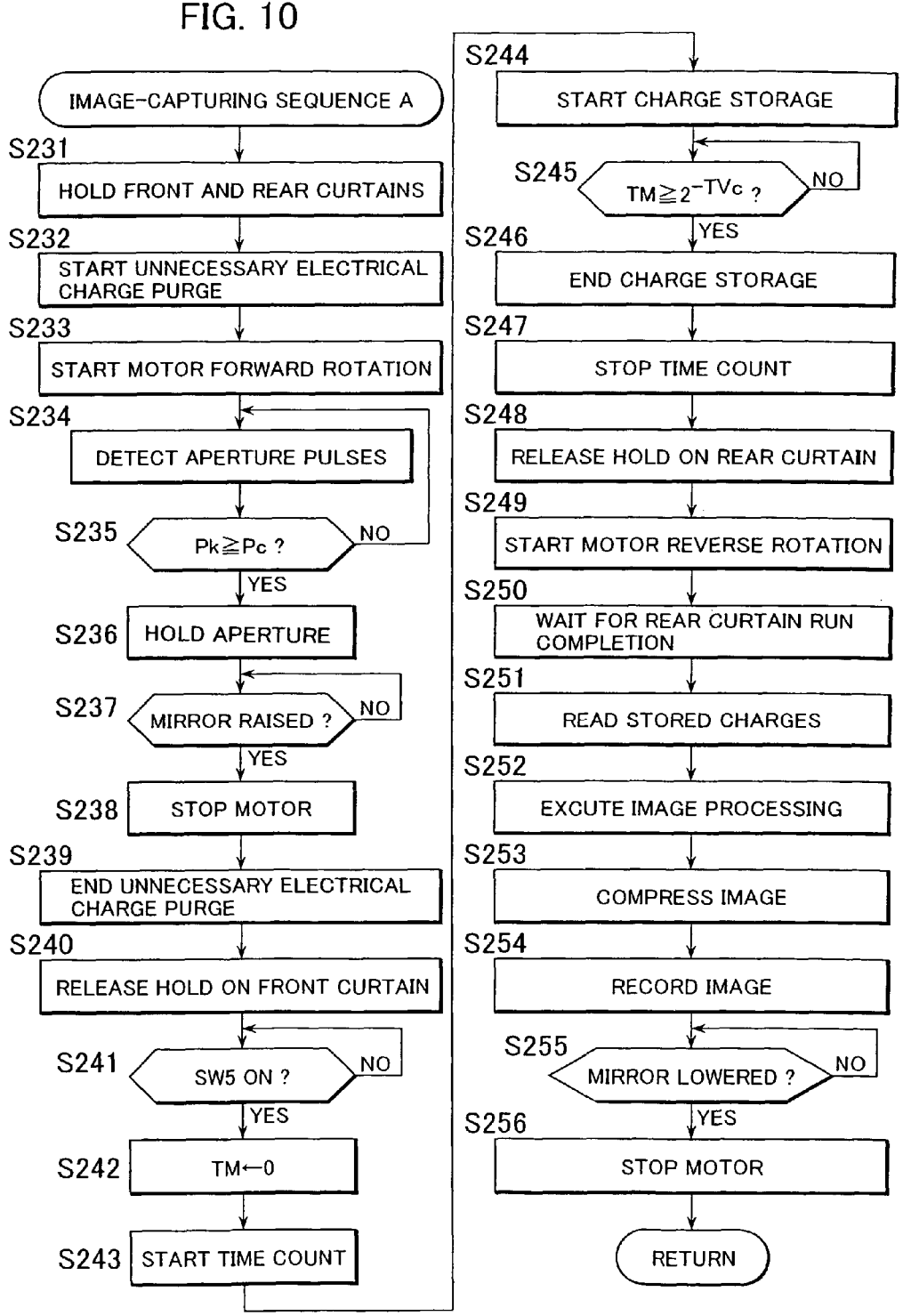
FIG. 10 presents a detailed flowchart of the image-capturing sequence processing A.

The image-capturing sequence processing A is now explained in detail in reference to the flowchart presented in FIG. 10. In step S231 in FIG. 10, the arithmetic operation circuit 101 outputs a command for the shutter drive circuit 114 to supply power to the magnets (not shown) at the shutter 115 to hold the front curtain and the rear curtain. In step S232, the arithmetic operation circuit 101 starts a purge or discharge of unnecessary electrical charge in the data transfer path at the image-capturing element 121 before the operation proceeds to step S233.

In step S233, the arithmetic operation circuit 101 outputs a command for the motor drive circuit 112 to start a forward rotation of the sequence motor 113 before the operation proceeds to step S234. In response, the mirror (not shown) starts to rise and an aperture setting operation starts. In step S234, the arithmetic operation circuit 101 counts the detection pulse signals input from the aperture position detection device 116 and then the operation proceeds to step S235.

In step S235, the arithmetic operation circuit 101 makes a decision as to the count value Pk and the control aperture pulse number Pc achieve a relationship expressed as Pk≧Pc. The arithmetic operation circuit 101 makes an affirmative decision in step S235 if Pk≧Pc is true, to proceed to step S236, whereas it makes a negative decision in step S235 if Pk≧Pc is not true. After making a negative decision in step S235, the operation returns to step S234 to continuously execute the aperture setting operation and then repeatedly execute the decision-making processing in step S235.

In step S236, the arithmetic operation circuit 101 outputs a command for the aperture holding device 117 to hold the aperture before proceeding to step S237. In step S237, the arithmetic operation circuit 101 makes a decision as to whether or not the mirror ascent has ended. The arithmetic operation circuit 101 makes an affirmative decision in step S237 if an ON signal has been input from the sequence switch SW4 to proceed to step S238, whereas it makes a negative decision in step S237 if no ON signal has been input from the sequence switch SW4. After making a negative decision in step S237, the mirror is allowed to continuously rise and then the decision-making processing in step S237 is repeatedly executed.

In step S238, the arithmetic operation circuit 101 outputs a command for the motor drive circuit 112 to stop the forward rotation of the sequence motor 113 before the operation proceeds to step S239. It is to be noted that the sequence drive device (not shown) is structured so that the aperture becomes completely held by the aperture holding device 117 before the mirror ascent ends.

In step S239, the arithmetic operation circuit 101 ends the discharge of unnecessary electrical charge at the image-capturing element 121 and then the operation proceeds to step S240. In step S240, the arithmetic operation circuit 101 outputs a command for the shutter drive circuit 114 to stop the power supply to the magnet (not shown) at the shutter 115 to release to hold on the front curtain before proceeding to step S241. In response, the front curtain at the shutter starts its run.

In step S241, the arithmetic operation circuit 101 makes a decision as to whether or not the X contact point switch SW5 has entered an ON state. The arithmetic operation circuit 101 makes an affirmative decision in step S241 if an ON signal has been input from the X contact point switch SW5 to proceed to step S242, whereas it makes a negative decision in step S241 if no ON signal has been input from the X contact point switch SW5 to repeatedly execute the decision-making processing.

In step S242, the arithmetic operation circuit 101 resets the time count TM to 0 before the operation proceeds to step S243. In step S243, the arithmetic operation circuit 101 starts a time count TM before proceeding to step S244. In step S244, the arithmetic operation circuit 101 starts a charge storage at the image-capturing element 121 before the operation proceeds to step S245.

In step S245, the arithmetic operation circuit 101 makes a decision as to whether or not a length of time corresponding to the control shutter speed TVc has elapsed since the start of the time count. The arithmetic operation circuit 101 makes an affirmative decision in step S245 if $TM \geq 2^{-TVc}$ is true, to proceed to step S246, whereas it makes a negative decision in step S245 if $TM \geq 2^{-TVc}$ is not true, to repeatedly execute the same decision-making processing.

In step S246, the arithmetic operation circuit 101 ends the charge storage at the image-capturing element 121 before proceeding to step S247. In step S247, the arithmetic operation circuit 101 stops the time count TM and then the operation proceeds to step S248.

In step S248, the arithmetic operation circuit 101 outputs a command for the shutter drive circuit 114 to stop the power supply to the magnet at the shutter 115 to release to hold on the rear curtain, before the operation proceeds to step S249. In response, the rear curtain at the shutter starts its run and, as a result, the image-capturing element 121 becomes shielded from the subject light. Thus, the exposure is controlled in correspondence to the control shutter speed TVc.

In step S249, the arithmetic operation circuit 101 outputs a command for the motor drive circuit 112 to start a reverse rotation of the sequence motor 113 and then the operation proceeds to step S250. As a result, the mirror (not shown) starts descending and an aperture open reset starts. In step S250, the arithmetic operation circuit 101 inserts a wait period of a predetermined length before proceeding to step S251. This wait period is set to the length of time required for the rear curtain to completely shield the image-capturing area at the image-capturing element 121 from light and complete its run.

In step S251, the arithmetic operation circuit 101 starts a read of the stored electrical charges from the image-capturing element 121, and then the operation proceeds to step S252. As a result, the image signals read from the image-capturing element 121 are converted to digital data at the A/D conversion circuit 122 and the data resulting from the conversion are provided to the image processing circuit 123.

In step S252, the arithmetic operation circuit 101 issues an instruction for the image processing circuit 123 to execute the image processing before proceeding to step S253. In step S253, the arithmetic operation circuit 101 issues an instruction for the image processing circuit 123 to execute image compression processing and then the operation proceeds to step S254. In step S254, the arithmetic operation circuit 101 records the compressed image data into the recording medium 126 and then the operation proceeds to step S255.

In step S255, the arithmetic operation circuit 101 makes a decision as to whether or not the mirror descent has ended. The arithmetic operation circuit 101 makes an affirmative decision in step S255 if an ON signal has been input from the sequence switch SW4 to proceed to step S256, whereas it makes a negative decision in step S255 if no ON signal has been input from the sequence switch SW4 to repeat the decision-making processing.

In step S256, the arithmetic operation circuit 101 outputs a command for the motor drive circuit 112 to stop the reverse rotation of the sequence motor 113, thereby ending the processing for the image-capturing sequence A in FIG. 10 to return to step S2 in FIG. 2.

(When the Internal Flash Unit is Utilized)

The processing executed in case 2 is now explained in reference to the flowchart presented in FIG. 3. In step S21 in FIG. 3, the arithmetic operation circuit 101 makes a decision as to whether or not the charge flag J is currently set to 0. The arithmetic operation circuit 101 makes an affirmative decision in step S21 if J=0 (the charge at the charge circuit in the internal flash unit light emission circuit 102 (see FIG. 1) has not been completed) to proceed to step S22, whereas it makes a negative decision in step S21 if J=1 to proceed to step S23.

In step S22, the arithmetic operation circuit 101 issues an instruction for the internal flash unit light emission circuit 102 to start a charge before proceeding to step S23. Since the processing executed in steps S23 and S24 is identical to the processing in steps S6 and S7 explained earlier, its explanation is omitted.

In step S25, the arithmetic operation circuit 101 executes the exposure calculation processing B and then the operation proceeds to step S26. The exposure calculation processing B is to be explained in detail later. In step S26, the arithmetic operation circuit 101 executes display processing for the display device 111 before proceeding to step S27. The display processing has been explained in detail earlier.

Since the processing executed in steps S27 through S30 is identical to the processing executed in steps S10 through S13 explained earlier, its explanation is omitted.

In step S31 in FIG. 3, the arithmetic operation circuit 101 makes a decision as to whether or not the charge flag J is currently set to 0. The arithmetic operation circuit 101 makes an affirmative decision in step S31 if J=0 (the charge at the charge circuit in the internal flash unit light emission circuit 102 (see FIG. 1) has not been completed) to proceed to step S32, whereas it makes a negative decision in step S31 if J=1 to proceed to step S34.

In step S32, the arithmetic operation circuit 101 makes a decision as to whether or not the charge has been completed. The arithmetic operation circuit 101 makes an affirmative decision in step S32 if a complete signal has been input from the internal flash unit light emission circuit 102 to proceed to step S33, whereas the operation returns to step S2 in FIG. 2 if no complete signal has been input. When the operation returns to step S2 instead of proceeding to step S35 to execute shutter release decision-making processing, the camera is in a shutter release locked state.

In step S33, the arithmetic operation circuit 101 sets 1 for the charge flag J and then the operation proceeds to step S34. In step S34, the arithmetic operation circuit 101 outputs a command for the display device 111 to bring up a display indicating the completion of the charge, and then the operation proceeds to step S35. At this time, the display device may indicate the charge completion by, for instance, lighting an icon of a thunderbolt in the viewfinder (not shown).

In step S35, the arithmetic operation circuit makes a decision as to whether or not a full press operation (shutter release) has been performed. The arithmetic operation circuit 101 makes an affirmative decision in step S35 if an operation signal has been input from the full press switch SW3 to proceed to step S36, whereas it makes a negative decision in step S35 if no operation signal has been input from the full press switch SW3 to return to step S2 in FIG. 2.

In step S36, the arithmetic operation circuit 101 executes the image-capturing sequence processing B before proceeding to step S37. The image-capturing sequence processing B is to be explained in detail later. In step S37, the arithmetic operation circuit 101 makes a decision with regard to a flag K. The flag K is set to 1 if the control image-capturing sensitivity SVc and the image-capturing sensitivity setting SVs are different from each other during the image-capturing sequence and is set to 0 if they match. The arithmetic operation circuit 101 makes an affirmative decision in step S37 if K=1 to proceed to step S38, whereas it makes a negative decision in step S37 if K=0 to proceed to step S39.

In step S38, to which the operation proceeds after a photographing operation has been performed at a sensitivity level different from the image-capturing sensitivity setting SVs, the arithmetic operation circuit 101 outputs a command for the display device 111 to bring up a flashing display of the characters "ISO AUTO" or an icon, and then the operation proceeds to step S39. In step S39, the arithmetic operation circuit 101 makes a decision with regard to a flag FU. The flag FU is set to 1 in the event of under-exposure caused by an insufficient flash quantity even after the image-capturing sensitivity setting SVs is adjusted, and is set to 0 if under-exposure does not manifest. The arithmetic operation circuit 101 makes an affirmative decision in step S39 if FU=1 to proceed to step S40, whereas it makes a negative decision in step S39 if FU=0 to proceed to step S41.

In step S40, the arithmetic operation circuit 101 outputs a command for the display device 111 to display a warning indicating an insufficient flash quantity (under-exposure) before proceeding to step S43. At this time, the display device may flash, for instance, a thunderbolt icon and the characters "UNDER". In step S43, the arithmetic operation circuit 101 sets 0 for the charge flag J before returning to step S2 in FIG. 2. The sequence of the photographing processing thus ends.

In step S41, the arithmetic operation circuit 101 makes a decision with regard to a flag FO. The flag FO is set to 1 in the event of over-exposure caused by an excessive flash quantity, even after the image-capturing sensitivity setting SVs is adjusted, and is set to 0 if over-exposure does not manifest. The arithmetic operation circuit 101 makes an affirmative decision in step S41 if FO=1 to proceed to step S42, whereas it makes a negative decision in step S41 if FO=0 to proceed to step S43.

In step S42, the arithmetic operation circuit 101 outputs a command for the display device 111 to display a warning indicating an excessive flash quantity (over-exposure) before proceeding to step S43. At this time, the display device may flash, for instance, a thunderbolt icon and the characters "OVER".

Figure 11:
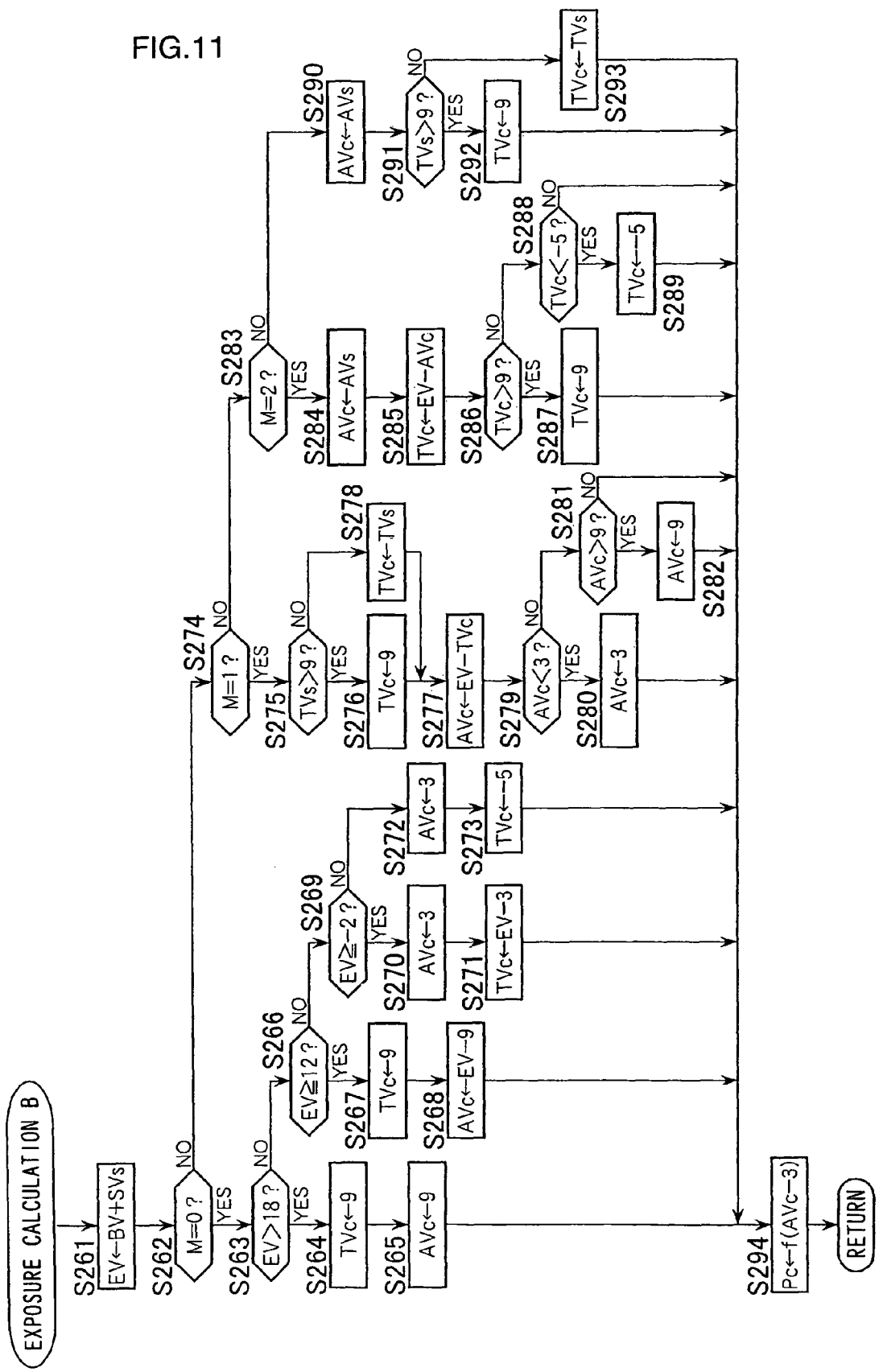
FIG. 11 presents a detailed flowchart of the exposure calculation processing B executed when a flash unit is utilized.

The exposure calculation processing B executed when the flash unit is utilized is now explained in detail in reference to the flowchart presented in FIG. 11. Since the processing executed in steps S261 and S262 is identical to the processing executed in steps S161 and S162 explained earlier, its explanation is omitted.

In step S263, the arithmetic operation circuit 101 makes a decision as to whether or not the exposure value EV is greater than 18. The arithmetic operation circuit 101 makes an affirmative decision in step S263 if EV>18 is true, to proceed to step S264, whereas it makes a negative decision in step S263 if EV>18 is not true, to proceed to step S266.

In step S264, the arithmetic operation circuit 101 sets the control shutter speed TVc to 9 (1/500 sec) before proceeding to step S265. In step S265, the control circuit 101 sets the control aperture value AVc to 9 (F22 (minimum aperture)) before proceeding to step S294.

In step S266, the arithmetic operation circuit 101 makes a decision as to whether or not the exposure value EV is equal to or greater than 12. The arithmetic operation circuit 101 makes an affirmative decision in step S266 if EV≧12 is true, to proceed to step S267, whereas it makes a negative decision in step S266 if EV≧12 is not true, to proceed to step S269.

In step S267, the arithmetic operation circuit 101 sets the control shutter speed TVc to 9 (1/500 sec) before proceeding to step S268. In step S268, the arithmetic operation circuit 101 sets a value obtained by subtracting 9 (1/500 sec) from the exposure value EV for the control aperture value AVc before proceeding to step S294.

In step S269, the arithmetic operation circuit 101 makes a decision as to whether or not the exposure value EV is equal to or greater than −2. The arithmetic operation circuit 101 makes an affirmative decision in step S269 if EV≧−2 is true, to proceed to step S270, whereas it makes a negative decision in step S269 if EV≧−2 is not true, to proceed to step S272.

In step S270, the arithmetic operation circuit 101 sets the control aperture value AVc to 3 (F2.8 (maximum aperture)) before proceeding to step S271. In step S271, the arithmetic operation circuit 101 sets a value obtained by subtracting 3 (F2.8) from the exposure value EV for the control shutter speed TVc, and then the operation proceeds to step S294.

In step S272, the arithmetic operation circuit 101 sets the control aperture value AVc to 3 (F2.8 (maximum aperture)) before proceeding to step S273. In step S273, the arithmetic operation circuit 101 sets −5 (30 sec) for the control shutter speed TVc and then the operation proceeds to step S294.

Figure 22:
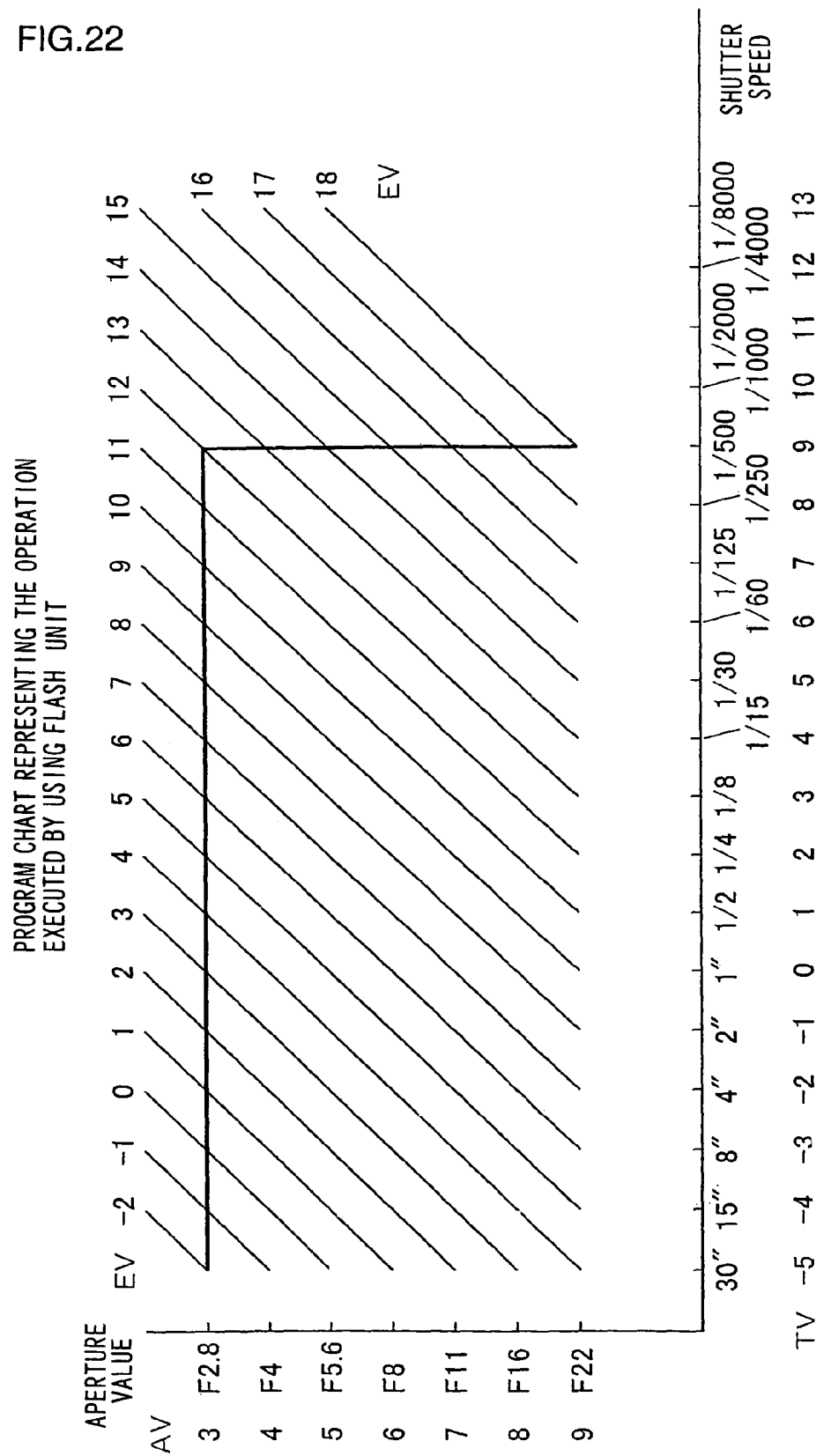
FIG. 22 is a program chart representing the operation executed when a flash unit is utilized.

The processing in steps S263 through S273 is executed as indicated in the program chart in FIG. 22 which represents the operation executed when the flash unit is utilized.

In step S274 to which the operation proceeds after making a negative decision in step S262 as described above, the arithmetic operation circuit 101 makes a decision as to whether or not the mode parameter M is currently set to 1. The arithmetic operation circuit 101 makes an affirmative decision in step S274 if M=1 (S mode) to proceed to step S275, whereas it makes a negative decision in step S274 if M≠1 (a mode other than S mode) to proceed to step S283.

In step S275, the arithmetic operation circuit 101 makes a decision as to whether or not the shutter speed setting TVs is higher than 1/500 sec. The arithmetic operation circuit 101 makes an affirmative decision in step S275 if TVs>9 is true, to proceed to step S276, whereas it makes a negative decision in step S275 if TVs>9 is not true, to proceed to step S278.

In step S276, the arithmetic operation circuit 101 sets 9 (1/500 sec) for the control shutter speed TVc before proceeding to step S277. In step S278, the arithmetic operation circuit 101 sets the value of the shutter speed setting TVs into the control shutter speed TVc, and then the operation proceeds to step S277. In step S277, the arithmetic operation circuit 101 sets a value obtained by subtracting the control shutter speed TVc from the exposure value EV for the control aperture value AVc, and then the operation proceeds to step S279.

In step S279, the arithmetic operation circuit 101 makes a decision as to whether or not the control aperture value AVc is smaller than F2.8. The arithmetic operation circuit 101 makes an affirmative decision in step S279 if AVc<3 is true, to proceed to step S280, whereas it makes a negative decision in step S279 if AVc<3 is not true, to proceed to step S281. In step S280, the arithmetic operation circuit 101 sets 3 (F2.8 (maximum aperture)) for the control aperture value AVc before proceeding to step S294.

In step S281, the arithmetic operation circuit 101 makes a decision as to whether or not the control aperture value AVc is larger than F22. The arithmetic operation circuit 101 makes an affirmative decision in step S281 if AVc>9 is true, to proceed to step S282, whereas it makes a negative decision in step S281 if AVc>9 is not true, to proceed to step S294. In step S282, the arithmetic operation circuit 101 sets 9 (F22 (minimum aperture)) for the control aperture value AVc before proceeding to step S294.

Through the processing executed in steps S279 through S282, the aperture value is controlled within the range of F2.8 to F22.

In step S283 to which the operation proceeds after making a negative decision in step S274 as described above, the arithmetic operation circuit 101 makes a decision as to whether or not the mode parameter M is currently set to 2. The arithmetic operation circuit 101 makes an affirmative decision in step S283 if M=2 (A mode) to proceed to step S284, whereas it makes a negative decision in step S283 if M≠2 (a mode other than A mode) to proceed to step S290.

In step S284, the arithmetic operation circuit 101 sets the value of the aperture value setting AVs into the control aperture value AVc before proceeding to step S285. In step S285, the arithmetic operation circuit 101 sets a value obtained by subtracting the control aperture value AVc from the exposure value EV for the control shutter speed TVc and then the operation proceeds to step S286.

In step S286, the arithmetic operation circuit 101 makes a decision as to whether or not the control shutter speed TVc is higher than 1/500 sec. The arithmetic operation circuit 101 makes an affirmative decision in step S286 if TVc>9 is true, to proceed to step S287, whereas it makes a negative decision in step S286 if TVc>9 is not true, to proceed to step S288. In step S287, the arithmetic operation circuit 101 sets 9 (1/500 sec) for the control shutter speed TVc before proceeding to step S294.

In step S288, the arithmetic operation circuit 101 makes a decision as to whether or not the control shutter speed TVc is lower than 30 sec. The arithmetic operation circuit 101 makes an affirmative decision in step S288 if TVc<−5 is true, to proceed to step S289, whereas it makes a negative decision in step S288 if TVc<−5 is not true, to proceed to step S294. In step S289, the arithmetic operation circuit 101 sets −5 (30 sec) for the control shutter speed TVc before proceeding to step S294.

Through the processing executed in steps S286 through S289, the shutter speed is controlled within the 30 sec to 1/500 sec range while the flash unit is utilized.

In step S290 to which the operation proceeds after making a negative decision in step S283 as described above, the arithmetic operation circuit 101 sets the value of the aperture value setting AVs into the control aperture value AVc and then the operation proceeds to step S291. In step S291, the arithmetic operation circuit 101 makes a decision as to whether or not the shutter speed setting TVs is higher than 1/500 sec. The arithmetic operation circuit 101 makes an affirmative decision in step S291 if TVs>9 is true, to proceed to step S292, whereas it makes a negative decision in step S291 if TVs>9 is not true, to proceed to step S293.

In step S292, the arithmetic operation circuit 101 sets 9 (1/500 sec) for the control shutter speed TVc before proceeding to step S294. In step S293, the arithmetic operation circuit 101 the value of the shutter speed setting TVs into the control shutter speed TVc, and then the operation proceeds to step S294.

In step S294, the arithmetic operation circuit 101 calculates the control aperture pulse number Pc representing the number of control aperture pulses as a function f of the number of steps (AVc−3) over which the aperture is to be adjusted, thereby ending the exposure calculation processing B in FIG. 11 to proceed to step S26 in FIG. 3.

Figure 12:
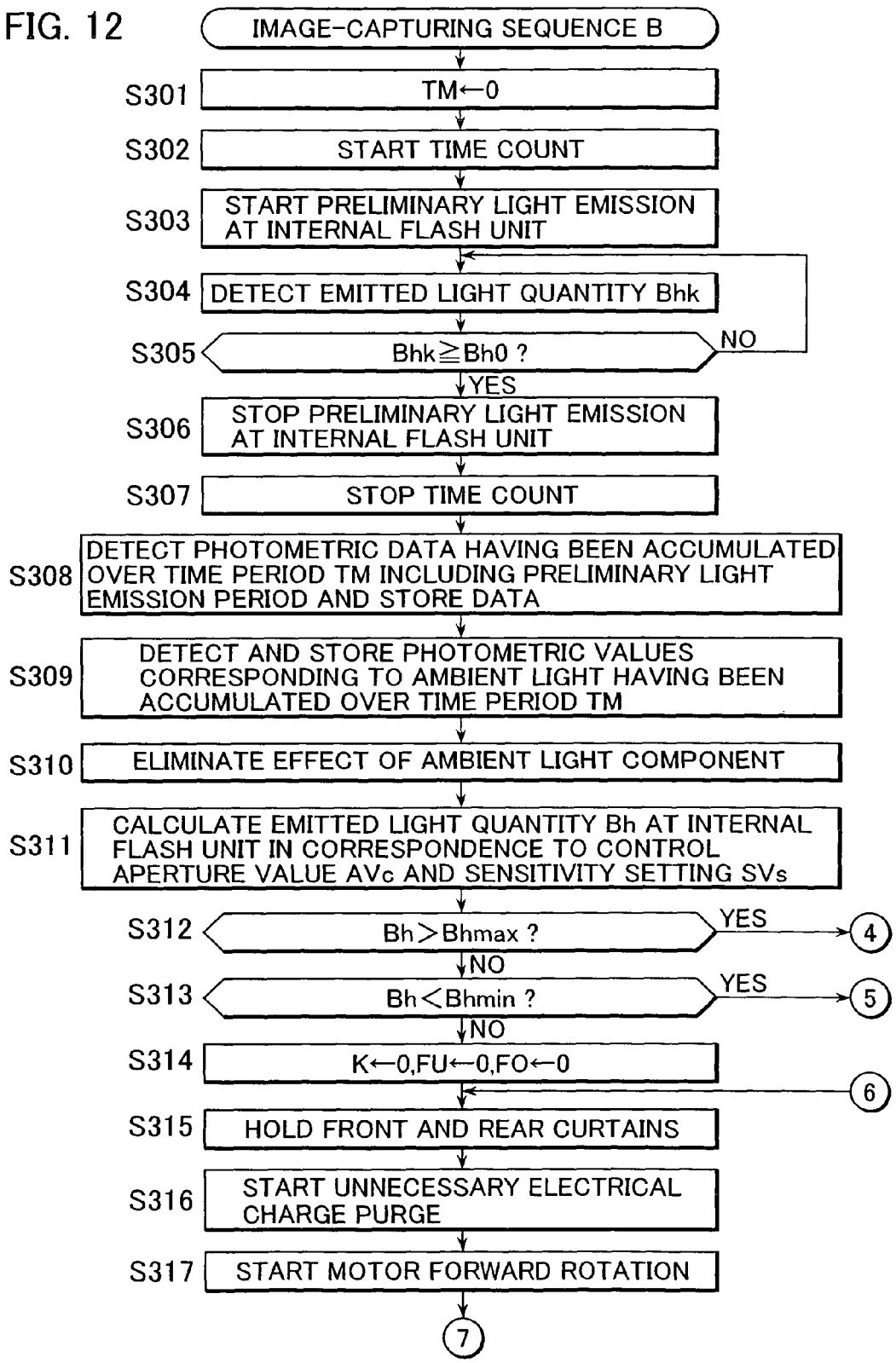
FIG. 12 presents a detailed flowchart of the image-capturing sequence processing B.

The image-capturing sequence processing B is now explained in detail in reference to the flowchart presented in FIGS. 12 through 15. Since the processing executed in step S301 and step S302 in FIG. 12 is identical to the processing executed in step S242 and step S243 explained earlier, its explanation is omitted. In step S303, the arithmetic operation circuit 101 issues an instruction for the internal flash unit light emission circuit 102 to start a preliminary light emission (pre-light emission) before proceeding to step S304.

In step S304, the arithmetic operation circuit 101 receives a time-integrated value input from the emitted light detection device 118 and detects the emitted light quantity Bhk from the light emitting unit 44 based upon this time-integrated value, before proceeding to step S305. In step S305, the arithmetic operation circuit 101 makes a decision as to whether or not the emitted light quantity Bhk from the internal flash unit and a predetermined emitted light value Bh0 have a relationship expressed as Bhk≧Bh0. The arithmetic operation circuit 101 makes an affirmative decision in step S305 if Bhk≧Bh0 is true, to proceed to step S306, whereas it makes a negative decision in step S305 if Bhk≧Bh0 is not true. After making a negative decision in step S305, the operation proceeds to step S304 to repeatedly execute the decision-making processing until the emitted light quantity Bhk becomes equal to the predetermined emitted light value Bh0.

In step S306, the arithmetic operation circuit 101 issues an instruction for the internal flash unit light emission circuit 102 to stop the preliminary light emission (pre-light emission) and then the operation proceeds to step S307. In step S307, the arithmetic operation unit 101 stops the time count TM before proceeding to step S308.

In step S308, the arithmetic operation circuit 101 takes in the photometric data (photometric data X(i) measured in correspondence to each of the divided areas) having been accumulated at the photometering device 103 during the time count TM (including the preliminary light emission period) and stores them in memory before proceeding to step S309.

In step S309, the arithmetic operation unit 101 takes in the photometric data (photometric data Y(i) measured in correspondence to each divided area) having accumulated at the photometering device 103 during the time count TM without emitting light at the internal flash unit after obtaining the photometric data in step S308 and stores them in memory before proceeding to step S310.

In step S310, the arithmetic operation circuit 101 obtains through calculation photometric data (photometric data Z(i)=X(i)−Y(i) calculated in correspondence to each divided area) from which the effect of the ambient light component is eliminated, and then the operation proceeds to step S311. In step S311, the arithmetic operation circuit 101 calculates a main emitted light quantity Bh to be achieved at the internal flash unit at the control aperture value AVc and the image-capturing sensitivity setting SVs by using the photometric data corresponding to the individual areas from which the effect of the ambient light component has been eliminated, and then the operation proceeds to step S312.

In step S312, the arithmetic operation circuit 101 compares the main emitted light quantity Bh having been calculated for the internal flash unit with a maximum emitted light quantity Bhmax set in advance for the internal flash unit to make a decision as to whether or not Bh>Bhmax is true. The arithmetic operation circuit 101 makes an affirmative decision in step S312 if Bh>Bhmax is true, to proceed to step S351 in FIG. 14, whereas it makes a negative decision in step S312 if Bh>Bhmax is not true, to proceed to step S313. The operation proceeds to step S351 if the image-capturing sensitivity setting SVs is too low and the sensitivity level thus needs to be adjusted to the control image-capturing sensitivity SVc, which is higher than the image-capturing sensitivity setting SVs.

In step S313, the arithmetic operation circuit 101 compares the main emitted light quantity Bh having been calculated for the internal flash unit with a minimum emitted light quantity Bhmin set in advance for the internal flash unit to make a decision as to whether or not Bh<Bhmin is true. The arithmetic operation circuit 101 makes an affirmative decision in step S313 if Bh<Bhmin is true, to proceed to step S371 in FIG. 15, whereas it makes a negative decision in step S313 if Bh<Bhmin is not true, to proceed to step S314. The operation proceeds to step S371 if the image-capturing sensitivity setting SVs is too high and the sensitivity level thus needs to be adjusted to the control image-capturing sensitivity SVc which is lower than the image-capturing sensitivity setting SVs.

In step S314, the arithmetic operation circuit 101 sets 0 for the flag K, the flag FU and the flag FO before proceeding to step S315. Since the processing executed in steps S315 through S317 is identical to the processing executed in steps S231 through S233 explained earlier, its explanation is omitted. Once the processing in step S317 is completed, the arithmetic operation circuit 101 proceeds to step S321 in FIG. 13.

Figure 13:
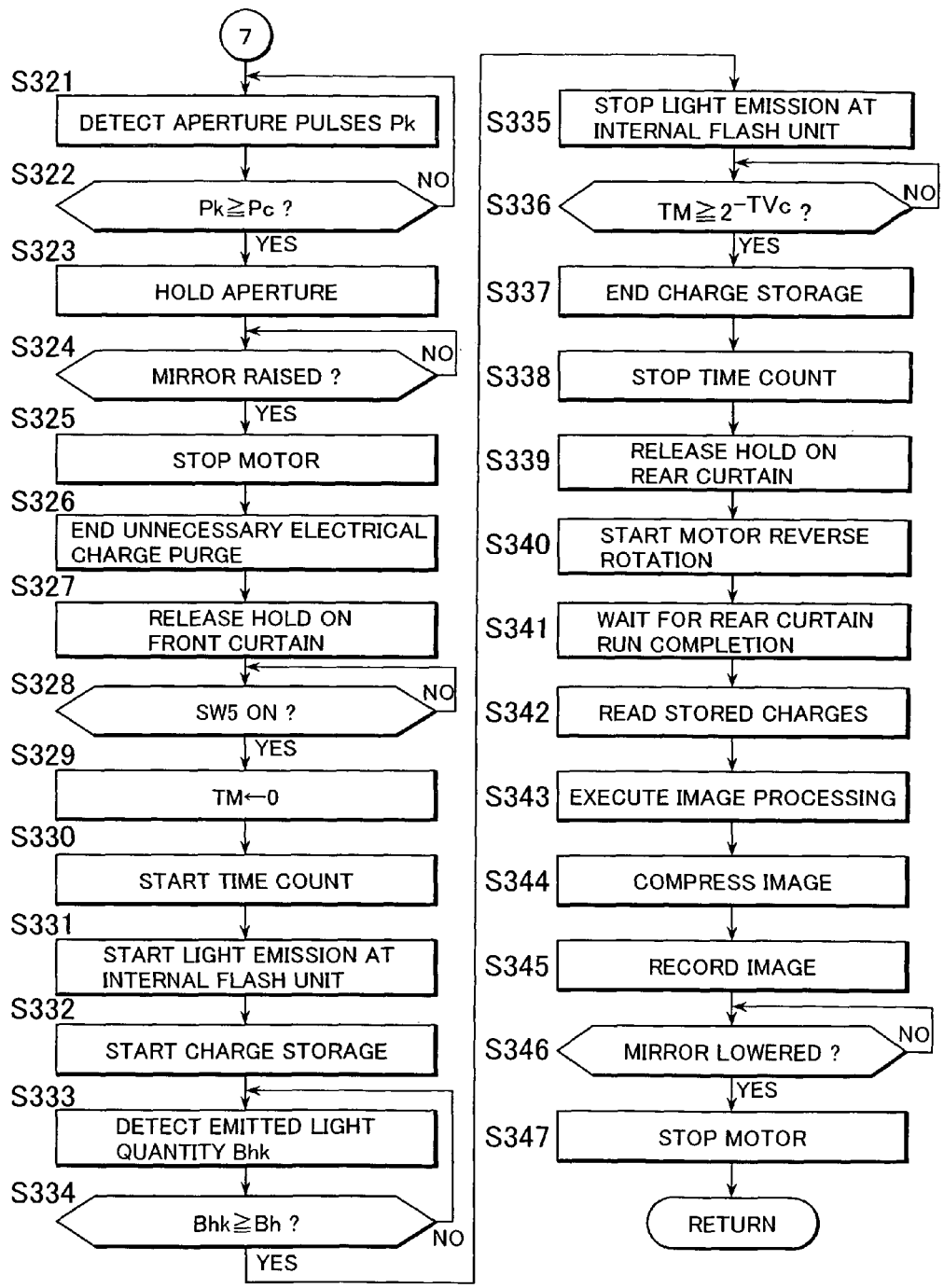
FIG. 13 presents a detailed flowchart of the image-capturing sequence processing B.

Since the processing executed in steps S321 through S330 in FIG. 13 is identical to the processing executed in steps S234 through S243 explained earlier, its explanation is omitted.

In step S331, the arithmetic operation circuit 101 issues an instruction for the internal flash unit light emission circuit 102 to start a main light emission, and then the operation proceeds to step S332. In step S332, the arithmetic operation circuit 101 starts charge storage at the image-capturing element 121 before proceeding to step S333.

Since the processing executed in step S333 through S335 is identical to the processing executed in steps S304 through S306 explained earlier, its explanation is omitted. However, in this case, the emitted light quantity Bhk from the light emitting unit 44 having been detected is compared with the emitted light quantity Bh having been calculated in step S311 and the main light emission is stopped if Bhk≧Bh is true.

Since the processing executed in steps S336 through S347 is identical to the processing executed in steps S245 through S256 explained earlier, its explanation is omitted. Upon completing the image-capturing sequence processing B in FIG. 13, the arithmetic operation circuit 101 proceeds to step S37 in FIG. 3.

Figure 14:
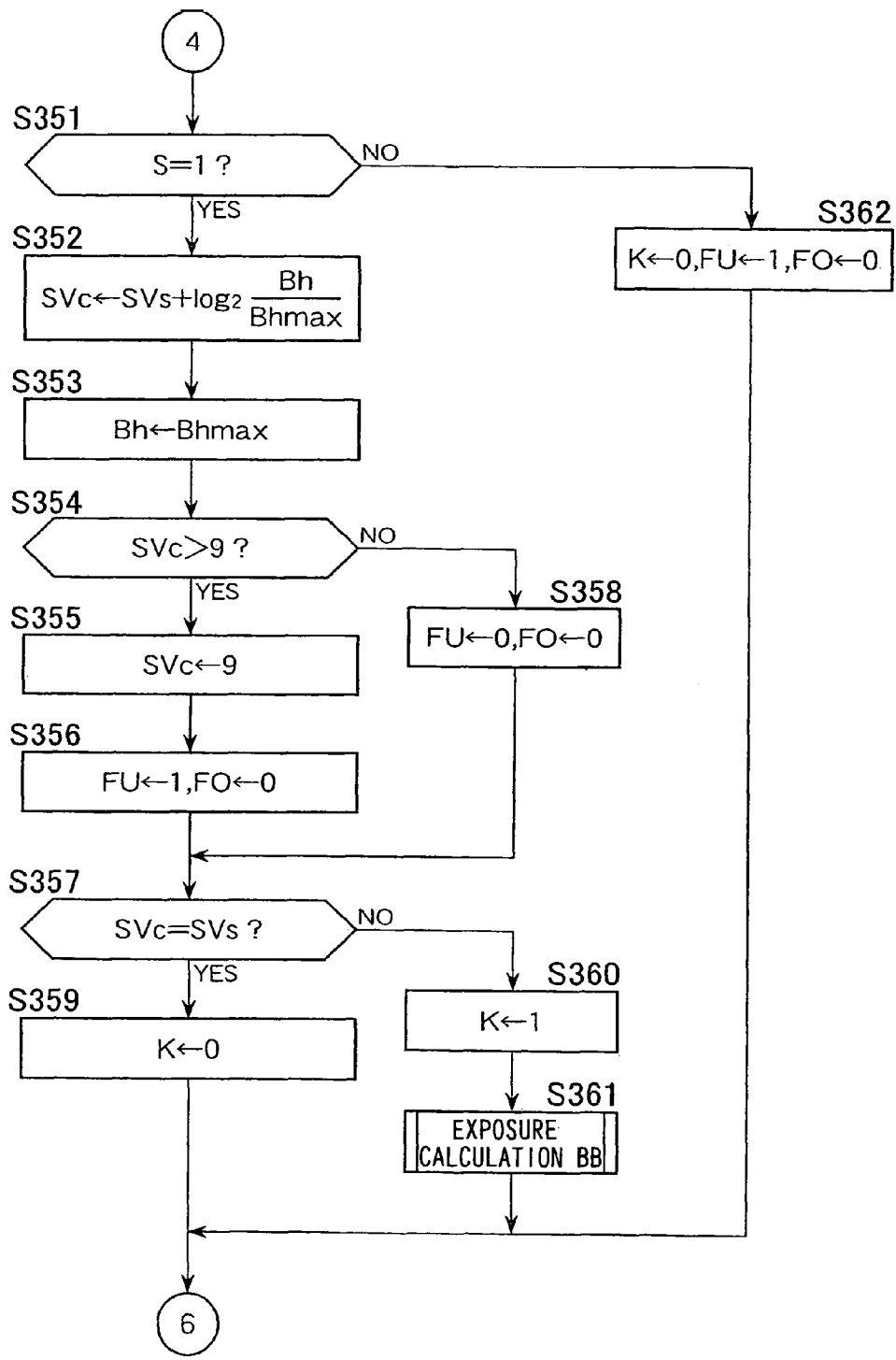
FIG. 14 presents a detailed flowchart of the image-capturing sequence processing B.

In step S351 in FIG. 14 to which the operation proceeds after making an affirmative decision in step S312 as described above, the arithmetic operation circuit 101 makes a decision as to whether or not the sensitivity automatic control mode flag S is currently set to 1. The arithmetic operation circuit 101 makes an affirmative decision in step S351 if S=1 (the sensitivity automatic control mode is currently set) to proceed to step S352, whereas it makes a negative decision in step S351 if S=0 (the sensitivity automatic control mode has been cleared) to proceed to step S362.

In step S352, the arithmetic operation circuit 101 calculates the control image-capturing sensitivity SVc as indicated in (3) below, and then the operation proceeds to step S353.

$$SVc=SVs+\log_2(Bh/Bh\text{max}) \qquad (3)$$

Expression (3) above has been formulated based upon the concept that the optimal exposure is achieved by controlling the flash quantity from the flash unit in inverse proportion to an increase in the image-capturing sensitivity (ISO equivalent).

In step S353, the arithmetic operation circuit 101 sets the emitted light quantity Bh of the internal flash unit equal to the maximum emitted light value Bhmax before proceeding to step S354. In step S354, the arithmetic operation circuit 101 makes a decision as to whether or not SVc>9 is true. The arithmetic operation circuit 101 makes an affirmative decision in step S354 if SVc>9 is true (if the control image-capturing sensitivity is higher than the level equivalent to ISO 1600) to proceed to step S355, whereas it makes a negative decision in step S354 if SVc>9 is not true, to proceed to step S358.

The operation proceeds to step S355 if the control image-capturing sensitivity SVc is beyond its setting range. In step S355, the arithmetic operation circuit 101 sets 9 for the control image-capturing sensitivity SVc, and then the operation proceeds to step S356. As a result, the control image-capturing sensitivity is set to the level equivalent to ISO 1600, which is the upper limit of the control range. In step S356, the arithmetic operation circuit 101 sets 1 for the flag FU and 0 for the flag FO before proceeding to step S357.

The operation proceeds step S358 if the control image-capturing sensitivity SVc is within the setting range. In step S358, the arithmetic operation circuit 101 sets 0 for both the flag FU and the flag FO before proceeding to step S357.

In step S357, the arithmetic operation circuit 101 compares the control image-capturing sensitivity SVc with the image-capturing sensitivity setting SVs to determine whether or not SVc=SVs is true. The arithmetic operation circuit 101 makes an affirmative decision in step S357 if SVc=SVs is true, to proceed to step S359, whereas it makes a negative decision in step S357 if SVc=SVs is not true, to proceed to step S360.

In step S359, the arithmetic operation circuit 101 sets 0 for the flag K, and then the operation proceeds to step S315 in FIG. 12. In step S360, the arithmetic operation circuit 101 sets 1 for the flag K, and then the operation proceeds to step S361.

In step S361, the arithmetic operation circuit 101 executes the exposure calculation processing BB, and then the operation proceeds to step S315 in FIG. 12. The exposure calculation processing BB is to be described in detail later.

In step S362 to which the operation proceeds after making a negative decision in step S351 as described above, the arithmetic operation circuit 101 sets 0 for the flag K, 1 for the flag FU and 0 for the flag FO and then the operation proceeds to step S315 in FIG. 12. In this situation, the sensitivity automatic control mode is not in effect and thus the arithmetic operation circuit simply sets the flags before proceeding to step S315.

Figure 15:
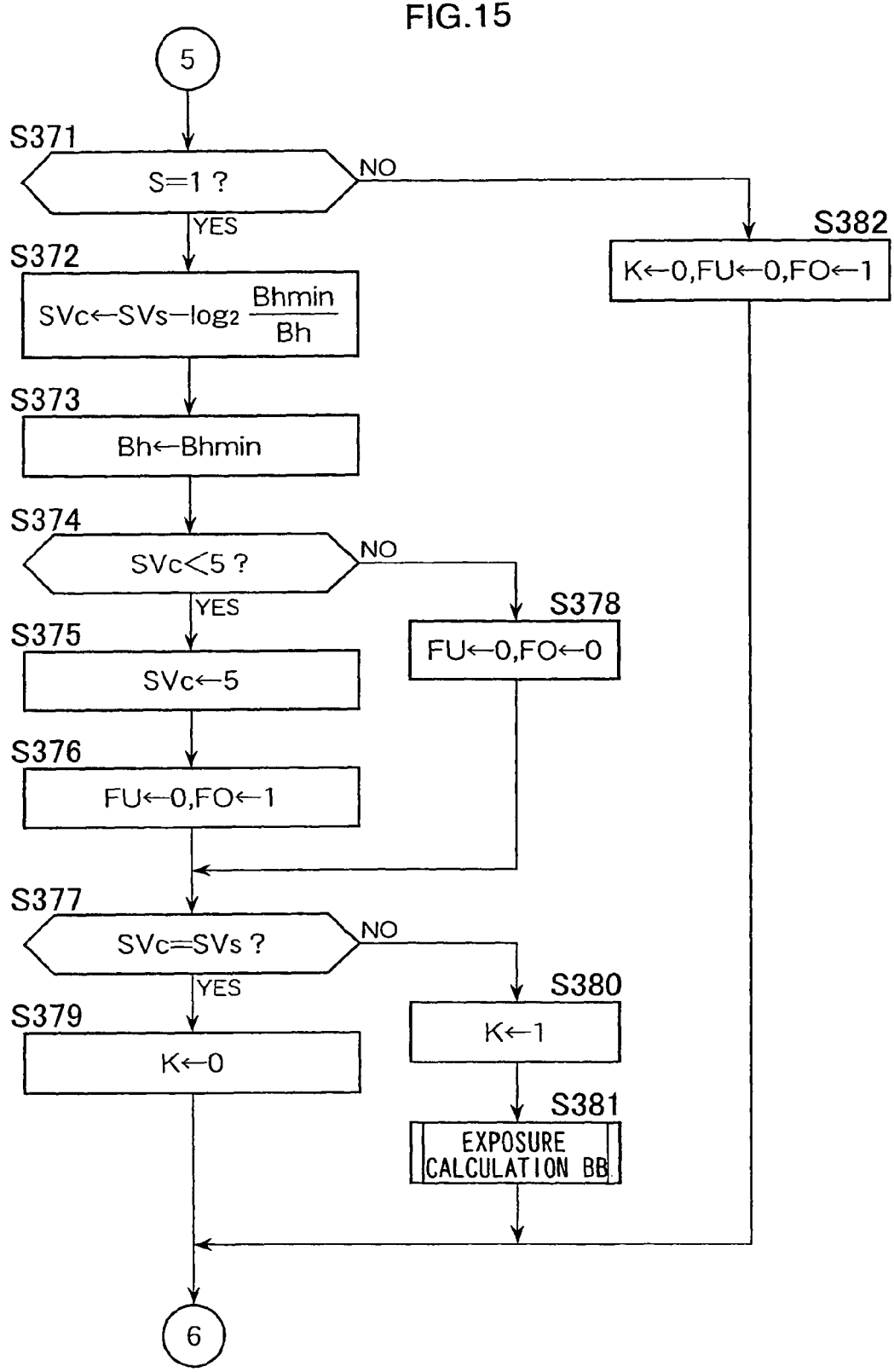
FIG. 15 presents a detailed flowchart of the image-capturing sequence processing B.

In step S371 in FIG. 15 to which the operation proceeds after making an affirmative decision in step S313 as described above, the arithmetic operation circuit 101 makes a decision as to whether or not the sensitivity automatic control mode flags is currently set to 1. The arithmetic operation circuit 101 makes an affirmative decision in step S371 if S=1 (the sensitivity automatic control mode is currently set) to proceed to step S372, whereas it makes a negative decision in step S371 if S=0 (the sensitivity automatic control mode has been cleared) to proceed to step S382.

In step S372, the arithmetic operation circuit 101 calculates the control image-capturing sensitivity SVc as indicated in (4) below, and then the operation proceeds to step S373.

$$SVc = SVs - \log_2(Bh\text{min}/Bh) \quad (4)$$

Expression (4) above has been formulated based upon the concept that the optimal exposure is achieved by controlling the flash quantity from the flash unit in inverse proportion to a decrease in the image-capturing sensitivity (ISO equivalent).

In step S373, the arithmetic operation circuit 101 sets the emitted light quantity Bh of the internal flash unit equal to the minimum emitted light value Bhmin before proceeding to step S374. In step S374, the arithmetic operation circuit 101 makes a decision as to whether or not SVc<5 is true. The arithmetic operation circuit 101 makes an affirmative decision in step S374 if SVc<5 is true (if the control image-capturing sensitivity is lower than the level equivalent to ISO 100) to proceed to step S375, whereas it makes a negative decision in step S374 if SVc<5 is not true, to proceed to step S378.

The operation proceeds to step S375 if the control image-capturing sensitivity SVc is below its setting range. In step S375, the arithmetic operation circuit 101 sets 5 for the control image-capturing sensitivity SVc, and then the operation proceeds to step S376. As a result, the control image-capturing sensitivity is set to the level equivalent to ISO 100, which is the lower limit of the control range. In step S376, the arithmetic operation circuit 101 sets the flag FU to 0 and 1 for the flag FO before proceeding to step S377.

The operation proceeds step S378 if the control image-capturing sensitivity SVc is within the setting range. In step S378, the arithmetic operation circuit 101 sets 0 for both the flag FU and the flag FO before proceeding to step S377.

In step S377, the arithmetic operation circuit 101 compares the control image-capturing sensitivity SVc with the image-capturing sensitivity setting SVs to determine whether or not SVc=SVs is true. The arithmetic operation circuit 101 makes an affirmative decision in step S377 if SVc=SVs is true, to proceed to step S379, whereas it makes a negative decision in step S377 if SVc=SVs is not true, to proceed to step S380.

In step S379, the arithmetic operation circuit 101 sets 0 for the flag K, and then the operation proceeds to step S315 in FIG. 12. In step S380, the arithmetic operation circuit 101 sets 1 for the flag K, and then the operation proceeds to step S381.

In step S381, the arithmetic operation circuit 101 executes the exposure calculation processing BB, and then the operation proceeds to step S315 in FIG. 12. The exposure calculation processing BB is to be described in detail later.

In step S382 to which the operation proceeds after making a negative decision in step S371 as described above, the arithmetic operation circuit 101 sets 0 for the flag K, 0 for the flag FU and 1 for the flag FO and then the operation proceeds to step S315 in FIG. 12. In this situation, the sensitivity automatic control mode is not in effect and thus the arithmetic operation circuit simply sets the flags before proceeding to step S315.

(When the External Flash Unit is Utilized)

The processing executed in case 3 is now explained in reference to the flowchart presented in FIG. 4. Since the processing executed in step S51 through S58 in FIG. 4 is identical to the processing executed in steps S23 through S30 explained earlier, its explanation is omitted.

In step S59, the arithmetic operation circuit 101 makes a decision as to whether or not the value indicated by the flag F having been received from the external flash unit 11 through the communication processing executed as described earlier is 1. The arithmetic operation circuit 101 makes an affirmative decision in step S59 if F=1 (the charge has been completed) to proceed to step S60, whereas it makes a negative decision in step S59 if F≠1 (the charge has not been completed) to proceed to step S61.

In step S60, the arithmetic operation circuit 101 outputs a command for the display device 111 to bring up a display indicating the completion of the charge, and then the operation proceeds to step S61. At this time, the display device may indicate the charge completion by lighting a thunderbolt icon in the viewfinder (not shown).

Since the processing executed in steps S61 through S68 is identical to the processing executed in steps S35 through S42 explained earlier, its explanation is omitted. However, in this case, the image-capturing sequence processing C instead of the image-capturing sequence processing B is executed. In addition, after executing the processing step S66 or step S68 or after making a negative decision in step S67, the operation returns to step S2 in FIG. 2.

Figure 16:
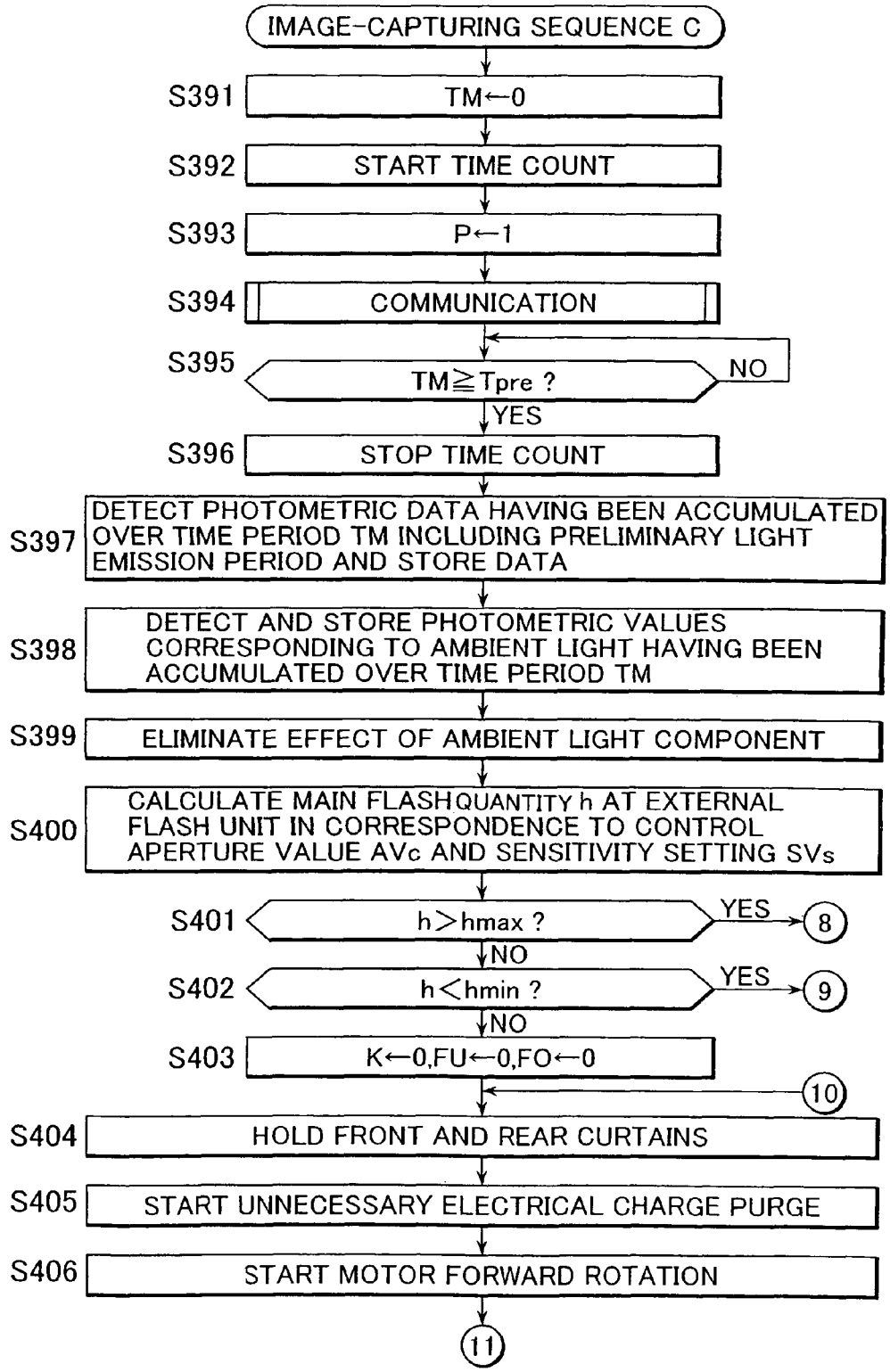
FIG. 16 presents a detailed flowchart of the image-capturing sequence processing C.

The image-capturing sequence processing C is now explained in detail in reference to the flowchart presented in FIGS. 16 through 19. Since the processing executed in steps S391 and S392 in FIG. 16 is identical to the processing executed in steps S242 and S243 explained earlier, its explanation is omitted. In step S393, the arithmetic operation circuit 101 sets 1 for the flag P before proceeding to step S394. In step S394, the arithmetic operation circuit 101 executes the communication processing to communicate with the controller 201 of the external flash unit 11 as described earlier, and then the operation proceeds to step S395. As the controller 201 at the external flash unit 11 receives flag P=1 through the communication, the light emission circuit 202 engages the light emitting unit 11a to execute a preliminary light emission with a small output.

In step S395, the arithmetic operation circuit 101 makes a decision as to whether or not the time count TM is equal to or greater than a predetermined length of time Tpre set for the preliminary light emission The arithmetic operation circuit 101 makes an affirmative decision in step S395 if TM≧Tpre is true, to proceed to step S396, whereas it makes a negative decision in step S395 if TM≧Tpre is not true, to repeatedly execute the decision-making processing.

In step S396, the arithmetic operation circuit 101 stops the time count TM before proceeding to step S397.

In step S397, the arithmetic operation circuit 101 takes in the photometric data (photometric data X(i) measured in correspondence to each of the divided areas) having been accumulated at the photometering device 103 during the time count TM (including the preliminary light emission period) and stores them in memory before proceeding to step S398.

In step S398, the arithmetic operation unit 101 takes in the photometric data (photometric data Y(i) measured in correspondence to each divided area) having been accumulated at the photometering device 103 during the time count TM without emitting light at the external flash unit 11 after obtaining the photometric data in step S397 and stores them in memory before proceeding to step S399.

In step S399, the arithmetic operation circuit 101 obtains through calculation photometric data (photometric data Z(i)= X(i)−Y(i) calculated in correspondence to each divided area) from which the effect of the ambient light component is eliminated, and then the operation proceeds to step S400. In step S400, the arithmetic operation circuit 101 calculates a main flash quantity h to be achieved at the external flash unit 11 at the control aperture value AVc and the image-capturing sensitivity setting SVs by using the photometric data corresponding to the individual areas from which the effect of the ambient light component has been eliminated, and then the operation proceeds to step S401.

In step S401, the arithmetic operation circuit 101 compares the main flash quantity h having been calculated for the external flash unit 11 with a maximum flash quantity hmax of the external flash unit 11 having been ascertained through the communication to make a decision as to whether or not h>hmax is true. The arithmetic operation circuit 101 makes an affirmative decision in step S401 if h>hmax is true, to proceed to step S441 in FIG. 18, whereas it makes a negative decision in step S401 if h>hmax is not true, to proceed to step S402. The operation proceeds to step S441 if the image-capturing sensitivity setting SVs is too low and the sensitivity level thus needs to be adjusted to the control image-capturing sensitivity SVc, which is higher than the image-capturing sensitivity setting SVc.

In step S402, the arithmetic operation circuit 101 compares the main flash quantity h having been calculated for the external flash unit 11 with a minimum flash quantity hmin of the external flash unit 11 having been ascertained through the communication to make a decision as to whether or not h<hmin is true. The arithmetic operation circuit 101 makes an affirmative decision in step S402 if h<hmin is true, to proceed to step S461 in FIG. 19, whereas it makes a negative decision in step S402 if h<hmin is not true, to proceed to step S403. The operation proceeds to step S461 if the image-capturing sensitivity setting SVs is too high and the sensitivity level thus needs to be adjusted to the control image-capturing sensitivity SVc, which is lower than the image-capturing sensitivity setting SVc.

In step S403, the arithmetic operation circuit 101 sets 1 for the flag K, the flag FU and the flag FO before proceeding to step S404. Since the processing executed in steps S404 through S406 is identical to the processing executed in steps S231 through S233 explained earlier, its explanation is omitted. Once the processing in step S406 is completed, the arithmetic operation circuit 101 proceeds to step S411 in FIG. 17.

Figure 17:
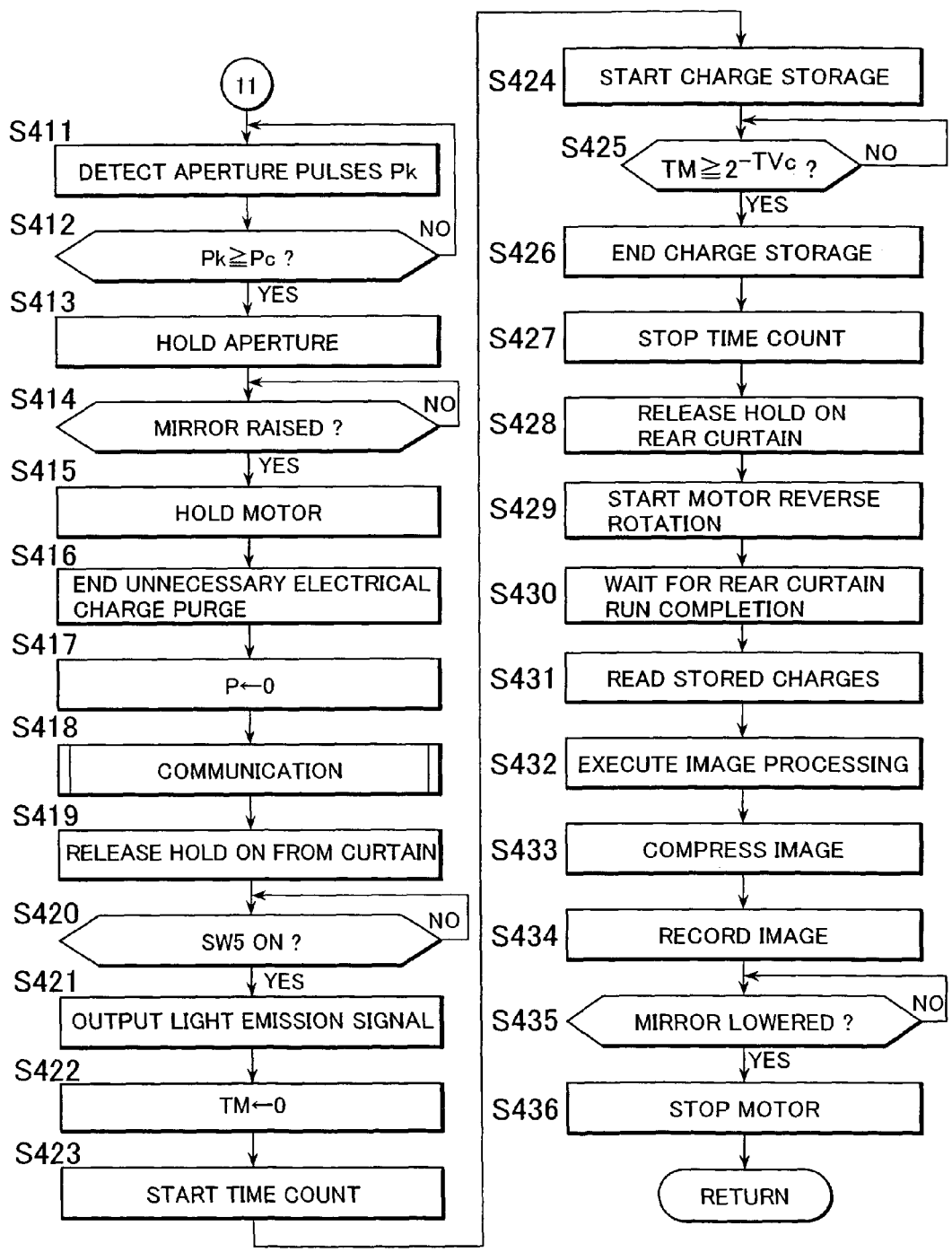
FIG. 17 presents a detailed flowchart of the image-capturing sequence processing C.

Since the processing executed in steps S411 through S416 in FIG. 17 is identical to the processing executed in steps S234 through S249 explained earlier, its explanation is omitted.

In step S417, the arithmetic operation circuit 101 sets 0 for the flag P and then the operation proceeds to step S418. In step S418, the arithmetic operation circuit 101 executes communication processing to communicate with the controller 201 at the external flash unit 11 before proceeding to step S419. In this case, since the flag P is set to 0, no preliminary light emission is executed. The controller 201 receives information indicating the main flash quantity h through the communication processing.

Since the processing executed in steps S419 and S420 is identical to the processing executed in steps S240 and S 241 explained earlier, its explanation is omitted.

In step S421, the arithmetic operation circuit 101 outputs a signal constituting an instruction for the light emission circuit 102 at the external flash unit 11 to start a main light emission and then the operation proceeds to step S422. In response to the signal thus output, the external flash unit 11 emits light at the main flash quantity h.

Since the processing executed in steps S422 through S436 is identical to the processing executed in steps S242 through S256 explained earlier, its explanation is omitted. Upon completing the image-capturing sequence processing C in FIG. 17, the arithmetic operation circuit 101 proceeds to step S63 in FIG. 4.

Figure 18:
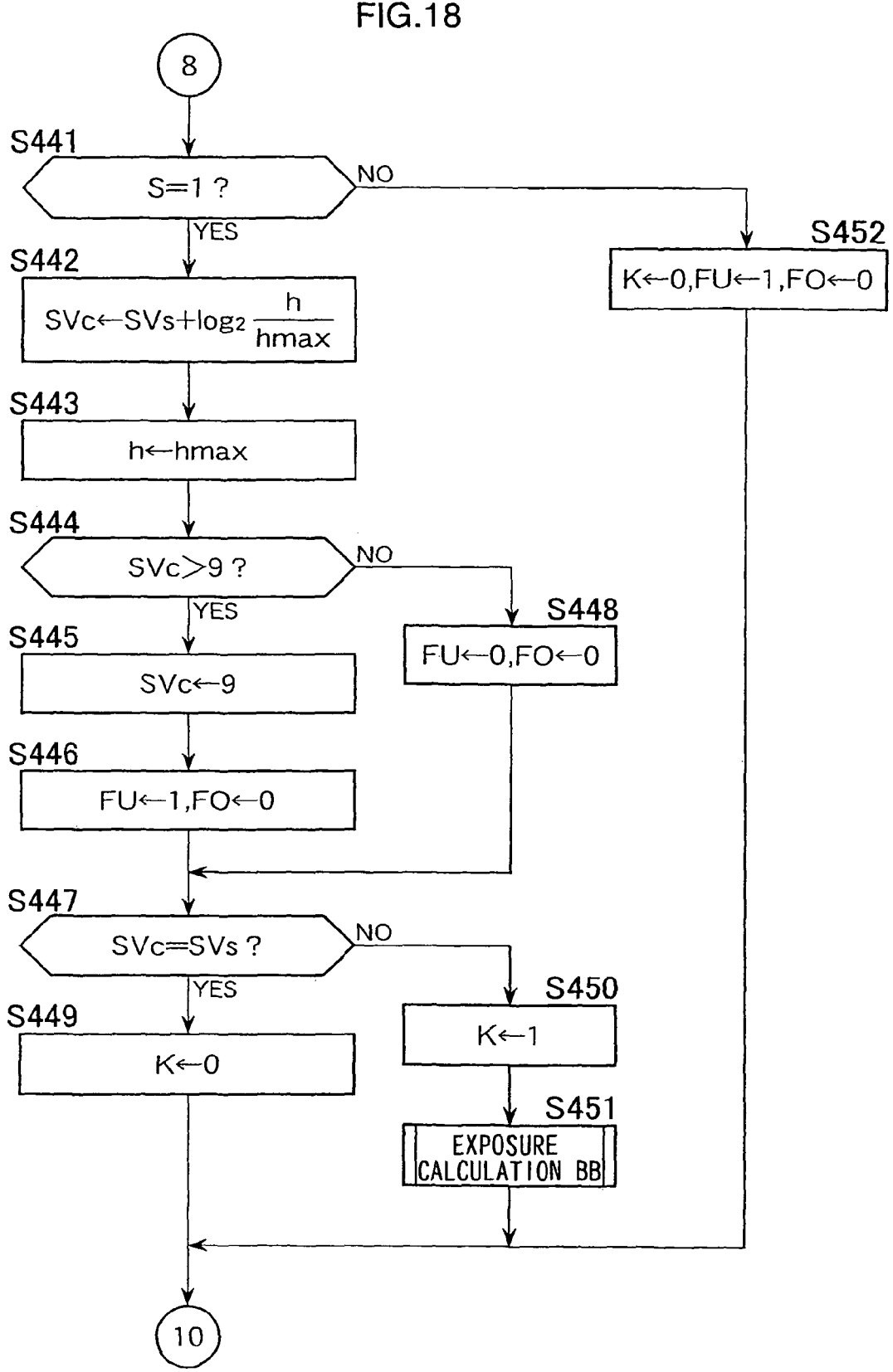
FIG. 18 presents a detailed flowchart of the image-capturing sequence processing C.

In step S441 in FIG. 18 to which the operation proceeds after making an affirmative decision in step S401 as described above, the arithmetic operation circuit 101 makes a decision as to whether or not the sensitivity automatic control mode flag S is currently set to 1. The arithmetic operation circuit 101 makes an affirmative decision in step S441 if S=1 (the sensitivity automatic control mode is currently set) to proceed to step S442, whereas it makes a negative decision in step S441 if S=0 (the sensitivity automatic control mode has been cleared) to proceed to step S452.

In step S442, the arithmetic operation circuit 101 calculates the control image-capturing sensitivity SVc as indicated in (5) below, and then the operation proceeds to step S443.

$$SVc=SVs+\log_2(h/h\text{max}) \qquad (5)$$

Expression (5) above has been formulated based upon the concept that the optimal exposure is achieved by controlling the flash quantity from the flash unit in inverse proportion to an increase in the image-capturing sensitivity (ISO equivalent).

In step S443, the arithmetic operation circuit 101 sets the flash quantity h of the external flash unit 11 equal to the maximum flash quantity value hmax before proceeding to step S444.

Since the processing executed in steps S444 through S452 is identical to the processing executed in steps S354 through S362 explained earlier, its explanation is omitted. Upon completing the processing in step S449, step S451 or step S452, the arithmetic operation circuit 101 proceeds to step S404 in FIG. 16.

Figure 19:
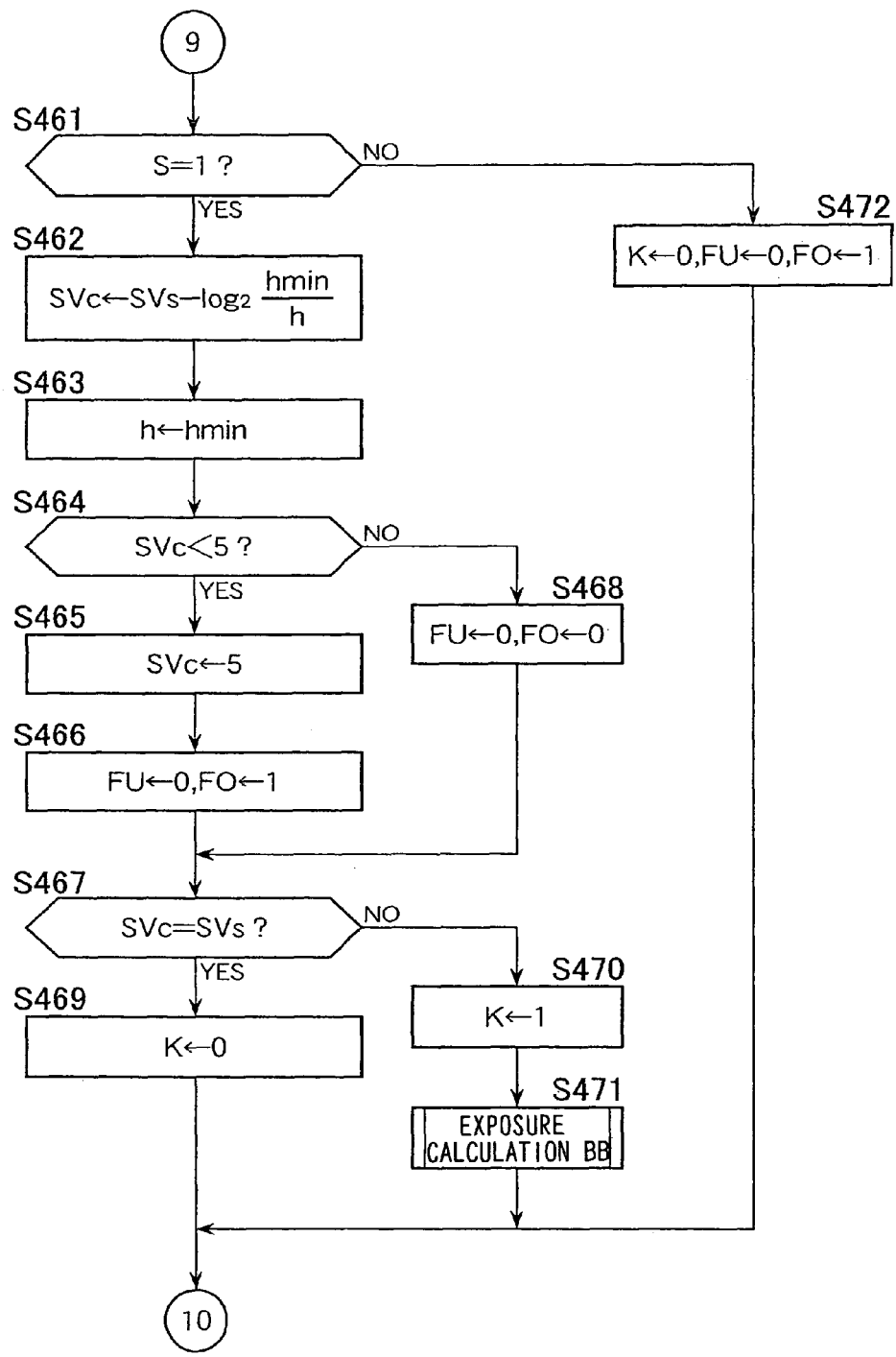
FIG. 19 presents a detailed flowchart of the image-capturing sequence processing C.

In step S461 in FIG. 19 to which the operation proceeds after making an affirmative decision in step S402 as described above, the arithmetic operation circuit 101 makes a decision as to whether or not the sensitivity automatic control mode flag S is currently set to 1. The arithmetic operation circuit 101 makes an affirmative decision in step S461 if S=1 (the sensitivity automatic control mode is currently set) to proceed to step S462, whereas it makes a negative decision in step S461 if S=0 (the sensitivity automatic control mode has been cleared) to proceed to step S472.

In step S462, the arithmetic operation circuit 101 calculates the control image-capturing sensitivity SVc as indicated in (6) below, and then the operation proceeds to step S463.

$$SVc=SVs-\log_2(h\text{min}/h) \qquad (6)$$

Expression (6) above has been formulated based upon the concept that the optimal exposure is achieved by controlling the flash quantity from the flash unit in inverse proportion to a decrease in the image-capturing sensitivity (ISO equivalent).

In step S463, the arithmetic operation circuit 101 sets the flash quantity h of the external flash unit 11 equal to the minimum flash quantity value hmin before proceeding to step S464.

Since the processing executed in steps S464 through S472 is identical to the processing executed in steps S374 through S382 explained earlier, its explanation is omitted. Upon completing the processing in step S469, step S471 or step S472, the arithmetic operation circuit 101 proceeds to step S404 in FIG. 16.

Figure 20:
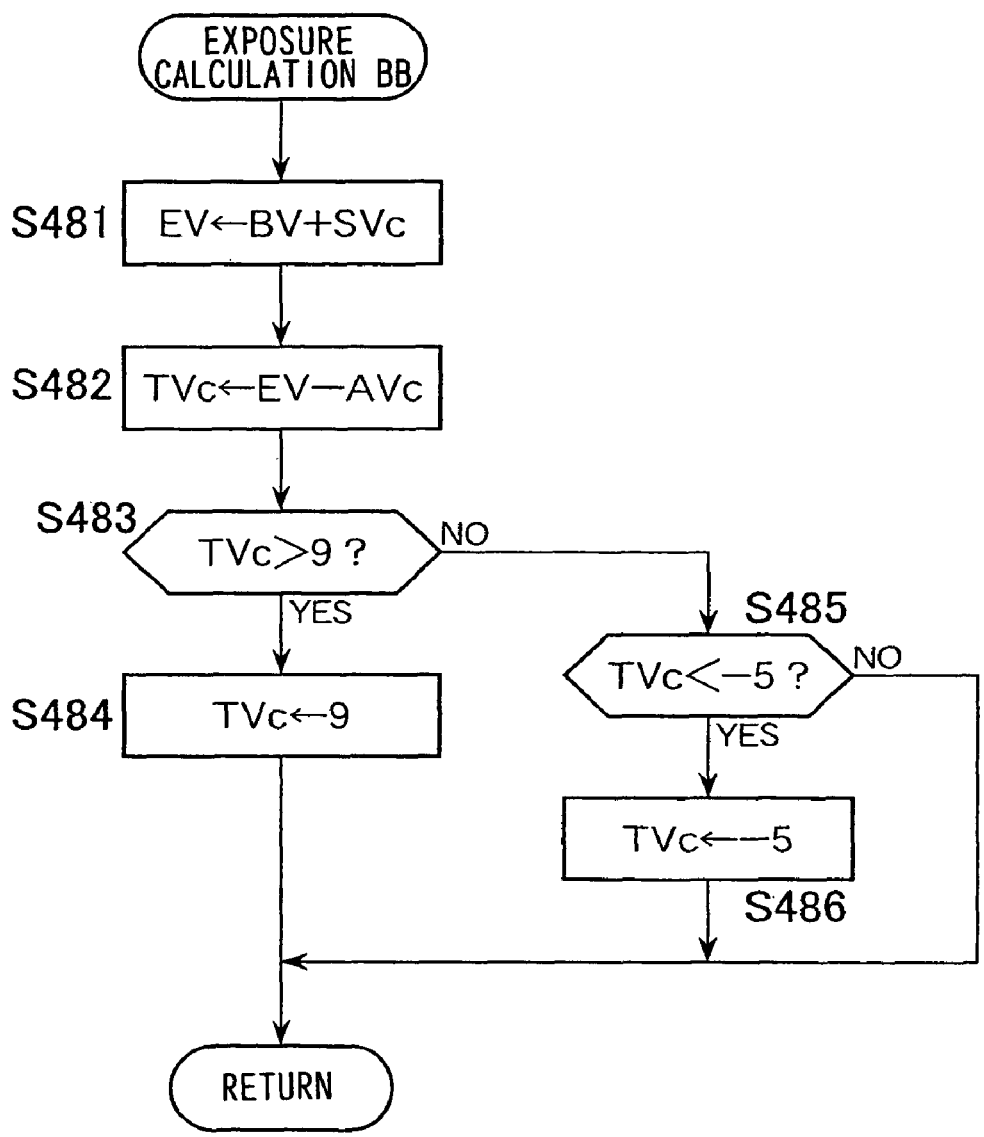
FIG. 20 presents a detailed flowchart of the exposure calculation processing BB.

The exposure calculation processing BB is now explained in reference to the flowchart presented in FIG. 20. The exposure calculation BB is executed to adjust for the change in the background exposure conditions resulting from a change in the sensitivity adjusted in order to correct any excess or insufficiency (lack) in the flash quantity of the flash unit. In step S481 in FIG. 20, the arithmetic operation circuit 101 executes an arithmetic operation to calculate EV=BV+SVc before proceeding to step S482. EV in the expression represents the exposure value. The control image-capturing sensitivity SVc is the image-capturing sensitivity level having been adjusted to correct the excess/insufficiency of flash quantity. The subject rightness BV assumes the value having been obtained through the processing executed in step S7, S24 or S52.

In step S482, the arithmetic operation circuit 101 sets a value obtained by subtracting the control aperture value AVc from the exposure value EV for the control shutter speed TVc before the operation proceeds to step S483.

In step S483, the arithmetic operation circuit 101 makes a decision as to whether or not the control shutter speed TVc is higher than 1/500 sec. The arithmetic operation circuit 101 makes an affirmative decision in step S483 if TVc>9 is true, to proceed to step S484, whereas it makes a negative decision in step S483 if TVc>9 is not true, to proceed to step S485. In step S484, the arithmetic operation circuit 101 sets 9 (1/500 sec) for the control shutter speed TVc before ending the exposure calculation processing BB as shown in FIG. 20.

In step S485, the arithmetic operation circuit 101 makes a decision as to whether or not the control shutter speed TVc is lower than 30 sec. The arithmetic operation circuit 101 makes an affirmative decision in step S485 if TVc<−5 is true, to proceed to step S486, whereas it makes a negative decision in step S485 if TVc<−5 is not true, and ends the processing in FIG. 20.

Through the processing executed in steps S483 through S486, the shutter speed is controlled within the 30 sec to 1/500 sec range while the flash unit is utilized.

The first embodiment described above is now summarized.

The following advantages are achieved in the electronic camera 1 capable of operating in an operation mode (image-capturing sensitivity automatic control mode) in which the control aperture value AVc and/or the control shutter speed TVc can be calculated based upon the subject rightness BV and the image-capturing sensitivity setting SVc, the control image-capturing sensitivity SVc is also determined through an arithmetic operation so as to achieve optimal exposure and exposure control is implemented by switching from the image-capturing sensitivity setting SVs to the control image-capturing sensitivity SVc.

(1) When a photographing operation is performed with the electronic camera 1 by utilizing the internal flash unit (or the external flash unit 11), in particular, the emitted light quantity (or flash quantity) Bh (or h) to be achieved through the main light emission is calculated based upon the time-integrated value obtained by executing a preliminary light emission at the flash unit, which is provided by the emitted light quantity detection device 118. If this flash quantity value is beyond the upper limit or below the lower limit of the flash quantity of the internal flash unit (or the external flash unit 11), optimal exposure is achieved by switching from the image-capturing sensitivity setting SVs to the control image-capturing sensitivity SVc. As a result, even when the quantity of light emitted from the flash unit is excessive or insufficient, the optimal exposure can be achieved by automatically adjusting the image-capturing sensitivity.

(2) Since the flash quantity Bh (or h) achieved through the main light emission is calculated by first eliminating the ambient light (ambient light from the sun, indoor lighting or the like, other than the light emitted from the flash unit) component, the quantity of light emitted through the preliminary light emission at the flash unit can be accurately ascertained.

(3) When the image-capturing sensitivity setting SVs is switched to the control image-capturing sensitivity SVc as described in (1) above, the exposure calculation processing BB is executed so as to adjust for the change in the exposure (the value determined in correspondence to the shutter speed, the aperture value and the image-capturing sensitivity) of the background resulting from the change in the sensitivity level, which is adjusted to correct the excess/insufficiency of flash quantity from the flash unit, by adjusting the shutter speed. Thus, even if the image-capturing sensitivity is raised to compensate for a low brightness level of the main subject at the center of the photographic field when photographing an image with a backlit landscape in the background in a fill-in flash photographing operation, for instance, over-exposure of the background can be prevented since the control shutter speed TVc is recalculated (S482).

While an explanation is given above on an example in which the internal flash unit built into the electronic camera moves between the operating position and the storage position, the internal flash unit does not need to be a pop-up type flash unit. If the electronic camera includes a non-pop-up flash unit, a light emission enabled state of the internal flash unit set through an operation of an operation member (not shown) of the electronic camera corresponds to the state in which the internal flash unit in the embodiment explained above assumes the operating position and a light emission disabled state of the internal flash unit set through an operation of the operation member corresponds to the state in which the internal flash unit in the embodiment assumes the storage position.

Second Embodiment

While an adjustment for the change in the background exposure is achieved through the exposure calculation processing BB regardless of the exposure mode setting (the P mode, the S mode, the A mode or the M mode) in the first embodiment, the adjustment for the change in the background exposure may be executed only when the camera is set in the P mode or the A mode, instead.

Figure 23:
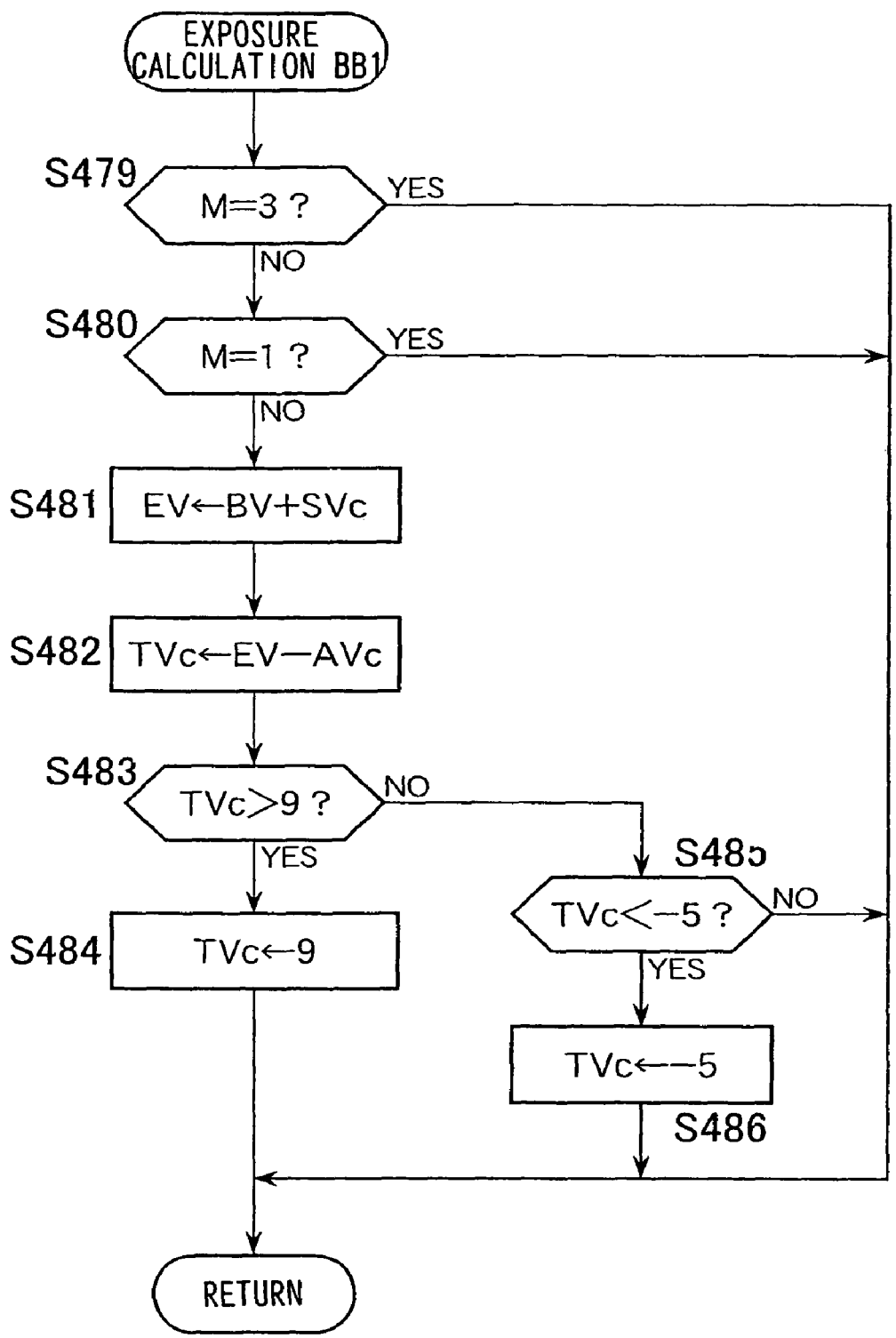
FIG. 23 presents a detailed flowchart of the exposure calculation processing BB1 in a second embodiment.

FIG. 23 presents a detailed flowchart of the exposure calculation processing BB1. The exposure calculation BB1 is executed in place of the exposure calculation BB. The processing in FIG. 23 differs from that in FIG. 20 in that additional steps S479 and S480 are executed. In step S479 in FIG. 23, the arithmetic operation circuit 101 makes a decision as to whether or not the mode parameter M it is currently set to 3. The arithmetic operation circuit 101 makes an affirmative decision in step S479 if M=3 (M mode) to end the exposure calculation processing BB1 in FIG. 23 and, in this case, no exposure calculation is executed (the shutter speed remains unchanged). If, on the other hand, M≠3 (a mode other than the M mode), the arithmetic operation circuit 101 makes a negative decision in step S479 to proceed to step S480.

In step S480, the arithmetic operation circuit 101 makes a decision as to whether or not the mode parameter M is set to 1. The arithmetic operation circuit 101 makes an affirmative decision in step S480 if M=1 (S mode) to end the exposure calculation processing BB1 in FIG. 23 and, in this case, no exposure calculation is executed (the shutter speed remains unchanged). If, on the other hand, M≠1 (a mode other than the M mode), the arithmetic operation circuit 101 makes a negative decision in step S480 to proceed to step S481.

Since the processing executed in step S481 and subsequent steps to which the operation proceeds if the camera is set neither in the M mode nor the S mode is identical to the processing executed in steps assigned with the same step numbers in FIG. 20, its explanation is omitted.

The second embodiment described above in which an adjustment for the change in the exposure of the background resulting from a change in the sensitivity level is achieved by adjusting the shutter speed in the P mode and the A mode but the shutter speed remains unchanged in the M mode and the S mode, achieves an advantage in that the value of the shutter speed setting TVs is not changed against the intention of the photographer. It is to be noted that a change in the shutter speed is synonymous with a change in the length of the exposure time.

Figure 24:
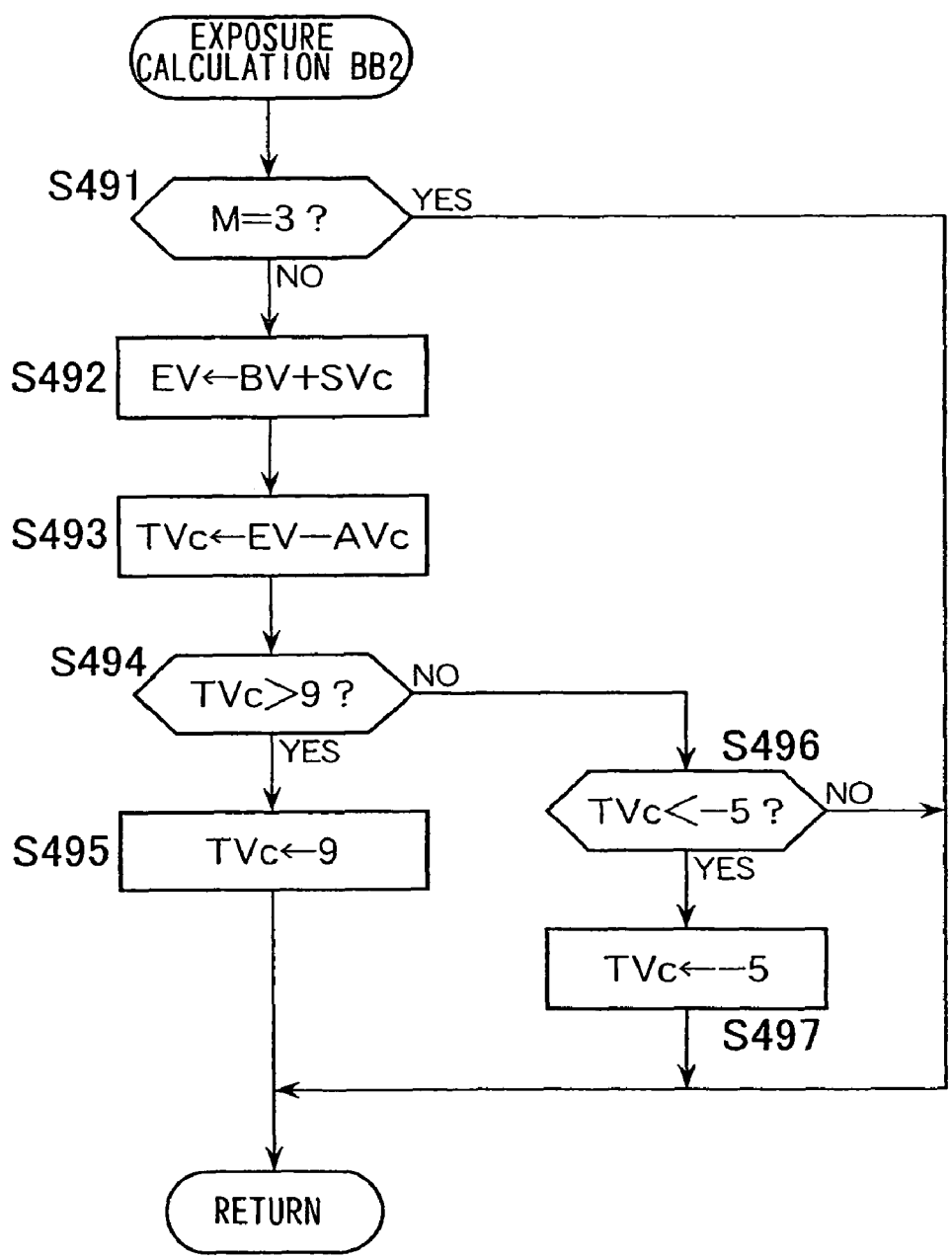
FIG. 24 presents a detailed flowchart of the exposure calculation processing BB2.

The shutter speed may remain unchanged only in the M mode, instead. FIG. 24 presents a detailed flowchart of the exposure calculation processing BB2 executed in such an application. The processing in FIG. 24 differs from that in FIG. 23 in that the processing in step S480 is omitted. Through the processing in FIG. 24, an adjustment for the change in the exposure of the background resulting from a change in the sensitivity level is achieved by switching the shutter speed in the P mode the A mode and the S mode, but the shutter speed is not changed in the M mode. As a result, the value of the shutter speed TVs set in the M mode cannot be changed against the intention of the photographer.

Third Embodiment

While the background exposure is adjusted by changing the shutter speed in the first embodiment and the second embodiment, the background exposure may instead be adjusted by re-executing the exposure calculation matching the current exposure mode setting. FIGS. 25 through 28 present a detailed flowchart of the exposure calculation processing BB3 executed in such an application. The exposure calculation BB3 is executed in place of the exposure calculation BB.

Figure 25:
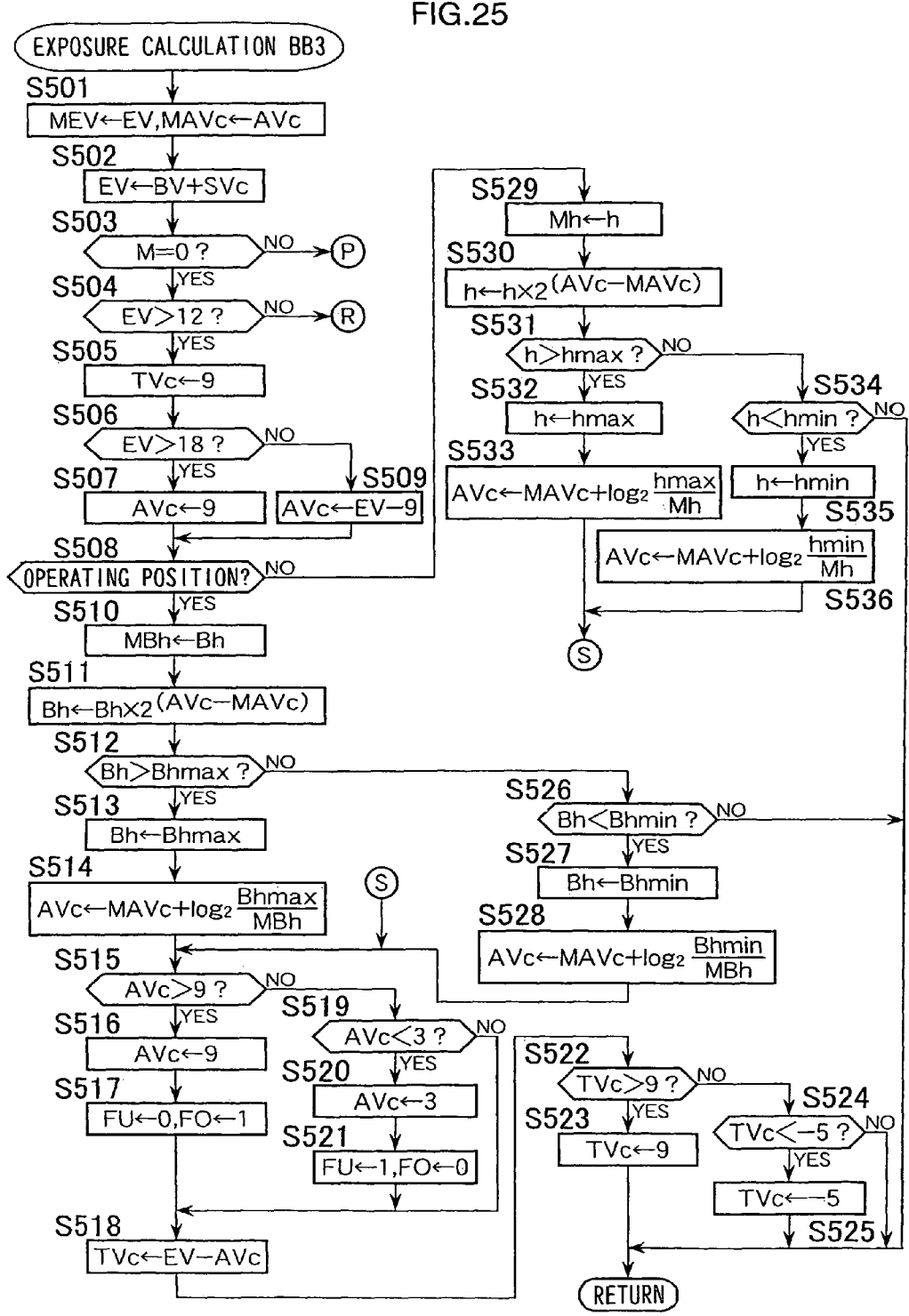
FIG. 25 presents a detailed flowchart of the exposure calculation processing BB3 in a third embodiment.

In step S501 in FIG. 25, the arithmetic operation circuit 101 sets the exposure value EV into a saved exposure value MEV and the control aperture value AVc into a saved control aperture value MAVc, before proceeding to step S502. In step S502, the arithmetic operation circuit 101 sets a value obtained by adding the control image-capturing sensitivity SVc to the subject brightness BV as the exposure value EV, and then the operation proceeds to step S503.

In step S503, the arithmetic operation circuit 101 makes a decision as to whether or not the electronic camera is set in the P mode. The arithmetic operation circuit 101 makes an affirmative decision in step S503 if M=0 (program automatic exposure mode) to proceed to step S504, whereas it makes a negative decision in step S503 if M≠0 (a mode other than the program automatic exposure mode) to proceed to step S571 in FIG. 27.

In step S504, the arithmetic operation circuit 101 makes a decision as to whether or not the exposure value EV is greater than 12. The arithmetic operation circuit 101 makes an affirmative decision in step S504 if EV>12 is true, to proceed to step S505, whereas it makes a negative decision in step S504 if EV>12 is not true, to proceed to step S541 in FIG. 26.

In step S505, the arithmetic operation circuit 101 sets the control shutter speed TVc to 9 (1/500 sec) before proceeding to step S506. In step S506, the arithmetic operation circuit 101 makes a decision as to whether or not the exposure value EV is greater than 18. The arithmetic operation circuit 101 makes an affirmative decision in step S506 if EV>18 is true, to proceed to step S507, whereas it makes a negative decision in step S506 if EV>18 is not true, to proceed to step S509.

In step S507, the arithmetic operation circuit 101 sets 9 (F22) for the control aperture value AVc and then the operation proceeds to step S508. In step S509, the arithmetic operation circuit 101 sets a value obtained by subtracting 9 (1/500 sec) from the exposure value EV for the control aperture value AVc before proceeding to step S508.

In step S508, the arithmetic operation circuit 101 makes a decision as to whether or not the light emitting unit 44 of the internal flash unit is at the operating position. The arithmetic operation circuit 101 makes an affirmative decision in step S508 if an ON signal has been input from the position detection switch SW1 to proceed to step S510, whereas it makes a negative decision in step S508 if an OFF signal has been input from the position detection switch SW1 to proceed to step S529.

In step S510, the arithmetic operation circuit 101 the main emitted light quantity Bh of the internal flash unit into a saved main flash quantity MBh, and then the operation proceeds to step S511. In step S511, the arithmetic operation circuit 101 sets a value obtained by multiplying $2^{(AVc-MAVc)}$ by Bh for the main emitted light quantity Bh of the internal flash unit, before proceeding to step S512.

In step S512, the arithmetic operation circuit 101 compares the main emitted light quantity Bh having been calculated for the internal flash unit with a maximum emitted light quantity Bhmax set in advance for the internal flash unit to make a decision as to whether or not Bh>Bhmax is true. The arithmetic operation circuit 101 makes an affirmative decision in step S512 if Bh>Bhmax is true, to proceed to step S513, whereas it makes a negative decision in step S512 if Bh>Bhmax is not true, to proceed to step S526. The operation proceeds to step S513 when the flash quantity is insufficient.

In step S513, the arithmetic operation circuit 101 sets the emitted light quantity Bh at the internal flash unit equal to the maximum emitted light value Bhmax before proceeding to step S514. In step S514, the arithmetic operation circuit 101 calculates the control aperture value AVc as indicated in (7) below and then the operation proceeds to step S515.

$$AVc = MAVc + \log_2(Bh\max/MBh) \quad (7)$$

In step S515, the arithmetic operation circuit 101 makes a decision as to whether or not AVc>9 is true. The arithmetic operation circuit 101 makes an affirmative decision in step S515 if AVc>9 is true (if the control aperture value is greater than F22) to proceed to step S516, whereas it makes a negative decision in step S515 if AVc>9 is not true, to proceed to step S519.

The operation proceeds to step S516 if the control aperture value AVc is beyond its setting range. In step S516, the arithmetic operation circuit 101 sets 9 for the control aperture value AVc before proceeding to step S517. As a result, the control aperture value is set to F22 corresponding to the minimum aperture. In step S517, the arithmetic operation circuit 101 sets the flag FU to 0 and 1 for the flag FO before proceeding to step S518.

In step S519, the arithmetic operation circuit 101 makes a decision as to whether or not AVc<3 is true. The arithmetic operation circuit 101 makes an affirmative decision in step S519 if AVc<3 is true (if the control aperture value is smaller than F2.8) to proceed to step S520, whereas it makes a negative decision in step S519 if AVc<3 is not true, to proceed to step S518.

The operation proceeds to step S520 if the control aperture value AVc is below its setting range. In step S520, the arithmetic operation circuit 101 sets 3 for the control aperture value AVc before proceeding to step S521. As a result, the control aperture value is set to F2.8 corresponding to the full open aperture. In step S521, the arithmetic operation circuit 101 sets the flag FU to 1 and 0 for the flag FO before proceeding to step S518.

In step S518, the arithmetic operation circuit 101 sets a value obtained by subtracting the control aperture value AVc from the exposure value EV for the control shutter speed TVc and then the operation proceeds to step S522.

In step S522, the arithmetic operation circuit 101 makes a decision as to whether or not the control shutter speed TVc is higher than 1/500 sec. The arithmetic operation circuit 101 makes an affirmative decision in step S522 if TVc>9 is true, to proceed to step S523, whereas it makes a negative decision in step S522 if TVc>9 is not true, to proceed to step S524. In step S523, the arithmetic operation circuit 101 sets 9 (1/500 sec) for the control shutter speed TVc before ending the exposure calculation processing BB3 in FIG. 25.

In step S524, the arithmetic operation circuit 101 makes a decision as to whether or not the control shutter speed TVc is lower than 30 sec. The arithmetic operation circuit 101 makes an affirmative decision in step S524 if TVc<−5 is true, to proceed to step S525, whereas it makes a negative decision in step S524 if TVc<−5 is not true, and ends the exposure calculation processing BB3 in FIG. 25. In step S525, the arithmetic operation circuit 101 sets −5 (30 sec) for the control shutter speed TVc before ending the exposure calculation processing BB3.

Through the processing executed in steps S522 through S525, the shutter speed is controlled within the 30 sec to 1/500 sec range while the flash unit is utilized.

In step S526, to which the operation proceeds after making a negative decision in step S512 as described above, the arithmetic operation circuit 101 compares the main emitted light quantity Bh having been calculated for the internal flash unit with a minimum emitted light quantity Bhmin set in advance for the internal flash unit to make a decision as to whether or not Bh<Bhmin is true. The arithmetic operation circuit 101 makes an affirmative decision in step S526 if Bh<Bhmin is true, to proceed to step S527, whereas it makes a negative decision in step S526 if Bh<Bhmin is not true, to end the exposure calculation processing BB3 in FIG. 25. The operation proceeds to step S527 if the flash quantity is excessive.

In step S527, the arithmetic operation circuit 101 sets the emitted light quantity Bh at the internal flash unit equal to the minimum emitted light value Bhmin, and then the operation proceeds to step S528. In step S528, the arithmetic operation circuit 101 calculates the control aperture value AVc as indicated in (8) below before proceeding to step S515.

$$AVc = MAVc + \log_2(Bhmin/MBh) \quad (8)$$

In step S529, to which the operation proceeds after making a negative decision in step S508 as described above, the arithmetic operation circuit 101 sets the main flash quantity h of the external flash unit 11 into a saved main flash quantity Mh, and then the operation proceeds to step S530. In step S530, the arithmetic operation circuit 101 sets a value obtained by multiplying $2^{(AVc-MAVc)}$ by h for the main flash quantity h of the external flash unit 11 before proceeding to step S531.

In step S531, the arithmetic operation circuit 101 compares the main flash quantity h having been calculated for the external flash unit 11 with a maximum flash quantity hmax of the external flash unit 11 having been ascertained through the communication to make a decision as to whether or not h>hmax is true. The arithmetic operation circuit 101 makes an affirmative decision in step S531 if h>hmax is true, to proceed to step S532, whereas it makes a negative decision in step S531 if h>hmax is not true, to proceed to step S534. The operation proceeds to step S532 if the flash quantity is insufficient.

In step S532, the arithmetic operation circuit 101 sets the flash quantity h to be achieved at the external flash unit 11 equal to the maximum flash quantity value hmax, and then the operation proceeds to step S533. In step S533, the arithmetic operation circuit 101 calculates the control aperture value AVc as indicated in (9) below before proceeding to step S515.

$$AVc = MAVC + \log_2(hmax/Mh) \quad (9)$$

In step S534, to which the operation proceeds after making a negative decision in step S531 as described above, the arithmetic operation circuit 101 compares the main flash quantity h having been calculated for the external flash unit 11 with a minimum flash quantity hmin of the external flash unit 11 having been ascertained through the communication to make a decision as to whether or not h<hmin is true. The arithmetic operation circuit 101 makes an affirmative decision in step S534 if h<hmin is true, to proceed to step S535, whereas it makes a negative decision in step S534 if h<hmin is not true, to end the exposure calculation processing BB3 in FIG. 25. The operation proceeds to step S535 if the flash quantity is too large.

In step S535, the arithmetic operation circuit 101 sets the flash quantity h to be achieved at the external flash unit 11 equal to the minimum flash quantity value hmin, and then the operation proceeds to step S536. In step S536, the arithmetic operation circuit 101 calculates the control aperture value AVc as indicated in (10) below before proceeding to step S515.

$$AVc = MAVc + \log_2(hmin/Mh) \quad (10)$$

Figure 26:
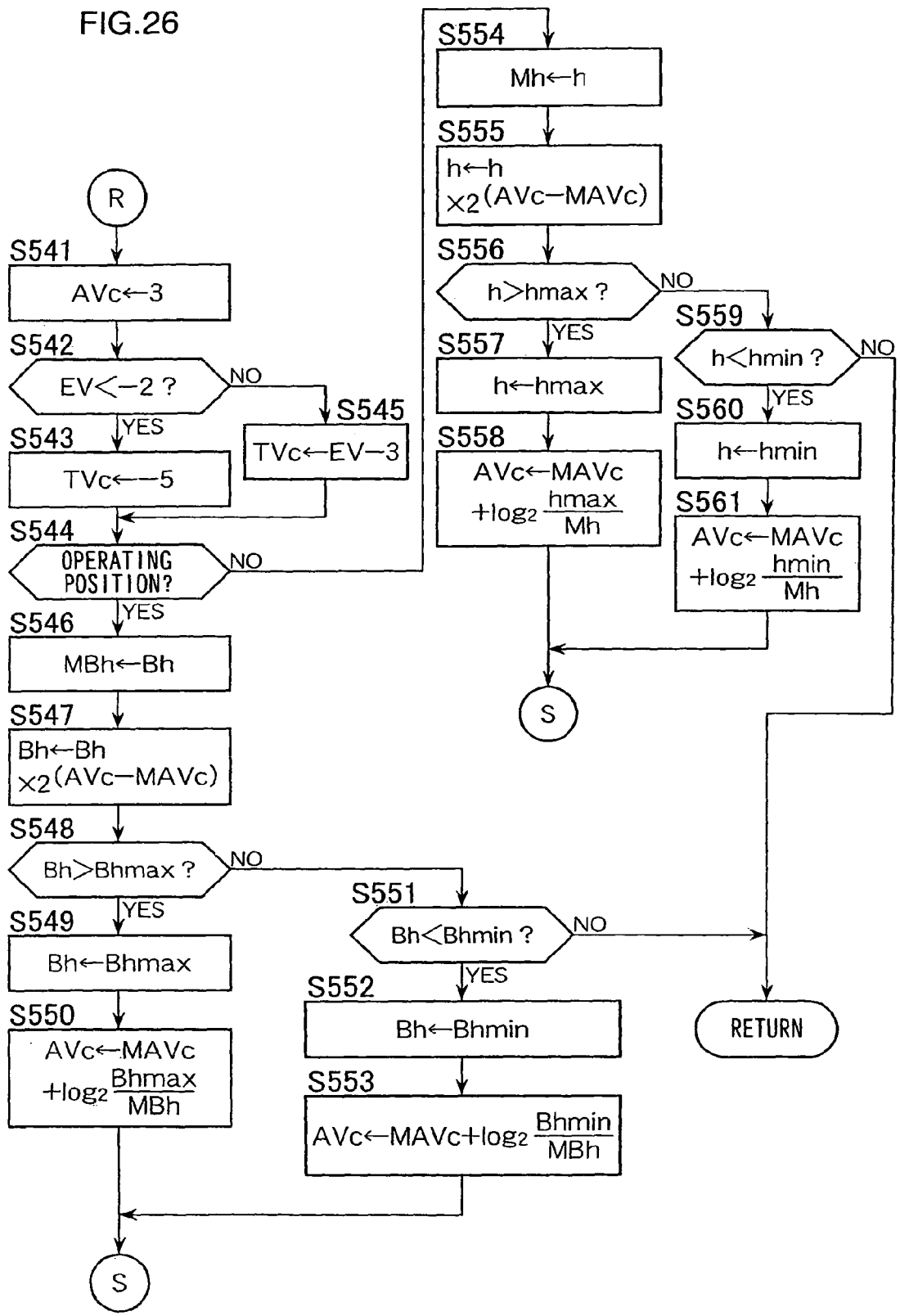
FIG. 26 presents a detailed flowchart of the exposure calculation processing BB3.

In step S541 in FIG. 26, to which the operation proceeds after making a negative decision in step S504 as described above, the arithmetic operation circuit 101 sets 3 (F2.8 (full open aperture)) for the control aperture value AVc before proceeding to step S542. In step S542, the arithmetic operation circuit 101 makes a decision as to whether or not the exposure value EV is smaller than −2. The arithmetic operation circuit 101 makes an affirmative decision in step S542 if EV<−2 is true to proceed to step S543, whereas it makes a negative decision in step S542 if EV<−2 is not true, to proceed to step S545. The operation proceeds to step S543 if the exposure value is beyond the control range of the camera.

In step S543, the arithmetic operation circuit 101 sets −5 (30 sec) for the control shutter speed TVc before proceeding to step S544.

In step S545, the arithmetic operation circuit 101 sets a value obtained by subtracting 3 (F2.8) from the exposure value EV for the control shutter speed TVc before the operation proceeds to step S544.

Since the processing executed in step S544 and steps S546 through S550 is identical to the processing executed in step S508 and steps S510 through S514 explained earlier, its explanation is omitted. Once the processing in step S550 is completed, the arithmetic operation circuit 101 proceeds to step S515 in FIG. 25.

Since the processing executed in steps S551 through S553 is identical to the processing executed in steps S526 through S528 explained earlier, its explanation is omitted. Once the processing in step S553 is completed, the arithmetic operation circuit 101 proceeds to step S515 in FIG. 25.

Since the processing executed in steps S554 through S561 is identical to the processing executed in steps S529 through S536 explained earlier, its explanation is omitted. Once the processing in step S558 or S561 is completed, the arithmetic operation circuit 101 proceeds to step S515 in FIG. 25.

Figure 27:
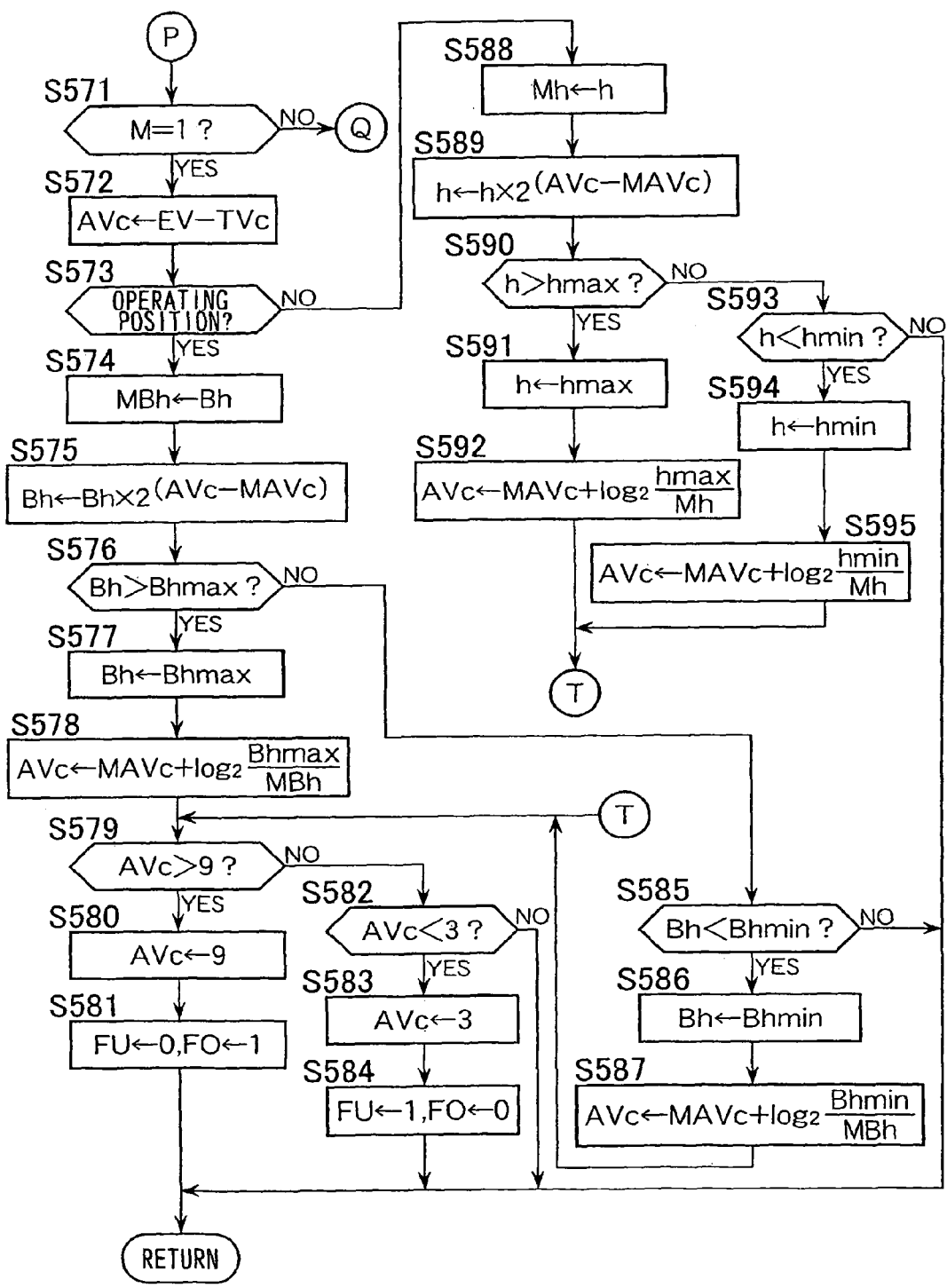
FIG. 27 presents a detailed flowchart of the exposure calculation processing BB3.

In step S571 in FIG. 27, to which the operation proceeds after making a negative decision in step S503 as described above, the arithmetic operation circuit 101 makes a decision as to whether or not the mode parameter M is currently set to 1. The arithmetic operation circuit 101 makes an affirmative decision in step S571 if M=1 (the shutter speed priority automatic exposure mode) to proceed to step S572, whereas it makes a negative decision in step S571 if M≠1 (a mode other than the shutter speed priority automatic exposure mode, i.e., either the A mode or the M mode in this case) to proceed to step S601 in FIG. 28.

In step S572, the arithmetic operation circuit 101 sets a value obtained by subtracting the control shutter speed TVc from the exposure value EV for the control aperture value AVc before proceeding to step S573.

Since the processing executed in steps S573 through S581 is identical to the processing executed in step S508 and steps S510 through S517 explained earlier, its explanation is omitted. Once the processing in step S581 is completed, the arithmetic operation circuit 101 ends the exposure calculation processing BB3.

Since the processing executed in steps S582 through S584 is identical to the processing executed in steps S519 through S521 explained earlier, its explanation is omitted. After making a negative decision in step S582 or after completing the processing in step S584, the arithmetic operation circuit 101 ends the exposure calculation processing BB3.

Since the processing executed in steps S585 through S587 is identical to the processing executed in steps S526 through S528 explained earlier, its explanation is omitted. Once the processing in step S587 is completed, the arithmetic operation circuit 101 proceeds to step S579.

Since the processing executed in steps S588 through S595 is identical to the processing executed in steps S529 through S536 explained earlier, its explanation is omitted. Once the processing in step S592 or S595 is completed, the arithmetic operation circuit 101 proceeds to step S579.

Figure 28:
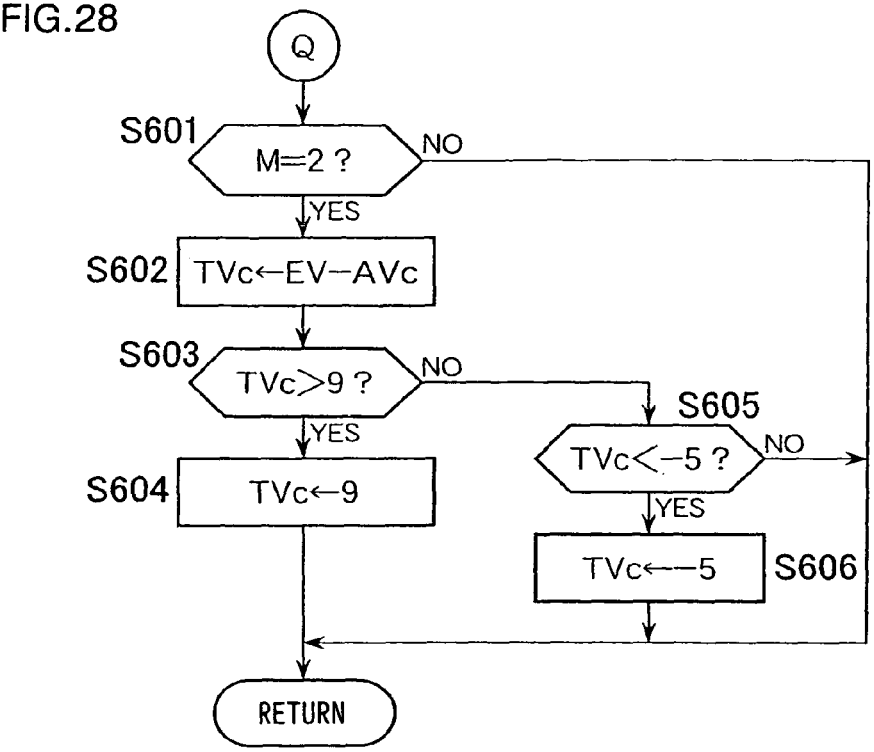
FIG. 28 presents a detailed flowchart of the exposure calculation processing BB3.

In step S601 in FIG. 28, to which the operation proceeds after making a negative decision in step S571 as described above, the arithmetic operation circuit 101 makes a decision as to whether or not the mode parameter M is currently set to 2. The arithmetic operation circuit 101 makes an affirmative decision in step S601 if M=2 (the aperture priority automatic exposure mode) to proceed to step S602, whereas it makes a negative decision in step S601 if M≠2 (a mode other than the aperture priority automatic exposure mode, i.e., the M mode in this case), thereby ending the exposure calculation processing BB3.

In step S602, the arithmetic operation circuit 101 sets a value obtained by subtracting the control aperture value AVc from the exposure value EV for the control shutter speed value TVc before proceeding to step S603.

Since the processing executed in steps S603 through S606 is identical to the processing executed in steps S483 through S486 explained earlier, its explanation is omitted. Once the processing in step S604 or S606 is completed, the arithmetic operation circuit 101 ends the exposure calculation processing BB3.

The third embodiment described above is now summarized.

The adjustment for the change in the exposure (the value determined in correspondence to the shutter speed, the aperture value and the image-capturing sensitivity) of the background resulting from a change in the sensitivity level adjusted to correct any excess/insufficiency of flash quantity from the flash unit is executed as described below.

(1) If the camera is set in the P mode (program automatic exposure mode), the adjustment for the change in the background exposure is achieved by altering at least either the aperture value or the shutter speed.

(2) If the camera is set in the S mode (the shutter speed priority automatic exposure mode), the adjustment for the change in the background exposure is achieved by altering the aperture value.

(3) If the camera is set in the A mode (the aperture priority automatic exposure mode), the adjustment for the change in the background exposure is achieved by altering the shutter speed.

(4) If the camera is set in the M mode (the manual exposure mode), no adjustment for the change in the background exposure is executed.

Since the adjustment for the change occurring in the background exposure is executed in a specific manner corresponding to the exposure mode setting, the background exposure can be adjusted in a desirable manner without altering any settings against the intention of the photographer.

Figure 29:
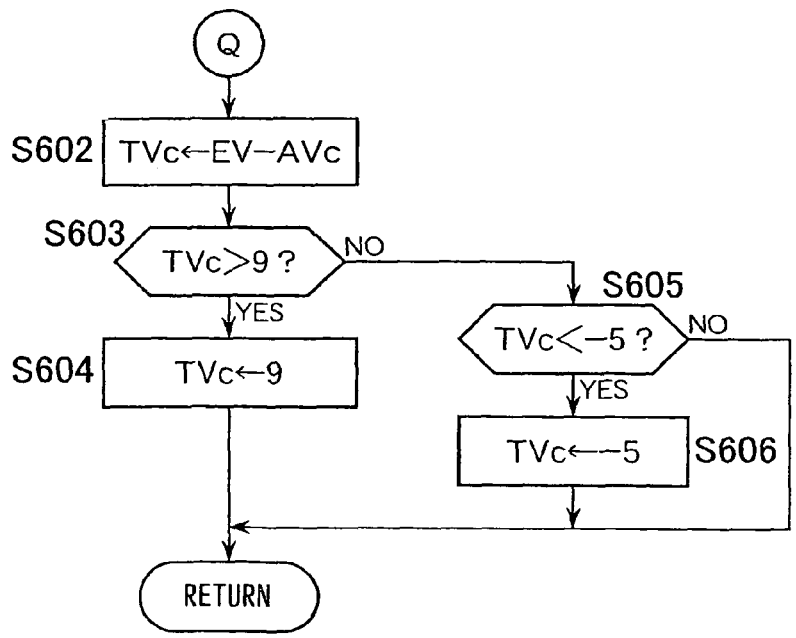
FIG. 29 presents a flowchart of a variation of the exposure calculation processing BB3.

Instead of the processing in FIG. 28, the processing in FIG. 29 may be executed. In the processing in the flowchart presented in FIG. 29, an adjustment for the change in the background exposure is executed by altering the shutter speed even when the camera is set in the M mode (manual exposure mode).

Figure 30:
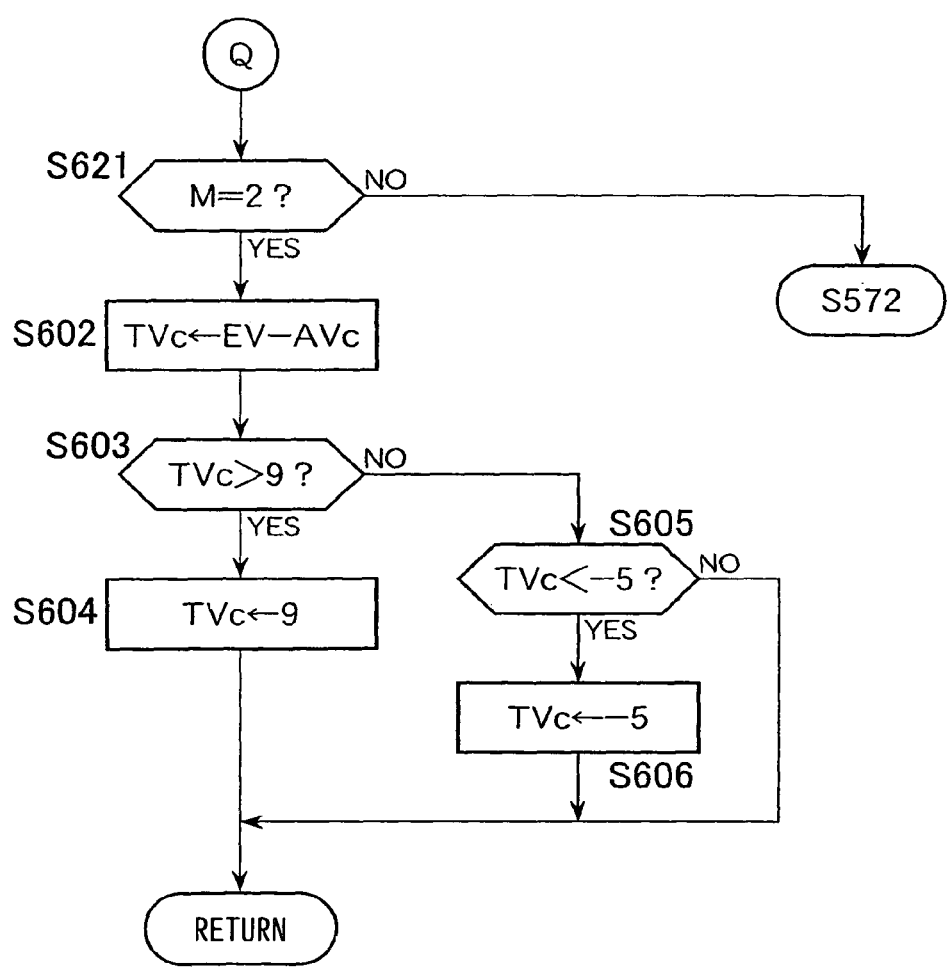
FIG. 30 presents a flowchart of a variation of the exposure calculation processing BB3.

Furthermore, the processing shown in FIG. 30 may be executed as an alternative to the processing in FIG. 28 or FIG. 29. In the processing shown in the flowchart in FIG. 30, the operation proceeds to step S572 in FIG. 27 when the camera is set in the M mode (the manual exposure mode) to adjust for the change in the background exposure by changing the aperture value.

Fourth Embodiment

Figure 31:
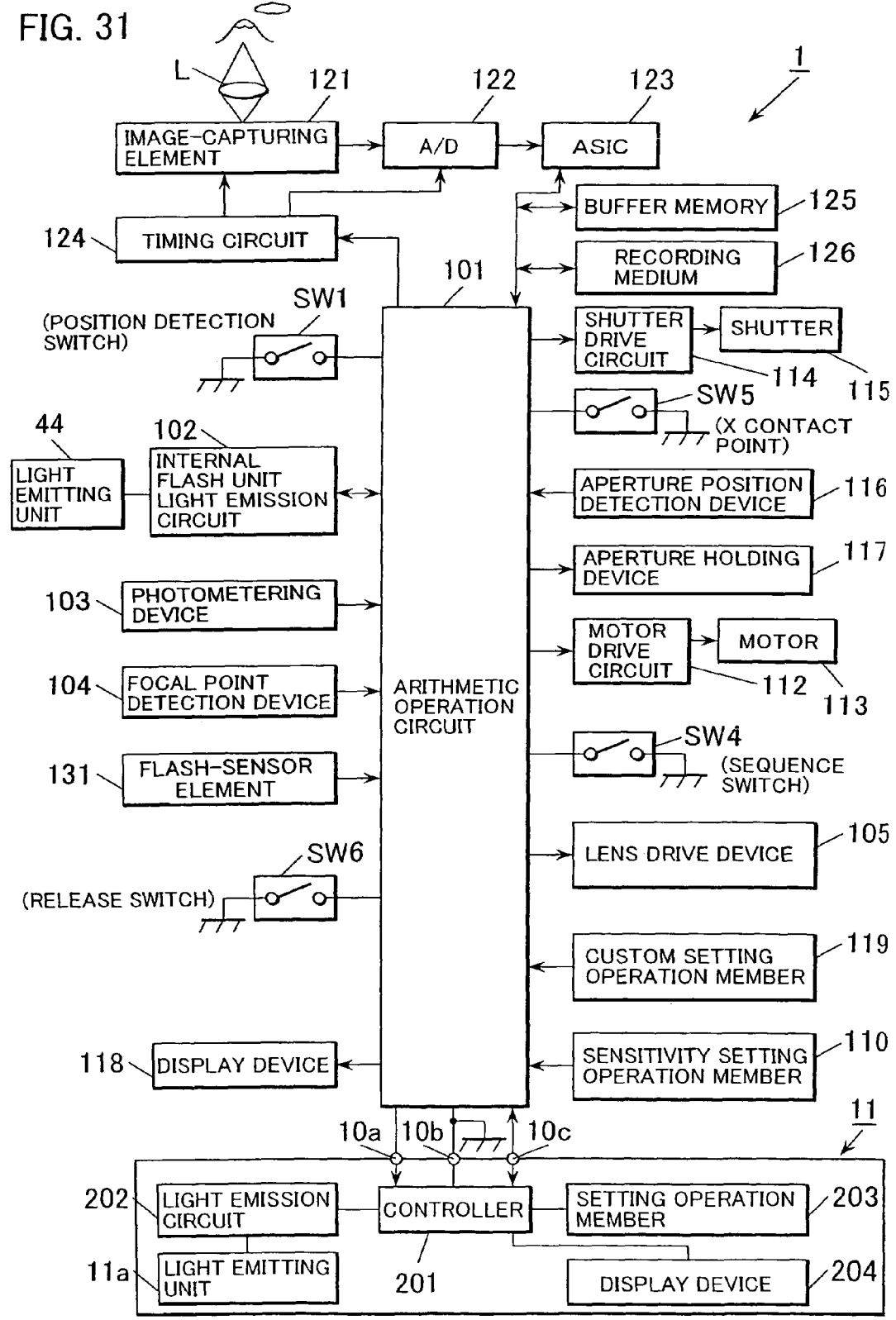
FIG. 31 is a block diagram of the structure adopted in the electronic camera achieved in a fourth embodiment of the present invention.

FIG. 31 is a block diagram of the structure adopted in an electronic camera 1 achieved in the first embodiment of the present invention. In the FIG. 31, which is similar to the FIG. 1 illustrating the first embodiment, the same reference numerals are assigned to identical components. The electronic camera 1 includes an internal flash unit, and an external flash unit 11 is mounted at an accessory shoe (not shown). An arithmetic operation circuit 101 is constituted with a microcomputer and the like. The arithmetic operation circuit 101 executes specific arithmetic operations by using signals input thereto from various blocks to be explained later and outputs control signals generated based upon the arithmetic operation results to the individual blocks. The arithmetic operation circuit 101 further includes a communication circuit (not shown) which enables the arithmetic operation circuit 101 to communicate with the external flash unit 11.

An image-capturing element 121 is constituted with a CCD image sensor or the like. The image-capturing element 121 captures an image formed with subject light having passed through an interchangeable lens L used for photographing operations and outputs an image-capturing signal to an A/D conversion circuit 122. The A/D conversion circuit 122 converts the analog image-capturing signal to a digital signal. The image-capturing element 121 and the A/D conversion circuit 122 are driven so as to operate with specific timing by drive signals output from a timing circuit 124.

An image processing circuit 123 may be constituted with an ASIC or the like. In addition to executing image processing such as white balance processing on image data resulting from the digital conversion, the image processing circuit 123 executes compression processing for compressing the image data having undergone the image processing in a predetermined format, decompression processing for decompressing compressed image data and the like. In a buffer memory 125, image data to be processed at the image processing circuit 123 are temporarily stored. A recording medium 126 may be a detachable memory card that can be loaded into and unloaded from the camera freely, for instance. The image data having undergone the image processing are recorded into the recording medium 126.

A position detection switch SW1 is a micro switch that detects the position of the internal flash unit (not shown), i.e., whether it is at a storage position or it has been popped up to an operating position by a pop-up mechanism (not shown). A light emitting unit 44 is included in the internal flash unit. A position detection switch SW1 outputs an ON signal when the internal flash unit is at the operating position and outputs an OFF signal when the internal flash unit is at the storage position.

An internal flash unit light emission circuit 102 executes light emission control by issuing a light emission start instruction and a light emission stop instruction for the light emitting unit 44 in the internal flash unit in response to commands from the arithmetic operation circuit 101. The internal flash unit light emission circuit 102, which includes a charge circuit (not shown), starts a charge upon receiving a command from the arithmetic operation circuit 101 and outputs a complete signal as the charge is completed.

A photometering device 103 detects the quantity of the subject light passing through the photographic lens L and outputs a detection signal to the arithmetic operation circuit 101. The photometering device 103 also has a function of a photo sensor and receives the light having been initially emitted from the internal flash unit or an external flash unit 11 and reflected at the subject. For instance, it receives the light reflected from the subject during a preliminary light emission executed prior to a photographing operation, executes a time integration of the light receiving signal and outputs the time-integrated value to the arithmetic operation circuit 101. It is to be noted that a flash-sensor element 131 may be provided as a dedicated sensor separately from the photometering device 103. Alternatively, the image-capturing element 121 may fulfill three functions, i.e., the image-capturing function, the function of the photometering device 103 and the function of the flash-sensor element 131.

A focal point detection device 104 detects the state of the adjustment of the focal point position achieved with the photographic lens L and outputs a detection signal to the arithmetic operation circuit 101.

A shutter release switch SW6 interlocking with a shutter release operation button (not shown) outputs a shutter release operation signal to the arithmetic operation circuit 101. The operation signal may be a halfway press operation signal corresponding to a halfway press operation of the shutter release operation button or a full press operation signal corresponding to a full press operation through which the shutter release operation button is pressed further down than in the halfway press operation. At a display device 118, a display indicating a charge completion is brought up when the charge of the internal flash unit or the external flash unit 11 is completed. Photographing information such as the shutter speed and the aperture value and warning icons indicating over-exposure and under-exposure are also displayed at the display device 118.

The front curtain and the rear curtain (not shown) at a shutter 115 are held and released independently of each other under control implemented by a shutter drive circuit 114. An X contact point switch SW5 enters an ON state and outputs an ON signal as the front curtain at the shutter 115 completes its run, and enters an OFF state and outputs an OFF signal halfway through a charge of the shutter 115. An aperture position detection device 116 detects the aperture position corresponding to the aperture value and outputs a detection signal to the arithmetic operation circuit 101. An aperture holding device 117 stops the aperture being driven and holds the aperture at the position corresponding to a specific aperture value.

A motor drive circuit 112 implements drive control on a sequence motor 113 in response to a command from the arithmetic operation circuit 101. The sequence motor 113, which constitutes a sequence drive device (not shown), raises/lowers a mirror (not shown), drives the aperture (not shown), charges the shutter 115 and the like. A sequence switch SW4, which is also part of the sequence drive device mentioned above, generates, for instance, the timing with which braking of the sequence motor 113 is controlled.

A lens drive device 105 adjusts the focal point position of the photographic lens L by driving a focus lens (not shown) in the photographic lens L forward/backward along the optical axis in response to a command issued by the arithmetic operation circuit 101.

A custom setting operation member 119 outputs an operation signal corresponding to a custom setting operation to the arithmetic operation circuit 101. The arithmetic operation circuit 101 sets and clears an image-capturing sensitivity automatic adjust mode in response to the custom setting operation signal. In the image-capturing sensitivity automatic adjust mode, the image-capturing sensitivity SV (exposure sensitivity) is automatically adjusted when calculating the control exposure so as to move toward the optimal exposure. When the image-capturing sensitivity automatic adjust mode is cleared, the control exposure is calculated to adjust toward the optimal exposure without altering the current image-capturing sensitivity setting SV. It is to be noted that in the following explanation, the automatic adjustment of the image-capturing sensitivity effected while utilizing a flash unit is referred to as an image-capturing sensitivity automatic correction.

The custom setting operation member 119 is also used to set an exposure correction quantity and a flash control correction quantity to be detailed later.

A sensitivity setting operation member 110 outputs an operation signal to the arithmetic operation circuit 101 in response to an image-capturing sensitivity setting operation. The arithmetic operation circuit 101 adjusts the setting for the image-capturing sensitivity at the image-capturing element 121 based upon the image-capturing sensitivity setting operation signal input thereto. The image-capturing sensitivity may be selected in specific steps within a range equivalent to, for instance, ISO 100 to ISO 1600.

The external flash unit 11 includes a controller 201, a light emission circuit 202, a light emitting unit 11*a*, a setting operation member 203 and a display device 204. As the external flash unit 11 is mounted at the accessory shoe (not shown) at the camera body 1, the arithmetic operation circuit 101 at the camera body 1 and the external flash unit 11 become connected through contact point terminals 10a, 10b and 10c. The contact point terminal 10a is a terminal for an X contact point signal generated through the X contact point switch SW5. The X contact point signal is output to the controller 201 via the contact point terminal 10a while a signal output is allowed by the arithmetic operation circuit 101 but is not output to the controller 201 if the signal output is prohibited. The contact point terminal 10b is a GND terminal provided to equalize the electrical ground potentials at the camera body 1 and the external flash unit 11. The contact point terminal 10c is a communication terminal through which the camera body 1 and the external flash unit 11 communicate with each other.

The controller 201 is constituted with a microcomputer and the like. The controller 201 executes specific arithmetic operations by using signals input thereto from various blocks in the external flash unit 11 and outputs control signals generated based upon the arithmetic operation results to the individual blocks in the external flash unit 11. In addition, the controller 201 engages in communication with the arithmetic operation circuit 101 via the contact point terminal 10c to receive information from the arithmetic operation circuit 101 indicating a flash quantity to be achieved and also to transmit information indicating the specific light emission mode set at the external flash unit 11. The controller 201 also issues a light emission instruction for the light emission circuit 202 upon receiving sensor X contact point ON signal via the contact point terminal 10a.

The light emission circuit 202 implements light emission control by issuing a light emission start instruction and a light emission stop instruction for the light emitting unit 11a of the external flash unit 11 in response to commands issued by the controller 201. The light emission circuit 202, which includes a charge circuit (not shown), starts a charge as the power switch (not shown) at the external flash unit 11 is turned on and outputs a complete signal to the controller 201 as the charge is completed.

A setting operation member 203 is a switch through which the light emission mode and the like are set. The light emission mode includes a TTL automatic flash control mode and a manual light emission mode. In the TTL automatic flash control mode, the illuminating light having been emitted from a flash unit and then reflected from the subject is received at the photometering device 103 through the lens L and automatic flash control is executed to control the flash quantity from the flash unit based upon the quantity of the received light. In the manual light emission mode, the flash unit emits light to achieve the flash quantity having been set with the setting operation member 203.

At a display device 204, a display indicating a charge completion is brought up when the charge of the external flash unit 11 is completed. Information indicating the current light emission mode setting is also displayed at the display device 204.

Figure 32:
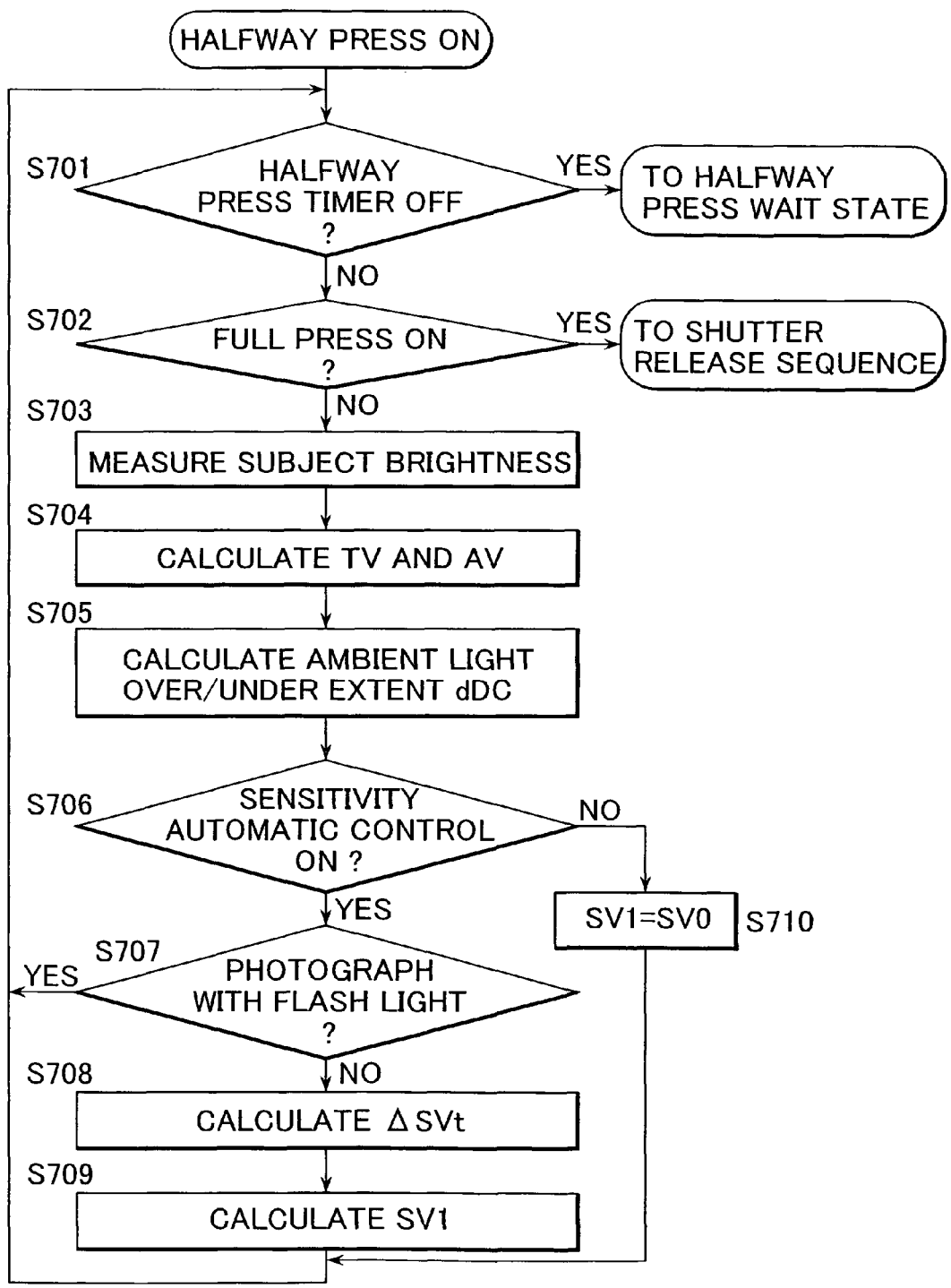
FIG. 32 presents a flowchart of the camera operation processing executed by the arithmetic operation circuit.

The camera operation processing executed at the arithmetic operation circuit 101 of the electronic camera 1 is now explained in reference to the flowchart presented in FIG. 32. The program in conformance to which the processing in the flowchart presented in FIG. 32 is executed is started up as a halfway press operation signal is input to the arithmetic operation circuit 101 from the shutter release switch SW6 while the main switch of the electronic camera 1 is in an ON state.

In step S701 in FIG. 32, the arithmetic operation circuit 101 makes a decision as to whether or not a predetermined length of time has elapsed since the halfway press operation signal was input. The arithmetic operation circuit 101 makes an affirmative decision in step S701 if a timer (not shown) which starts a time count immediately after a halfway press operation has counted up to the predetermined length of time and then has gone off, and in this case, the operation returns to the state (the halfway press operation wait state) prior to the startup of the processing shown in FIG. 32. If, on the other hand, the halfway press timer has not gone off yet (the time count of the predetermined length of time is still in progress or the halfway press operation is still being performed), the arithmetic operation circuit 101 makes a negative decision in step S701 to proceed to step S702.

Figure 33:
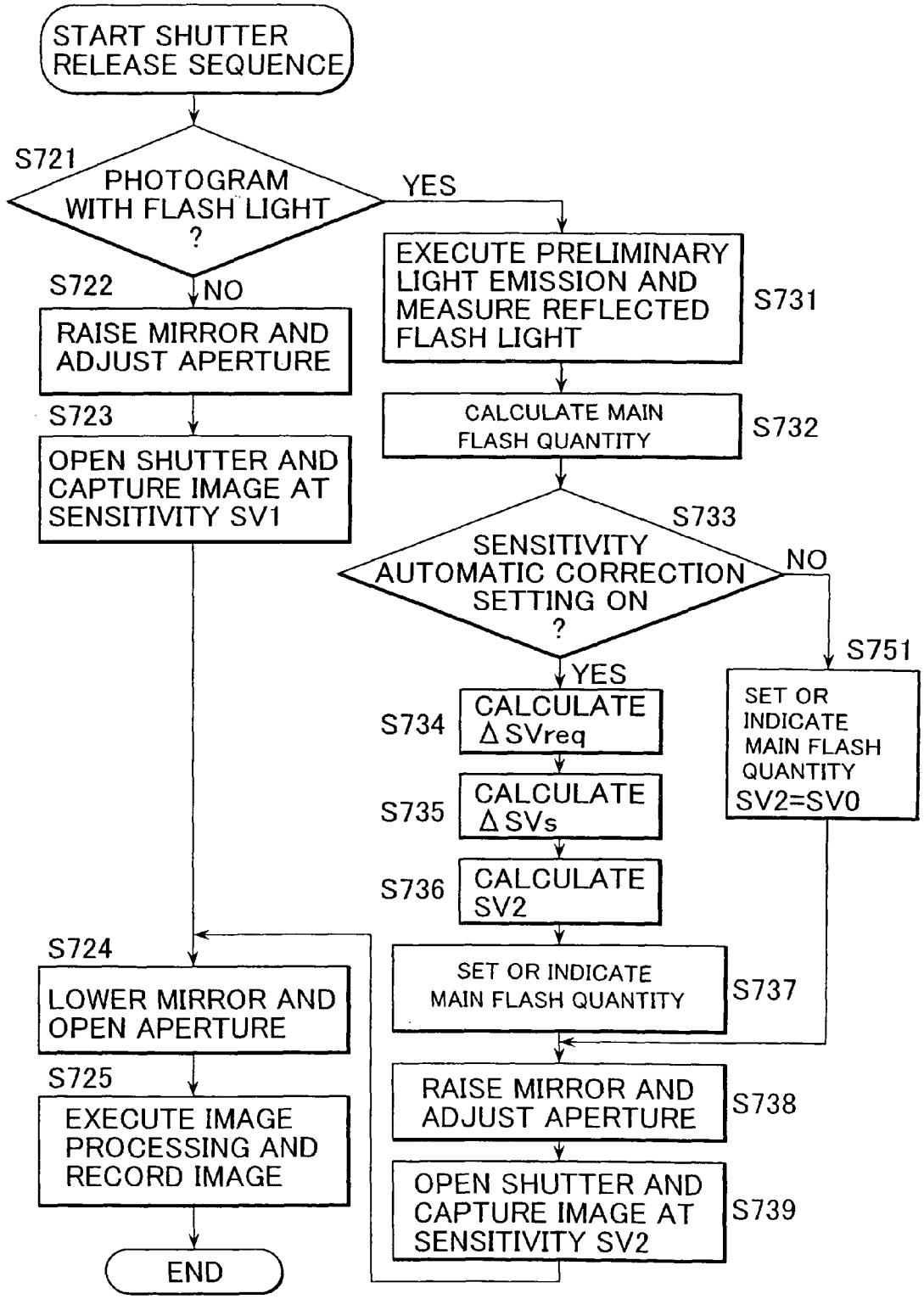
FIG. 33 presents a flowchart of the shutter release sequence processing.

In step S702, the arithmetic operation circuit 101 monitors the state of the shutter release button to determine whether or not it has been pressed all the way down. The arithmetic operation circuit 101 makes an affirmative decision in step S702 if a full press operation signal has been input to proceed to execute the shutter release sequence processing, as shown in FIG. 33. The shutter release sequence processing is to be described in detail later. If, on the other hand, no full press operation signal has been input, the arithmetic operation circuit 101 makes a negative decision in step S702 to proceed to step S703.

In step S703, the arithmetic operation circuit 101 measures the subject brightness and then the operation proceeds to step S704. More specifically, it obtains brightness information corresponding to each of the specific areas of the photographic field defined by dividing the photographic field based upon detection signals input from the photometering device 103 and then calculates a brightness value BVans representing the entire photographic scene by incorporating the individual sets of brightness information corresponding to the different areas so as to achieve optimal exposure for the photographic scene. Since such representative brightness value calculation is executed by using an algorithm of the known art, a detailed explanation is not provided.

In step S704, the arithmetic operation circuit 101 calculates a shutter speed TV and an aperture value AV that will achieve an exposure quantity close to the optimal exposure in correspondence to the brightness value BVans, the current image-capturing sensitivity setting, the current exposure correction quantity setting and the current exposure mode setting, before proceeding to step S705. More specifically, it adjusts TV and AV so as to set the value of (TV+AV) as close as possible to (BVans+Sv0−RH) within the control limit range. Sv0 ($=\log_2$ (0.32×ISO sensitivity)) represents the image-capturing sensitivity setting, RH (unit: steps) represents the exposure correction quantity, TV ($=\log_2$(shutter speed)) represents the shutter speed and AV ($=\log_{\sqrt{2}}$ (F number)) represents the aperture value, all indicated by using apex values.

The exposure correction quantity is set to increase/decrease the exposure quantity relative to the optimal value. One of the following modes is selected for the exposure mode.

1. An aperture priority exposure mode in which the shutter speed is automatically adjusted at a fixed aperture value setting.
2. A shutter priority exposure mode in which the aperture value is automatically adjusted at a fixed shutter speed setting.
3. A program mode in which the aperture value and the shutter speed are automatically adjusted so that the extent of changes in the aperture value and the shutter speed achieve a predetermined ratio.
4. A mode in which control is implemented at the current aperture value setting and the current shutter speed setting.

It is to be noted that the ratio to be achieved in the program mode is varied in accordance to the mode set for the specific photographic scene, i.e., in accordance to a specific category setting such as a landscape mode, a portrait mode or a nighttime photographing mode.

The values obtained through the exposure calculation (step S704) are controlled at all times to stay within their control limit ranges. The control limit range of the aperture value is determined by the maximum aperture value and the minimum aperture value. The control limit range of the shutter speed is determined in correspondence to the high shutter speed limit and the low shutter speed limit. If the shutter speed needs to be controlled within a predetermined range during a light emission at a flash unit, the shutter speed is also determined in correspondence to the maximum speed and the minimum speed of this predetermined range.

In step S705 in FIG. 32, the arithmetic operation circuit 101 calculates the extent of over-exposure or under-exposure (ambient light over/under extent) dDC manifesting when exposure (ambient light exposure) is achieved with surrounding light (light from the sun, indoor lighting or the like, hereafter referred to as ambient light) other than flash light emitted at a flash unit as indicated in (12) below, and then the operation proceeds to step S706.

$$dDC = BVans + Sv0 - RH - AV - TV \qquad (12)$$

If dDC=0, optimal exposure is achieved with ambient light, instead of manifesting over-exposure or under-exposure. With TV or AV controlled within the control limit ranges during the exposure calculation in step S704, it may not always be possible to set dDC to 0. For instance, if the aperture value is controlled so as to remain the minimum aperture value when, in fact, it is more desirable to control the aperture value to a level lower than the minimum aperture value, dDC will assume a positive value resulting in ambient light overexposure.

In addition, if the shutter speed is controlled so as not to become slower than a predetermined value during a light emission at a flash unit in a mode other than a slow synchronous mode, the shutter speed is not allowed to be lower than the low shutter speed limit even when it is more desirable to set a lower shutter speed, and in this case, dDC assumes a negative value to result in ambient light under-exposure. While optimal exposure is achieved for the main subject with the flash light, the background is underexposed in an image photographed under these conditions.

In step S706, the arithmetic operation circuit 101 makes a decision as to whether image-capturing sensitivity automatic control is on or off. The arithmetic operation circuit 101 makes an affirmative decision in step S706 if the image-capturing sensitivity automatic adjust mode is currently set to proceed to step S707, whereas it makes a negative decision in step S706 if the image-capturing sensitivity automatic adjust mode has been cleared to proceed to step S710.

In step S707, the arithmetic operation circuit 101 makes a decision as to whether or not the camera is in a photographing state in which an image is photographed with light emitted at a flash unit. The arithmetic operation circuit 101 makes an affirmative decision in step S707 if the internal flash unit (not shown) has been popped up to the operating position or the external flash unit 11 mounted at the accessory shoe (not shown) of the camera body 1 has been turned on and, in this case, the operation returns to step S701. If, on the other hand, the internal flash unit (not shown) has not been popped up and the external flash unit 11 is not mounted or the power to the external flash unit has not been turned on, the arithmetic operation circuit 101 makes a negative decision in step S707 to proceed to step S708.

In step S708, the arithmetic operation circuit 101 executes an automatic adjustment of the image-capturing sensitivity as indicated in (13) below based upon the ambient light over/under extent dDC, and then the operation proceeds to step S709.

$$\Delta SVt = -dDC \qquad (13)$$

ΔSVt represents the extent to which the image-capturing sensitivity is to be increased/decreased relative to the image-capturing sensitivity setting SV0. The range over which ΔSVt can be adjusted through the image-capturing sensitivity automatic adjustment is restricted to SVmin≦(SV0+ΔSVt)≦SVmax. SVmin is the lowest image-capturing sensitivity level in the control range and SVmax is the highest image-capturing sensitivity level in the control range.

In step S709, the arithmetic operation circuit 101 calculates an image sensitivity level SV1 to be achieved without emitting flash light as indicated in (14) below and sets the calculated image-capturing sensitivity SV1 at the image-capturing element 121 before returning to step S701. As a result, the image-capturing sensitivity at the image-capturing element 121 is switched from the current setting, i.e., the value SV0.

$$SV1 = SV0 + \Delta SVt \qquad (14)$$

In step S710, to which the operation proceeds after making a negative decision in step S706 as described above, the arithmetic operation circuit 101 sets the image-capturing sensitivity setting SV0 into the image-capturing sensitivity SV1, and then the operation returns to step S701. As a result, the value SV0 currently set for the image-capturing sensitivity at the image-capturing element 121 is sustained.

The shutter release sequence processing is now explained in detail in reference to the flowchart presented in FIG. 33. In step S721, the arithmetic operation circuit 101 makes a decision as to whether or not a flash unit is in a light emission enabled state. The arithmetic operation circuit 101 makes an affirmative decision in step S721 if the internal flash unit (not shown) has been popped up to the operating position or the external flash unit 11 mounted at the accessory shoe (not shown) of the camera body 1 has been turned on and, in this case, the operation proceeds to step S731. If, on the other hand, the internal flash unit (not shown) has not been popped up and the external flash unit 11 is not mounted or the power to the external flash unit 11 has not been turned on, it makes a negative decision in step S721 to proceed to step S722.

In step S722, the arithmetic operation circuit 101 issues instructions to raise the main mirror and to adjust the aperture before proceeding to step S723. The aperture value to which the aperture is to be adjusted (namely, the aperture value indicated to the aperture holding device 117) is the aperture value AV having been calculated in step S704.

In step S723, the arithmetic operation circuit 101 issues instructions to drive the shutter 115 and to store an electrical charge at the image-capturing element 121 before proceeding to step S724. The shutter speed indicated in the instruction (namely, the shutter speed indicated to the shutter drive circuit 114) is the shutter speed TV having been calculated in step S704. The image-capturing element 121 captures an image at the image-capturing sensitivity SV1 set for the operation executed without flash light.

In step S724, the arithmetic operation circuit 101 issues instructions to lower the main mirror and to open the aperture before proceeding to step S725. In step S725, the arithmetic operation circuit 101 outputs instructions to execute specific image processing on the image data obtained through the image-capturing operation and to execute processing for recording the image data having undergone the image processing into the recording medium 126, before ending the shutter release sequence processing in FIG. 33.

In step S731 to which the operation proceeds after making an affirmative decision in step S721 as described above, the arithmetic operation circuit 101 issues an instruction for the flash unit to execute a preliminary light emission (flash light emission) and also issues an instruction (a reflected flash light metering instruction) for the photometering device 103 to execute a time integration of the preliminary flash light reflected at the subject and then received at the photometering device before proceeding to step S732. An output (hereafter referred to as a measured preliminary flash light value) indicating the time-integrated value of the reflected flash light having been emitted through the preliminary light emission is used in an arithmetic operation executed to calculate the required flash quantity for the flash light emission during the photographing operation (hereafter referred to as a main light emission) and is also used in an arithmetic operation executed to calculate the image-capturing sensitivity automatic correction quantity for the flash light emission. When measuring the reflected flash light having been emitted through the preliminary light emission, the measured ambient light value is subtracted from the photometering output corresponding to the preliminary light emission so as to exclude the component attributable to the ambient light and to measure the reflected light component from the flash light emission alone. Thus, the photometric value of the flash light emitted in the preliminary flash light emission, which has been reflected at the subject, can be ascertained with a high degree of accuracy.

It is to be noted that the flash unit that emits the light, is the internal flash unit if the internal flash unit is at its operating position and is the external flash unit 11 if the external flash unit 11 mounted at the accessory shoe (not shown) has been turned on. The flash quantity GVy achieved at the flash unit through the preliminary light emission is indicated as in (15) below.

$$GVy = \log_{\sqrt{2}}(GNy) \quad (15)$$

GNy in the expression above represents a preliminary light emission guide number.

In step S732, the arithmetic operation circuit 101 calculates the required flash quantity GVreq to be emitted from the flash unit during the main light emission as indicated in (16) below, and then the operation proceeds to step S733.

$$GVreq = GVy - \log_2(IG) + CH + \text{OFFSET} + (5-SV0) + AV - AV0 \quad (16)$$

IG and CH in the expression above are respectively the value obtained by executing A/D conversion of the measured preliminary flash light value and the flash control correction quantity (unit: step). OFFSET represents a constant term which is a value ascertained in advance based upon the results of tests conducted so as to achieve a predetermined flash quantity when a flash light emission is executed under standard conditions. SV0 is the current image-capturing sensitivity value setting, which is subtracted from 5 as indicated above since the flash quantity is calculated in reference to the level equivalent to ISO 100 (SV=5). AV represents the apex value of the open aperture value, and AV0 is subtracted from AV since the preliminary flash light metering is executed with the aperture set at the open position. In addition, the relationship expressed as in (17) below exists between the required flash quantity GVreq for the main light emission and the main light emission guide number GNreq.

$$GVreq = \log_{\sqrt{2}}(GNreq) \quad (17)$$

In step S733, the arithmetic operation circuit 101 makes a decision as to whether the image-capturing sensitivity automatic correction setting is on or off. The arithmetic operation circuit 101 makes an affirmative decision in step S733 if the electronic camera is set for the image-capturing sensitivity automatic correction (if the image-capturing sensitivity automatic adjust mode is currently set) to proceed to step S734, whereas it makes a negative decision in step S733 if the camera is not set for the image-capturing sensitivity automatic correction (if the image-capturing sensitivity automatic adjust mode has been cleared) to proceed to step S751.

In step S734, the arithmetic operation circuit 101 calculates a required sensitivity correction quantity ΔSVreq based upon the required main light emission flash quantity GVreq and the light emission control range. The required sensitivity correction quantity SVreq represents the extent by which the image-capturing sensitivity needs to be corrected in order to correct the excess/insufficiency of the exposure quantity in the main light emission. The lower limit GVmin and the upper limit GVmax of the light emission control range are predetermined design values. GVmin and GVmax of the internal flash unit are stored in memory in the arithmetic operation circuit 101, whereas GVmin and GVmax of the external flash unit 11 are provided to the arithmetic operation circuit 101 through communication. The required sensitivity correction quantity ΔSVreq is calculated as detailed below.

1. When GVmin≦GVreq≦GVmax, ΔSVreq=0
2. When GVreq<GVmin, ΔSVreq=GVreq−GVmin
3. When GVmax<GVreq, ΔSVreq=GVreq−GVmax However, since control is implemented to ensure that the image-capturing sensitivity having undergone the image-capturing sensitivity automatic correction does not deviate from the control-enabled range, i.e., the range between the minimum image-capturing sensitivity SVmin and the maximum image-capturing sensitivity SVmax, the required sensitivity correction quantity ΔSVreq is in reality calculated as follows.

A When (SV0+ΔSVreq)<SVmin, ΔSVreq=SVmin−SV0
B When SVmax<(SV0+ΔSVreq), ΔSVreq=SVmax−SV0

Once the required sensitivity correction quantity ΔSVreq is calculated, the arithmetic operation circuit 101 proceeds to step S735.

In step S735, the arithmetic operation circuit 101 further corrects the required sensitivity correction quantity ΔSVreq by using the ambient light over/under extent dDC having been calculated in step S705 and thus calculates the ultimate sensitivity correction quantity ΔSVs. The sensitivity correction quantity ΔSVs is calculated as detailed below.

1 When ΔSVreq≦0, ΔSVs=ΔSVreq
2 When 0<ΔSVreq and 0≦dDC, ΔSVs=0
3 When 0<ΔSVreq, dDC<0 and −dDC≦ΔSVreq, ΔSVs=−dDC
4 When 0<ΔSVreq, dDC<0 and ΔSVreq<−dDC, ΔSVs=ΔSVreq Once the ultimate sensitivity correction quantity ΔSVs is calculated, the arithmetic operation circuit 101 proceeds to step S736.

In step S736, the arithmetic operation circuit 101 executes an arithmetic operation to calculate an image-capturing sensitivity level SV2 for the flash photographing operation as indicated in (18) below before proceeding to step S737.

$$SV2 = SV0 + \Delta SVs \quad (18)$$

In step S737, the arithmetic operation circuit 101 sets or indicates a main light emission control quantity (required flash quantity) for the flash unit, and then the operation proceeds to step S738. The main light emission control quantity is set at the internal flash unit light emission circuit 102 if flash light emitted by the internal flash unit is being used, whereas the main light emission control quantity is indicated to the external flash unit 11 through communication if flash light emitted by the external flash unit 11 is being used. The required flash quantity GVreq is set or indicated as detailed below.

1 When GVmin≦GVreq≦GVmax, the required main light emission flash quantity GVreq is set or indicated.
2 When GVreq<GVmin, the lower limit GVmin of the light emission control range is set or indicated.
3 When GVmax<GVreq, the upper limit GVmax of the light emission control range is set or indicated.

In step S738, the arithmetic operation circuit 101 issues instructions to raise the main mirror and to adjust the aperture before proceeding to step S739. The aperture value to which the aperture is to be adjusted (namely, the aperture value indicated to the aperture holding device 117) is the aperture value AV having been calculated in step S704. It is to be noted that the processing in step S738 may be executed in parallel while the processing in steps S732 through S737 is in progress.

In step S739, the arithmetic operation circuit 101 sets the image-capturing sensitivity SV2 at the image-capturing element 121 and issues instructions to drive the shutter 115 and to store electrical charges at the image-capturing element 121 before proceeding to step S724. The shutter speed indicated in the instruction (namely, the shutter speed indicated to the shutter drive circuit 114) is the shutter speed TV having been calculated in step S704. The image-capturing element 121 captures an image at the image-capturing sensitivity level SV2 set for the operation executed with flash light. It is to be noted that an X contact point signal is generated with predetermined timing when the shutter 115 is in a full open state, and that the internal flash unit (or the external flash unit 11) emits light in synchronization with the X contact point synchronous signal.

In step S751, to which the operation proceeds after making a negative decision in step S733 as described above, the arithmetic operation circuit 101 sets or indicates a main light emission control quantity (required flash quantity) for the flash unit. The main light emission control quantity is set at the internal flash unit light emission circuit 102 if flash light emitted by the internal flash unit is being used, whereas the main light emission control quantity is indicated to the external flash unit 11 through communication if flash light emitted by the external flash unit 11 is being used. The required flash quantity GVreq is set or indicated as described below.

1 When GVmin≦GVreq≦GVmax, the required main light emission flash quantity GVreq is set or indicated.
2 When GVreq<GVmin, the lower limit GVmin of the light emission control range is set or indicated.
3 When GVmax<GVreq, the upper limit GVmax on the light emission control range is set or indicated.

The arithmetic operation circuit 101 also sets the image-capturing sensitivity setting SV0 into the image-capturing sensitivity SV2 before proceeding to step S738. As a result, the value SV0 currently set for the image-capturing sensitivity at the image-capturing element 121 is sustained.

In the fourth embodiment described above, the ultimate sensitivity correction quantity ΔSVs is calculated by first determining through an arithmetic operation the extent of the over/under exposure (the ambient light over/under extent) dDC attributable to the surrounding light (ambient light) other than light emitted from the flash unit and then correcting the required image-capturing sensitivity correction quantity SVreq, by which the image-capturing sensitivity needs to be corrected in order to correct the over/under exposure during the main light emission, in correspondence to the value of dDC. As a result, the sensitivity is corrected in a desirable manner for the main light emission (flash light emission) and, at the same time, ambient light over/under exposure is prevented.

The advantages of the embodiment are summarized in correspondence to the individual conditions.
1 When ΔSVreq≦0, ΔSVs is set equal to ΔSVreq.

When the required main light emission flash quantity GVreq is smaller than the minimum flash quantity GVmin of the flash unit, the required sensitivity correction quantity ΔSVreq takes on a negative value. If ΔSVreq is equal to or smaller than 0, the ultimate sensitivity correction quantity ΔSVs is set equal to ΔSVreq to optimize the exposure of the main subject during the main light emission. Under these circumstances, the background and the like are exposed with the ambient light in a desirable manner if ΔSVreq=0 but are underexposed if ΔSVreq<0.
2 When 0<ΔSVreq and 0≦dDC, ΔSVs is set to 0.

When the distance to the main subject is significant or the aperture has been adjusted to a smaller diameter, the required sensitivity correction quantity ΔSVreq takes on a positive value (toward a higher image-capturing sensitivity level) if the required main light emission flash quantity GVreq is greater than the maximum flash quantity GVmax of the flash unit. When 0≦dDC, the level of exposure achieved with ambient light is either sufficient or excessive. If the image-capturing sensitivity is increased in order to correct under-exposure of the main subject during the main light emission, the level of the exposure achieved with the ambient light may become excessively high under these circumstances. Accordingly, the ultimate sensitivity correction quantity ΔSVs is set to 0 to prevent ambient light over-exposure or to prevent exacerbation of existing over-exposure under the ambient light. In other words, the image-capturing sensitivity is not corrected (adjusted) in this situation.
3 When 0<ΔSVreq, dDC<0 and −dDC≦ΔSVreq, ΔSVs is set to −dDC When dDC<0 and −dDC≦ΔSVreq, the extent of ambient light under-exposure is smaller than the extent of the under-exposure occurring during the main light emission. In this case, the ultimate sensitivity correction quantity ΔSVs is adjusted in correspondence to the extent of the ambient light under-exposure so as to prevent over-exposure under the ambient light and to optimize the exposure of the main subject during the main light emission.
4 When 0<ΔSVreq, dDC<0 and ΔSVreq<−dDC, ΔSVs is set equal to ΔSVreq When dDC<0 and ΔSVreq<−dDC, the extent of ambient light under-exposure is greater than the extent of the under-exposure occurring during the main light emission. In this case, the ultimate sensitivity correction quantity ΔSVs is adjusted in correspondence to the required sensitivity correction quantity ΔSVreq so as to optimize the exposure of the main subject during the main light emission and to prevent ambient light over-exposure with a high degree of reliability.

Fifth Embodiment

The fifth embodiment differs from the fourth embodiment in that the ultimate sensitivity correction quantity ΔSVs is determined by taking into consideration the flash control correction quantity CH. In step S735 in FIG. 33, the arithmetic operation circuit 101 calculates the sensitivity correction quantity ΔSVs as detailed below. It is to be noted that the term "flash control correction" refers to an instance of deliberately altering the optimal flash quantity for the flash unit which is controlled through the flash control. For instance, the flash control correction may be executed when the main subject needs to be illuminated brightly by further increasing the flash quantity or when the flash quantity needs to be reduced to avoid illuminating the main subject with intense light. The flash control correction quantity is set in advance by the photographer via the custom setting operation member 119 or the like.

1 When $\Delta SVreq \leq 0$, $\Delta SVs = \Delta Vreq$
2 When $0 < \Delta SVreq$ and $0 \leq dDC$, $\Delta SVs = CH$
3 When $0 < \Delta SVreq$, $dDC < 0$ and $-dDC \leq \Delta SVreq$, $\Delta SVs = -dDC + CH$
4 When $0 < \Delta SVreq$, $dDC < 0$ and $\Delta SVreq < -dDC$, $\Delta SVs = \Delta SVreq$ The processing executed in steps other than step S375 is identical to the processing executed in the corresponding steps in the fourth embodiment.

When the ultimate sensitivity correction quantity $\Delta SVs$ is calculated by first executing an arithmetic operation to calculate the extent of over-exposure/under-exposure (the ambient light over/under extent) dDC attributable to the surrounding light (ambient light) other than light emitted from the flash unit and then correcting the required image-capturing sensitivity correction quantity $\Delta SVreq$ by which the image-capturing sensitivity needs to be corrected in order to correct the over/under exposure for the main light emission in correspondence to the value of dDC, the current flash control correction quantity setting is reflected in the exposure in the fifth embodiment. As a result, the sensitivity is corrected in an optimal manner for the flash light emission and, at the same time, the over/under exposure manifesting under the ambient light can be prevented. It is to be noted that the flash control correction quantity CH is also taken into consideration when calculating the required main light emission flash quantity GVreq as well.

The advantages of the fifth embodiment are now summarized in correspondence to cases 2 and 3, in which the processing is executed differently from that in the fourth embodiment.

2 When $0 < \Delta SVreq$ and $0 \leq dDC$, $\Delta SVs$ is set equal to CH

When $0 \leq dDC$, the level of exposure achieved with ambient light is either sufficient or excessive. If the image-capturing sensitivity is increased in order to correct under-exposure of the main subject during the main light emission, the level of the exposure achieved with the ambient light may become excessively high under these circumstances. Accordingly, the ultimate sensitivity correction quantity $\Delta SVs$ is set to (0+CH) and excessive over-exposure under the ambient light can be prevented.

3 When $0 < \Delta SVreq$, $dDC < 0$ and $-dDC \leq \Delta SVreq$, $\Delta SVs$ is set to $(-dDC+CH)$ When $dDC < 0$ and $-dDC \leq \Delta SVreq$, the extent of ambient light under-exposure is smaller than the extent of the under-exposure occurring during the main light emission. In this case, the ultimate sensitivity correction quantity $\Delta SVs$ is adjusted in correspondence to (extent of the ambient light under-exposure+flash control correction quantity) so as to prevent over-exposure under the ambient light and to optimize the exposure of the main subject during the main light emission.

While the data resulting from the image processing are recorded into the recording medium 126 in step S725 in the explanation provided above, data may be directly recorded into the recording medium 126 without undergoing the image processing.

The processing in step S725 may be started immediately after the image is captured in step S723 and then be concurrently executed while the processing in step S723 is underway.

While the reflected flash light metering instruction is output to the photometering device 103 in step S731, the reflected flash light metering instruction should be output to a flash-sensor element 131 if the flash-sensor element 131 is provided as a dedicated sensor in addition to the photometering device 103. In addition, if the image-capturing element 121 fulfills three functions, i.e., the image-capturing function, the function of the photometering device 103 and the function of the flash-sensor element 131, the reflected flash light metering instruction should be output to the image-capturing element 121.

While an explanation is given above on an example in which the maximum flash quantity that can be achieved during the main light emission is the upper limit GVmax of the light emission control range, the actual flash quantity is reduced by the extent corresponding to the amount of energy used for the preliminary light emission, to be exact. Accordingly, the arithmetic operation may be executed to achieve an even higher degree of accuracy by using the upper limit GVmax* of the light emission control range after the preliminary light emission as indicated in (19) below.

$$GVmax^* = \log_2(2^{(GVmax\ without\ preliminary\ light\ emission)} - 2^{GVy}) \quad (19)$$

The above described embodiments are examples, and various modifications can be made without departing from the spirit and scope of the invention.

What is claimed is:

1. An electronic camera comprising:
    an image-capturing unit with variable image-capturing sensitivity, which captures an image of a subject through a photographic lens;
    a brightness detection unit that detects subject brightness;
    an exposure calculation unit that executes an exposure calculation by using, at least, the image-capturing sensitivity set at the image-capturing unit and the subject brightness having been detected;
    a flash quantity calculation unit that calculates a main flash quantity for a flash unit that illuminates the subject when capturing an image thereof; and
    a sensitivity adjusting unit that adjusts the image-capturing sensitivity so as to achieve optimal exposure with a main flash quantity within a flash quantity control range of the flash unit when the main flash quantity having been calculated by the flash quantity calculation unit is outside the flash quantity control range, wherein:
    if the image-capturing sensitivity has been adjusted by the sensitivity adjusting unit, the exposure calculation unit re-executes the exposure calculation; and
    the exposure calculation unit does not re-execute the exposure calculation if the camera is set in a shutter speed priority automatic exposure calculation mode.

2. The electronic camera according to claim 1, further comprising:
    a reflected light detection unit that detects reflected light from the subject when the flash unit executes a preliminary flash emission, wherein:
    the flash quantity calculation unit calculates the main flash quantity needed for an image-capturing operation based upon a detection signal obtained at the reflected light detection unit in the preliminary flash emission and the image-capturing sensitivity currently set at the image-capturing unit.

3. The electronic camera according to claim 1, wherein:
the exposure calculation unit alters an exposure time period which is currently set when the exposure calculation is re-executed.

4. An electronic camera comprising:
an image-capturing unit with variable image-capturing sensitivity, which captures an image of a subject through a photographic lens;
a brightness detection unit that detects subject brightness;
an exposure calculation unit that executes an exposure calculation by using, at least, the image-capturing sensitivity set at the image-capturing unit and the subject brightness having been detected;
a flash quantity calculation unit that calculates a main flash quantity for a flash unit that illuminates the subject when capturing an image thereof; and
a sensitivity adjusting unit that adjusts the image-capturing sensitivity so as to achieve optimal exposure with a main flash quantity within a flash quantity control range of the flash unit when the main flash quantity having been calculated by the flash quantity calculation unit is outside the flash quantity control range, wherein:
if the image-capturing sensitivity has been adjusted by the sensitivity adjusting unit, the exposure calculation unit re-executes the exposure calculation; and
the exposure calculation unit does not re-execute the exposure calculation if the camera is set in a manual exposure mode.

5. The electronic camera according to claim 4, further comprising:
a reflected light detection unit that detects reflected light from the subject when the flash unit executes a preliminary flash emission, wherein:
the flash quantity calculation unit calculates the main flash quantity needed for an image-capturing operation based upon a detection signal obtained at the reflected light detection unit in the preliminary flash emission and the image-capturing sensitivity currently set at the image-capturing unit.

6. The electronic camera according to claim 4, wherein:
the exposure calculation unit alters an exposure time period which is currently set when the exposure calculation is re-executed.

7. An electronic camera, comprising:
an image-capturing unit with variable image-capturing sensitivity, which captures an image of a subject through a photographic lens;
a brightness detection unit that detects subject brightness;
an exposure calculation unit that executes an exposure calculation by using, at least, the image-capturing sensitivity set at the image-capturing unit and the subject brightness having been detected;
a flash quantity calculation unit that calculates a main flash quantity for a flash unit that illuminates the subject when capturing an image thereof; and
a sensitivity adjusting unit that adjusts the image-capturing sensitivity so as to achieve optimal exposure with a main flash quantity within a flash quantity control range of the flash unit when the main flash quantity having been calculated by the flash quantity calculation unit is outside the flash quantity control range, wherein:
if the image-capturing sensitivity has been adjusted by the sensitivity adjusting unit, the exposure calculation unit re-executes the exposure calculation;
when re-executing the exposure calculation, the exposure calculation unit adjusts at least one of an aperture value and a shutter speed set in the camera if the camera is set in a program automatic exposure calculation mode, adjusts the aperture value if the camera is set in a shutter speed priority automatic exposure calculation mode and adjusts the shutter speed if the camera is set in an aperture priority automatic exposure calculation mode; and
the exposure calculation unit does not re-execute the exposure calculation if the camera is set in a manual exposure mode.

8. The electronic camera according to claim 7, further comprising:
a reflected light detection unit that detects reflected light from the subject when the flash unit executes a preliminary flash emission, wherein:
the flash quantity calculation unit calculates the main flash quantity needed for an image-capturing operation based upon a detection signal obtained at the reflected light detection unit in the preliminary flash emission and the image-capturing sensitivity currently set at the image-capturing unit.

9. The electronic camera according to claim 7, wherein:
the exposure calculation unit alters an exposure time period which is currently set when the exposure calculation is re-executed.

* * * * *